(12) United States Patent
Nishi et al.

(10) Patent No.: US 8,233,781 B2
(45) Date of Patent: Jul. 31, 2012

(54) IMAGE REPRODUCTION METHOD AND IMAGE REPRODUCTION APPARATUS

(75) Inventors: Takahiro Nishi, Nara (JP); Satoshi Kondo, Kyoto (JP); Masayasu Iguchi, Hyogo (JP); Tadamasa Toma, Osaka (JP); Hisao Sasai, Osaka (JP); Toshiyasu Sugio, Osaka (JP)

(73) Assignee: Panasonic Corporation, Osaka (JP)

( * ) Notice: Subject to any disclaimer, the term of this patent is extended or adjusted under 35 U.S.C. 154(b) by 1453 days.

(21) Appl. No.: 11/661,813

(22) PCT Filed: Sep. 1, 2005

(86) PCT No.: PCT/JP2005/016004
§ 371 (c)(1),
(2), (4) Date: Jun. 8, 2007

(87) PCT Pub. No.: WO2006/025489
PCT Pub. Date: Mar. 9, 2006

(65) Prior Publication Data
US 2007/0292110 A1    Dec. 20, 2007

(30) Foreign Application Priority Data
Sep. 1, 2004   (JP) ................. 2004-254741

(51) Int. Cl.
*H04N 5/93*    (2006.01)
*H04N 5/92*    (2006.01)
*H04N 5/917*   (2006.01)
*H04B 1/66*    (2006.01)
*H04N 7/12*    (2006.01)
*H04N 11/02*   (2006.01)
*H04N 11/04*   (2006.01)
*H04K 1/10*    (2006.01)
*H04L 27/28*   (2006.01)
*H04L 5/12*    (2006.01)

(52) U.S. Cl. ........ 386/353; 386/326; 386/328; 386/354; 386/355; 386/356; 386/357; 375/240; 375/240.1; 375/240.14; 375/260; 375/264

(58) Field of Classification Search ......... 386/353, 386/354, 355, 356, 357, 326, 328; 375/240, 375/240.1, 240.14, 260, 264
See application file for complete search history.

(56) References Cited

U.S. PATENT DOCUMENTS 6,104,757 A * 8/2000 Rhee ................... 375/240.12
6,144,799 A * 11/2000 Ohnami ................... 386/326
6,148,140 A * 11/2000 Okada et al. .............. 386/241

(Continued)

FOREIGN PATENT DOCUMENTS

| EP | 1067793 | * 10/2001 |
| JP | 2002-368636 | * 12/2002 |
| WO | WO 2004036908 A1 | * 4/2004 |

*Primary Examiner* — Daquan Zhao
(74) *Attorney, Agent, or Firm* — Steptoe & Johnson LLP

(57) ABSTRACT

There is provided an image reproduction apparatus for seamlessly reproducing a connected stream which is obtained by connecting plural streams that are respectively coded by different codec methods. An image reproduction apparatus (100) for reproducing a connected stream which is obtained by connecting plural streams of different codec methods such as an MPEG-2 method and an MPEG-4 AVC method is provided with a stream buffer (102) in which the connected stream Bst is stored, and plural decoders Dd1~Ddn corresponding to the various kinds of codec methods, and a decoder for decoding each stream in the connected stream Bst that is outputted from the stream buffer (102) is selected from among the plural decoders according to the codec method of each stream.

14 Claims, 30 Drawing Sheets

U.S. PATENT DOCUMENTS

| | | | |
|---|---|---|---|
| 6,473,558 B1 * | 10/2002 | Wu et al. | 386/290 |
| 7,130,526 B2 * | 10/2006 | Abelard et al. | 386/346 |
| 2004/0140916 A1 * | 7/2004 | Ji | 341/50 |
| 2004/0165864 A1 * | 8/2004 | Sawabe et al. | 386/95 |
| 2006/0110131 A1 * | 5/2006 | Okauchi et al. | 386/95 |

* cited by examiner

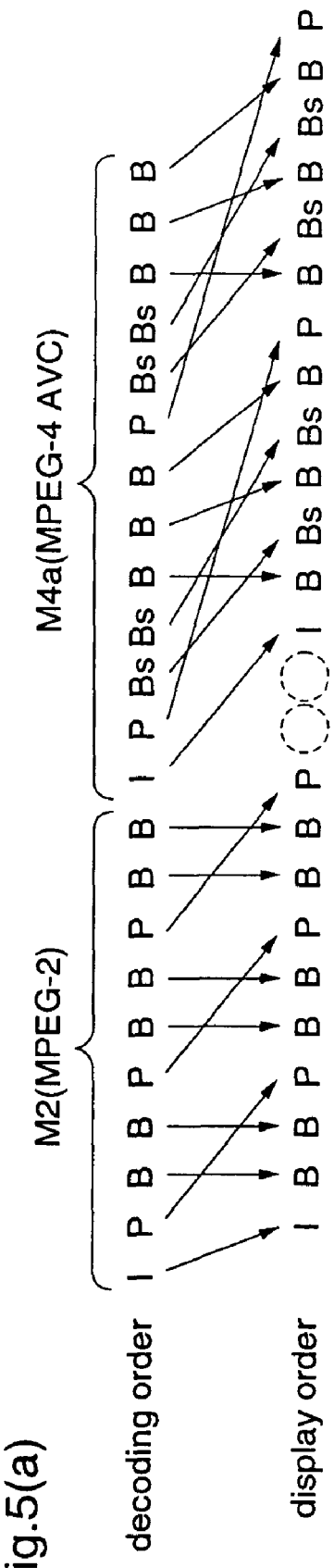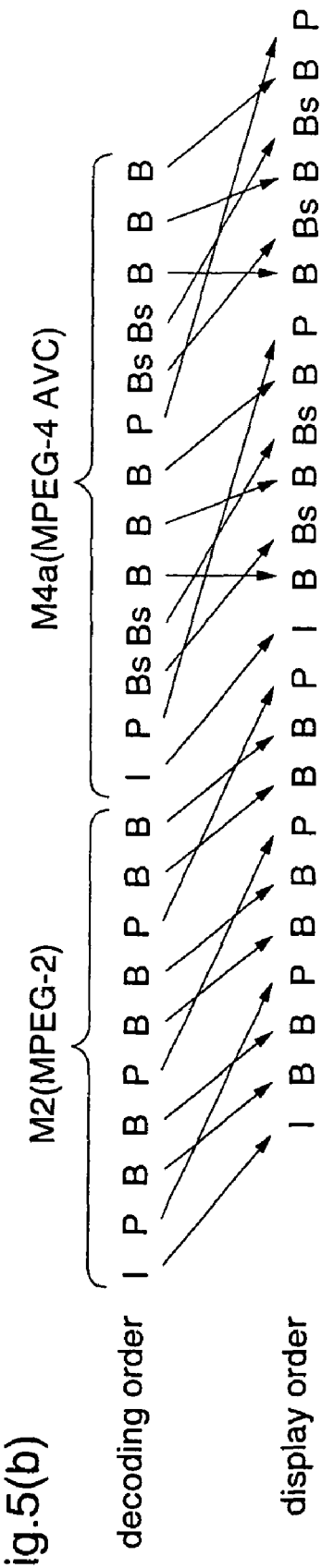
Fig.5(a)
Fig.5(b)

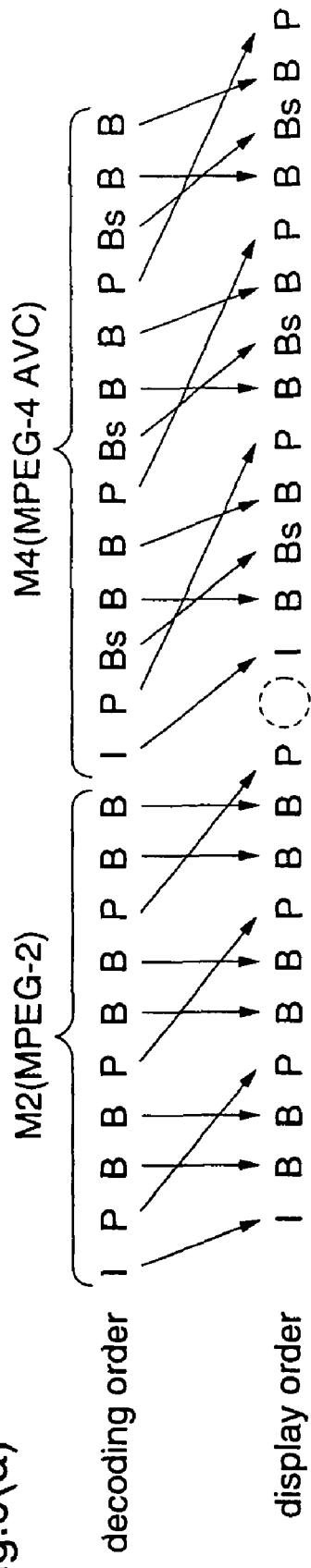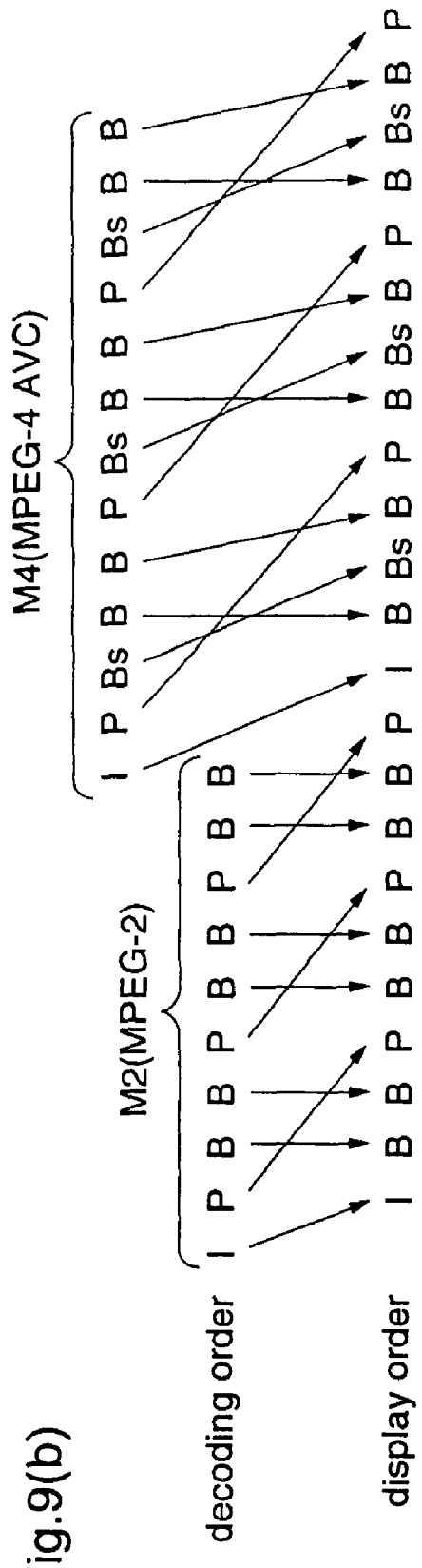
Fig.9(a)
Fig.9(b)

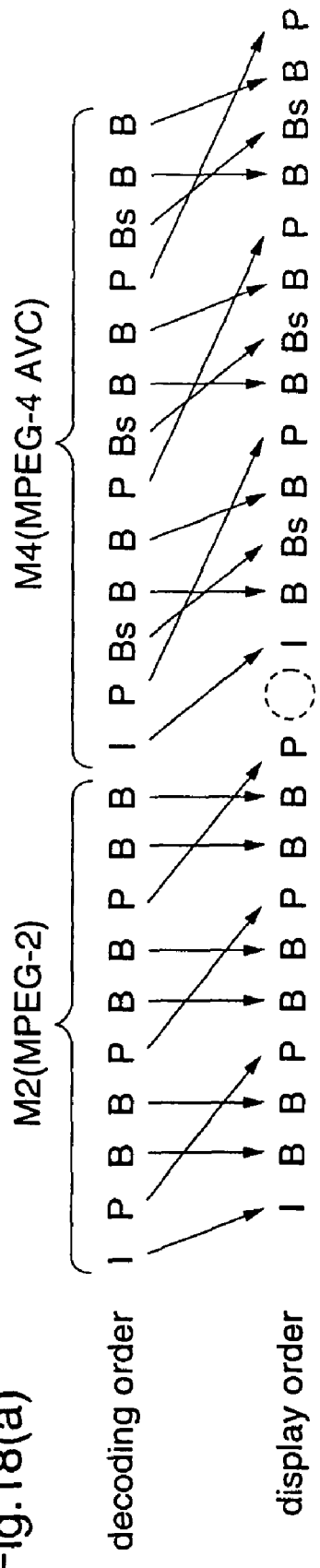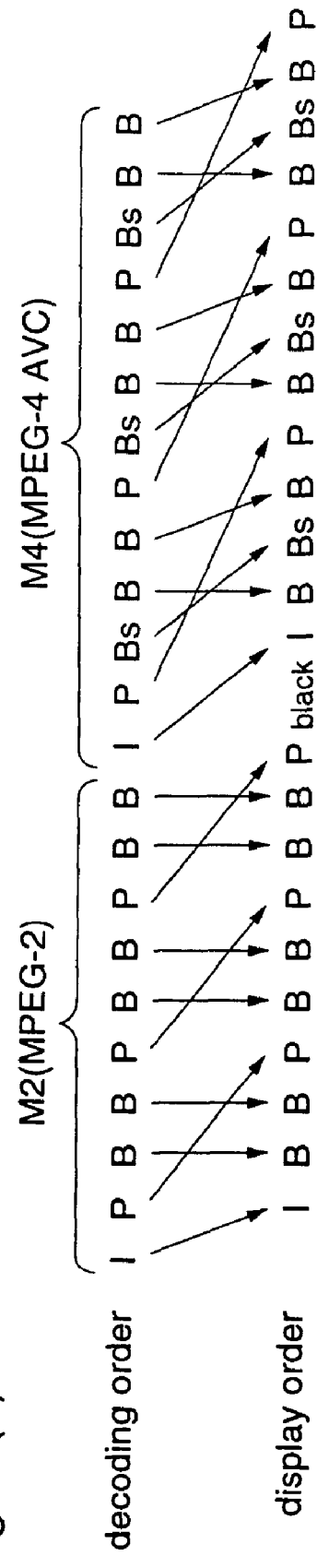

Fig.24(a)

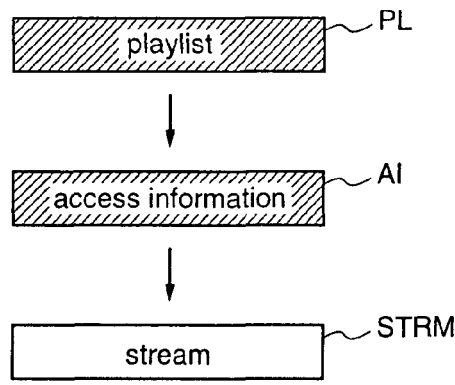

Fig.24(b)

```
playlist{
    maximum frame delay in items in playlist : 3 frames      PLA
    item 1: stream1.ts pts.in: 0,pts_out: 60
    item 2: stream2.ts pts.in: 30,pts_out: 60                     PLB
            item 1 and item 2: seamlessly connectable
                    having different codecs and different frame delays
    item 3: stream3.ts pts.in: 60,pts_out: 90
            item 2 and item 3: seamlessly unconnectable
                    having different image sizes and the same frame delay
}
                                                                PLC
```

Fig.24(c)

```
access information for stream1.ts{
attribute information{
    coding method: MPEG-4 AVC
    frame rate: 24Hz
    frame delay: 2 frames        AIA
    ...
}
access table for stream1.ts{
    pts: 0 address: 1000
    pts: 5 address: 1500
    ...
    pts: 60 address: 9000
}
```

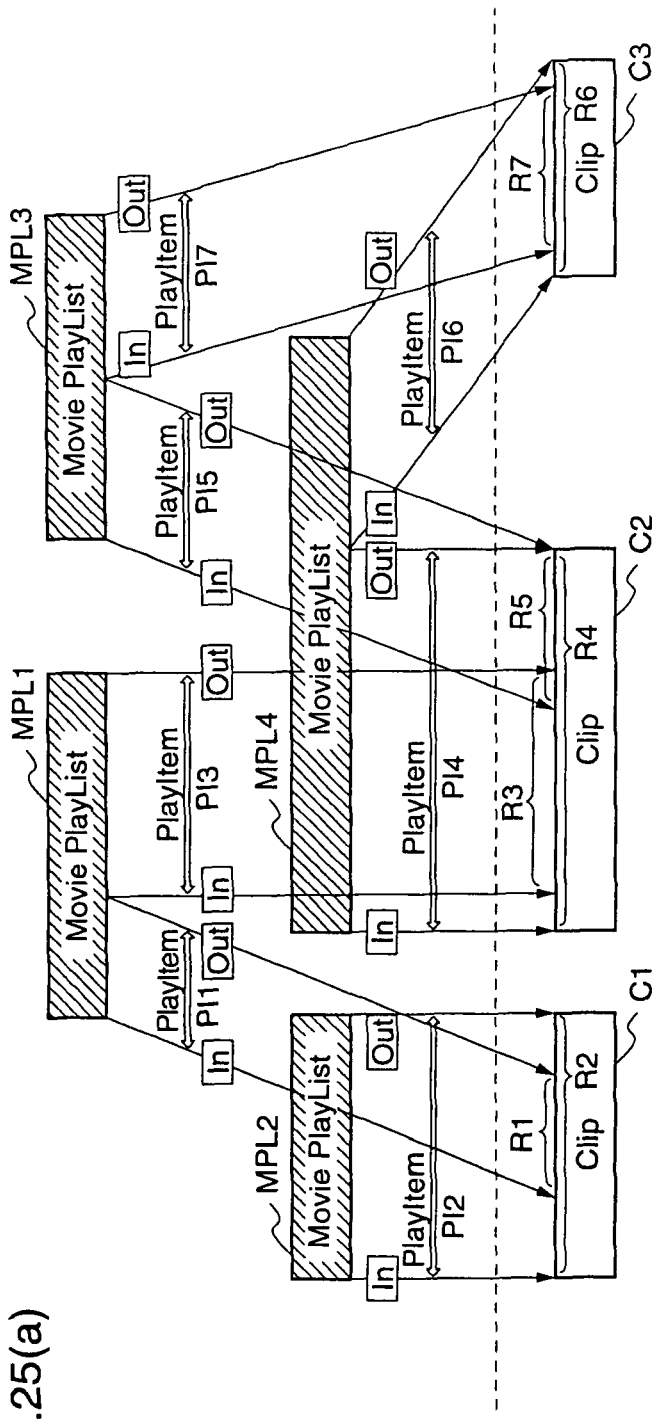

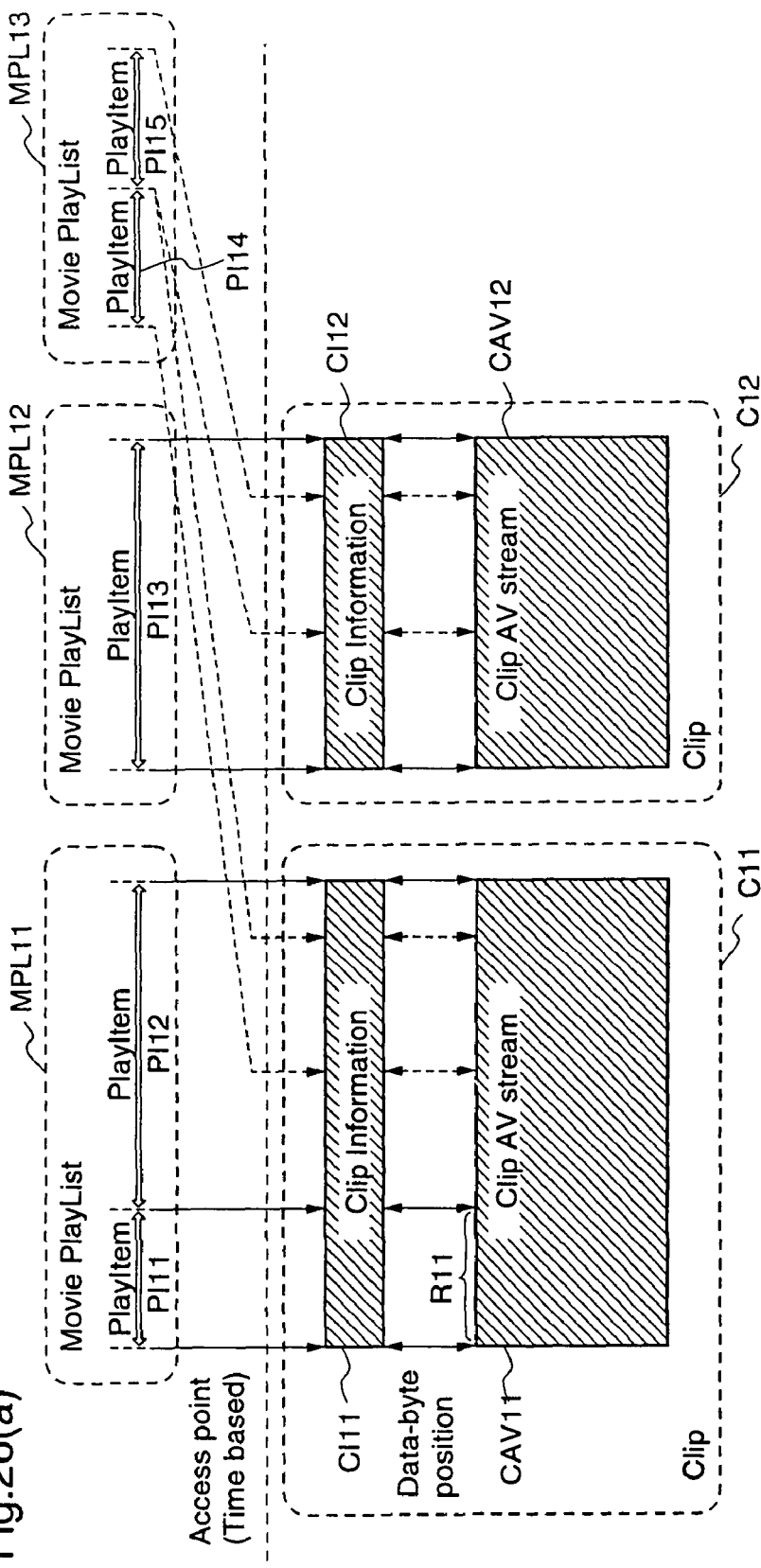

playlist{
  item 1: stream1.ts pts.in: 0,pts_out: 60
  item 2: stream2.ts pts.in: 30,pts_out: 60
          item 1 and item 2: seamlessly connectable
  item 3: stream3.ts pts.in: 60,pts_out: 90
          item 2 and item 3: seamlessly unconnectable
} access information for stream1.ts{
  attribute information{
    coding method: MPEG-4 AVC
    frame rate: 24Hz
    ...
  }
  access table for stream1.ts{
  pts: 0 address: 1000
  pts: 5 address: 1500
  ...
  pts: 60 address: 9000
  }

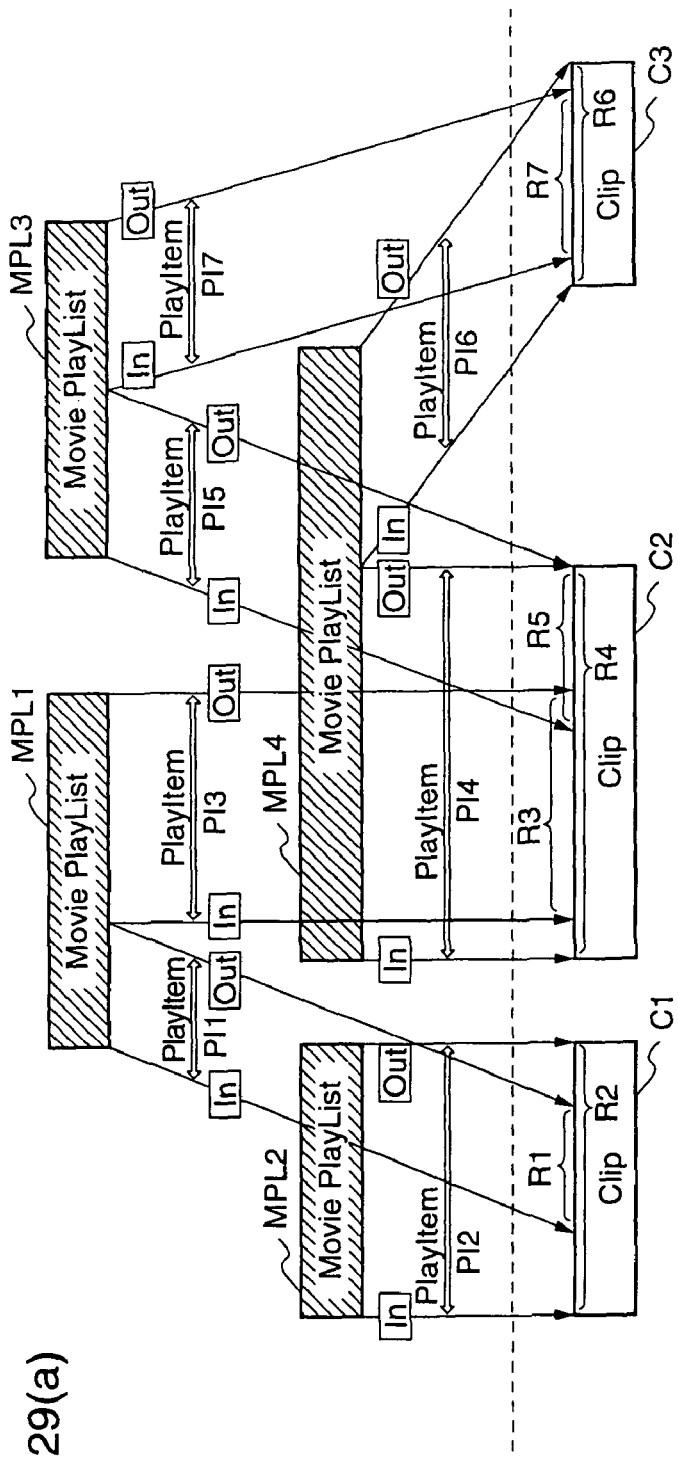

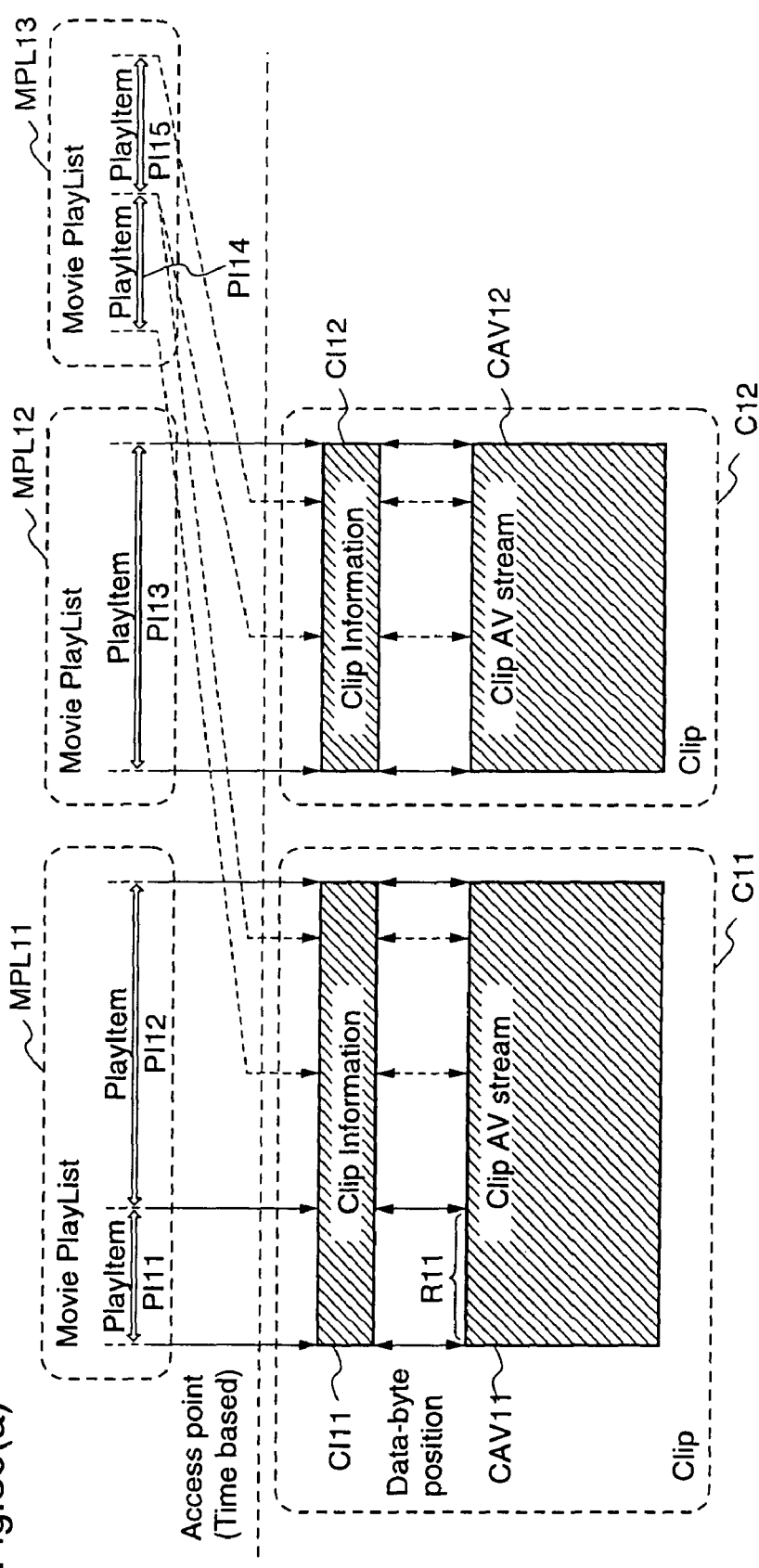

US 8,233,781 B2

IMAGE REPRODUCTION METHOD AND IMAGE REPRODUCTION APPARATUS

The present application is based on International Application PCT/JP2005/016004, filed Sep. 1, 2005, which claims priority to Japanese Patent Application No. 2004-254741, filed Sep. 1, 2004, the entire contents of which are hereby incorporated by reference.

TECHNICAL FIELD

The present invention relates to an image reproduction method and an image reproduction apparatus. More particularly, the present invention realizes seamless reproduction of a connected stream that is obtained by connecting plural image coded streams corresponding to different codec methods.

BACKGROUND ART

Conventionally, there has been a reproduction apparatus that reproduces different system streams continuously and seamlessly, i.e., without seams. For example, Japanese Published Patent Application No. 2002-298509 (Japanese Patent Application No. 2002-17283) discloses an apparatus that seamlessly reproduces a bitstream having discontinuous system time information.

Hereinafter, the stream reproduction apparatus disclosed in the above-mentioned publication will be described briefly.

FIG. 27 is a diagram for explaining the stream reproduction apparatus.

This stream reproduction apparatus 200 decodes and reproduces a multimedia bitstream that is edited by an authoring coding apparatus. Here, the authoring coding apparatus performs coding and edition of original multimedia data in accordance with a scenario suited to needs of users.

The stream reproduction apparatus 200 includes a stream reading unit 201 for reading a multimedia bitstream Rs recorded on a recording medium M, by a read control signal Csr, and a stream buffer 202 in which the read multimedia bitstream Rs is stored. The stream buffer 202 outputs control data Stc such as synchronous information included in the stored stream.

The stream reproduction apparatus 200 further includes a system decoder 203 which obtains a designated stream Ps from the stream buffer 202 on the basis of a control signal Csd that designates a stream and outputs the designated stream Es thus obtained, and further, outputs reproduction time information Stm relating to the designated stream Es, and a video buffer 204 in which the designated stream Es obtained by the system decoder 203 is stored.

The stream reproduction apparatus 200 further includes a decoder 205 which outputs an output request signal Srv to the video buffer 204 on the basis of a decoding control signal Cd, and decodes a buffer output stream Bs that is outputted from the video buffer 204 in response to the output request signal to output decoded data Dd, and a frame buffer 206 in which the decoded data Dd is stored.

Further, the stream reproduction apparatus 200 includes a control unit 210 for controlling the respective parts thereof. This control unit 210 outputs a reading control signal Csr, a system decoder control signal Csd, and a decoder control signal Cd to the stream reading unit 201, the system decoder 203, and the decoder 205, respectively, as control signals thereof, so that a desired stream in the multimedia bitstream that is recorded on the recording medium M is reproduced on the basis of an instruction signal Sop that is generated by user operation.

The above-mentioned multimedia bitstream includes not only the coded video data but also other coded data such as coded audio data. While the stream reproduction apparatus 200 actually includes an audio decoder and the like, only the decoding system for decoding the coded video streams is shown in FIG. 27 for simplification. Further, the controls by the control unit 210 for controlling the respective units are also simplified.

Further, the multimedia bitstream recorded in the recording medium M has an information presenting smooth reproduction embedded therein so as to enable smooth reproduction at a joint portion of the system streams when a system stream (VOB) and another system stream are continuously reproduced. This information presenting smooth reproduction is a seamless reproduction flag indicating a system clock corresponding to one VOB being switched to a system clock corresponding to another VOB at the joint portion of the system streams, and it is supplied from the stream buffer 202 to the control unit 210 as the control data Stc.

The control unit 210 is operated to switch the system clock corresponding to the one VOB to the system clock corresponding to another VOB at the joint portion of the system streams on the basis of the reproduction time information Stm outputted from the system decoder 203 according to the seamless reproduction flag, when the system stream corresponding to one VOB and the system stream corresponding to the other VOB are continuously reproduced.

Next, the operation will be described.

In the image reproduction apparatus (stream reproduction apparatus) 200, when an instruction signal Sop due to user operation is inputted, the control unit 210 controls the stream reading unit 201, the system decoder 203, and the decoder 205 so as to perform reproduction of a desired stream in the multimedia bitstream recorded on the recording medium M.

To be specific, the stream reading unit 201 reads the multimedia bitstream Rs recorded on the recording medium M on the basis of the reading control signal Csr supplied from the control unit 210, and stores the multimedia bitstream Rs in the stream buffer 202. At this time, control data Stc such as sync information that is included in the stored stream is outputted from the stream buffer 202 to the control unit 210.

Next, the system decoder 203 obtains a designated stream Ps from the stream buffer 202 on the basis of the control signal Csd that designates a stream and is outputted from the control unit 210, and outputs the obtained stream Es to the video buffer 204, and simultaneously, outputs the reproduction time information Stm relating to the obtained designated stream Es to the control unit 210.

Then, the decoder 205 outputs an output request signal Srv to the video buffer 204 on the basis of the decoding control signal Cd supplied from the control unit 210, and decodes the buffer output stream Bs that is outputted from the video buffer 204 in response to the output request signal Srv to output decoded data Dd. The decoded data Dd is stored in the frame buffer 206. The frame buffer 206 outputs the decoded data Bd to a display unit (not shown) in appropriate display order.

When a system stream corresponding to one VOB and a system stream corresponding to another VOB are continuously reproduced according to a seamless reproduction flag included in the control data Stc outputted from the stream buffer 202, the system clock that is referred in the decoder 205 is switched from a system clock corresponding to the one VOB to a system clock corresponding to the other VOB at the joint portion of the system streams, on the basis of the reproduction time information Stm outputted from the system decoder 203, according to the seamless reproduction flag included in the control data Stc supplied from the stream buffer 202. The decoder 205 performs seamless reproduction of the bitstreams that are included in the system streams of the different VOBs.

FIGS. 28(a)-28(c) illustrate a reproduction method using a playlist (28(a)), an example of description of the playlist (28(b)), and an example of description of access information (28(c)).

In the reproduction using a playlist, as shown in FIG. 28(a), initially, portions of the stream to be reproduced and the reproduction order are determined on the basis of the playlist PL, and next, address positions of the determined reproduction portions are determined on the basis of the access information included in the playlist PL, and further, the reproduction portions of the stream are successively obtained from the determined address positions, and then decoded and reproduced.

The playlist (first data) PL designates which portions (indicated by such as playback start time and playback end time) of which streams (designated by such as a file name) STRM are reproduced in what order.

The access information (second data) AI is information for specifying the on-disk address positions of the reproduction portions that are designated by the playlist PL, and it includes, for example, a table on which the relationships between PTS (Presentation Time Stamps) of head pictures (decoding order) in random access units and address information are recorded.

The stream STRM is a stream in which coded data are packetized (e.g., packetized by TS (Transport) packets in a BD (Blu-ray Disk) or by PES (Packetized Elementary Stream) packets in a HDDVD (High Definition DVD)), or a coded stream in which coded data are not packetized.

More specifically, in the playlist PL, it is possible to indicate the connection condition (whether seamless connection is possible or not, or whether it is a switching point to multi-angle or not) between the respective items (individual reproduction units shown in the playlist).

Further, as for the access information AI, not only the relationships between the PTS and the addresses but also attribute information such as coding methods and frame rates of the streams can be indicated.

For example, there is an example of a playlist shown in FIG. 28(b) as follows:

```
playlist {
    item 1:     stream1.ts pts.in:0,pts_out:60
    item 2:     stream2.ts pts.in:30,pts_out:60
                item 1 and item 2: seamlessly connectable
    item 3:     stream3.ts pts.in:60,pts_out:90
                item 2 and item 3: seamlessly unconnectable
}
```

This playlist indicates that a portion of stream1.ts from 0 sec to 60 sec, a portion of stream2.ts from 30 sec to 60 sec, and a portion of stream3.ts from 60 sec to 90 sec are successively reproduced.

Further, there is an example of access information shown in FIG. 28(c) as follows:

```
access information for stream1.ts {
    attribute information {
        coding method: MPEG-4 AVC
        frame rate: 24Hz
        ...
    }
    access table for stream1.ts {
        pts:0 address:1000
        pts:5 address:1500
        ...
        pts:60 address:9000
    }
}
```

This access information indicates that the coding method for video in stream1.ts is MPEG-4 AVC, and data are obtained from 1000th byte to reproduce the video from 0 sec.

The access information is provided for each stream.

FIG. 29 is a diagram for explaining a format of playlists corresponding to BD-RE (Rewritable), and specifically, FIG. 29(a) shows the correspondences between playlists and reproduction portions designated by the playlists, FIG. 29(b) shows the description contents in a playlist, and FIG. 29(c) shows the description contents in a playitem.

In FIG. 29, C1~C3 denote clips, and each clip shows a set of access information and a stream, i.e., it collectively shows a stream and access information that is correlated with the stream. R1~R7 denote desired ranges in the clips C1~C3, respectively, which are desired to be reproduced by the user. MPL1~MPL4 denote playlists (Movie PlayList), and PI1~PI7 denote playitems (PlayItem).

In FIG. 29, Movie PlayList MPL1 includes PlayItem PI1 and PlayItem PI3, and PlayItem PI1 and PlayItem PI3 designate range R1 in Clip C1 and range R3 in Clip C2, respectively. Hereinafter, likewise, Movie PlayList MPL2 includes PlayItem PI2, and PlayItem PI2 designates range R2 in Clip C1. Movie PlayList MPL3 includes PlayItem PI5 and PlayItem PI7, and PlayItem PI5 and PlayItem PI7 designate range R5 in Clip C2 and range R7 in Clip C3, respectively. Movie PlayList MPL4 includes PlayItem PI4 and PlayItem PI6, and PlayItem PI4 and PlayItem PI6 designate range R4 in Clip C2 and range R6 in Clip C3, respectively.

The following description is a format of a playlist (refer to FIG. 29(b)).

```
PlayList( ) {
    ...
    number_of_PlayItems
    ...
    for (PlayItem_id=0;
         PlayItem_id<number_of_PlayItems
         PlayItem_id++) {
        PlayItem( )
    }
    ...
}
```

Here, number_of_PlayItems indicates the number of playitems constituting the playlist.

Further, the description part corresponding to

```
for (PlayItem_id=0;
     PlayItem_id<number_of_PlayItems
     PlayItem_id++) {
    PlayItem( )
}
``` is a table of a playitem.

Further, the following description is a format of the playitem included in the table of the playitem (refer to FIG. 29(c)).

```
PlayItem( ) {
    ...
    Clip_Information_file_name
    ...
    ...
    IN_time
    OUT_time
    ...
}
```

Here, Clip_Information_file_name indicates a file name of a file in which the access information is stored, IN_time indicates reproduction start PTS, and OUT_time indicates reproduction end PTS.

FIG. 30 is a diagram for explaining the clips shown in FIG. 29, and specifically, FIG. 30(a) shows the correspondences between playlists and reproduction portions in the clips, which are designated by the playlists, and FIG. 30(b) shows description contents of stream attribute information (Stream-CodingInfo) in access information.

Each of playlists MPL11~MPL13 comprises at least one item.

In FIG. 30, CI11 and CI12 denote access information (Clip Information), which are data required when performing random access to recorded AV streams.

Further, CAV11 and CAV12 denote streams (Clip AV streams) associated with the access information, and the recorded AV streams are stored therein.

Accordingly, for example, Clip Information CI1 in Clip C1 is designated by PlayItem PI11 in Movie Playlist MPL11, whereby a desired reproduction range R11 in Clip AV stream CAV11 is designated.

A format of stream attribute information (StreamCodingInfo (i,stream_index)) in the access information is as follows:

```
StreamCodingInfo(i,stream_index) {
    ...
    stream_coding_type
    ...
    ...
}
``` wherein stream_coding_type shows a coding method.
The inside of

```
{
    ...
    stream_coding_type
    ...
    ...
}
``` describes the stream attribute information in the access information (Clip Information).

When using the playlist defined as mentioned above, it is possible to perform reproduction with designating predetermined ranges in the clip (e.g., ranges R1~R7 shown in FIG. 29).

DISCLOSURE OF THE INVENTION

Problems to be Solved by the Invention

By the way, in recent years, large-capacity recording media such as the above-mentioned HD-DVD and BD have been proposed, or practically used. Such large-capacity recording media are admitted or being admitted to support plural codec methods in the respective standards. Therefore, it is considered that plural streams whose codec methods are different from each other are connected by edition and recorded as one contents in the recording media.

However, the conventional image reproduction apparatus 200 seamlessly reproduces streams corresponding to different VOBs of the same codec method. Therefore, the conventional image reproduction apparatus 200 cannot seamlessly reproduce a stream that is obtained by connecting plural streams of different codec types, which is recorded on the recording media as mentioned above.

The present invention is made to solve the above-mentioned problems and has for its object to provide an image reproduction method and an image reproduction apparatus that can seamlessly reproduce contents that is obtained by connecting plural streams of different codec methods.

Measures to Solve the Problems

According to the present invention, there is provided an image reproduction method for reproducing a connected stream which is obtained by connecting plural coded streams that are respectively coded by different codec methods, and the method comprises a position detection step of detecting a connection position of the coded streams in the connected stream, and a decoding step of decoding the individual coded streams of different codec methods in the connected stream, and the codec method is changed to a codec method corresponding to a coded stream that is a target of decoding, at the detected connection position of the coded streams, in the decoding step.

According to the present invention, in the above-described image reproduction method, in the decoding step, the connected stream is stored in a stream buffer, and the connected stream that is read from the stream buffer is decoded.

According to the present invention, in the above-described image reproduction method, in the decoding step, decoding of the connected stream is started when the occupied capacity of the stream buffer reaches a predetermined value.

According to the present invention, in the above-described image reproduction method, in the decoding step, decoded data that are obtained by decoding the connected stream are stored in a frame buffer.

According to the present invention, the above-described image reproduction method further includes a display step of image displaying the decoded data stored in the frame buffer, in chronological order from one having the oldest display time.

According to the present invention, in the above-described image reproduction method, in the display step, the decoded data are displayed with a delay equal to or larger than a delay time for a portion of the connected stream, which portion needs the largest delay when it is image displayed, on the basis of the decoding timing of the decoded data.

According to the present invention, in the above-described image reproduction method, in the display step, display delay times required when performing image display are determined according to the types of the codec methods corresponding to the respective coded streams included in the connected stream.

According to the present invention, in the above-described image reproduction method, in the display step, when a coded stream corresponding to an MPEG-4 AVC method is included in the connected stream, the image display is delayed by N frames or more, and when a coded stream corresponding to the MPEG-4 AVC method is not included in the connected stream, the image display is delayed by one frame or more.

According to the present invention, in the above-described image reproduction method, in the display step, the image display is always delayed by N frames or more.

According to the present invention, in the above-described image reproduction method, a display delay time of a preceding stream constituting the connected stream is increased.

According to the present invention, in the above-described image reproduction method, a period for decoding a preceding stream constituting the connected stream and a period for decoding a subsequent stream constituting the connected stream are partially overlapped.

According to the present invention, in the above-described image reproduction method, the operation of decoding a portion of a subsequent stream constituting the connected stream is increased in speed relative to the operation of decoding the other portion.

According to the present invention, in the above-described image reproduction method, the operation of decoding a portion of a preceding stream constituting the connected stream is increased in speed relative to the operation of decoding the other portion.

According to the present invention, in the above-described image reproduction method, display of a final display frame in a preceding stream constituting the connected stream is repeated.

According to the present invention, in the above-described image reproduction method, a predetermined frame is displayed between a final display frame in a preceding stream constituting the connected stream and a head display frame in a subsequent stream that follows the preceding stream.

According to the present invention, in the above-described image reproduction method, when a period for displaying a frame in a preceding stream and a period of displaying a frame in a subsequent stream are overlapped in the vicinity of a connection point between the preceding stream and the subsequent stream which constitute the connected stream, decoded data of either of the frame in the preceding stream or the frame in the subsequent stream, the display periods of which are overlapped, is discarded.

According to the present invention, in the above-described image reproduction method, when a period for displaying a frame in a preceding stream and a period of displaying a frame in a subsequent stream overlaps in the vicinity of a connection point between the preceding stream and the subsequent stream which constitute the connected stream, decoding of the subsequent stream is temporarily stopped after the preceding stream is decoded.

According to the present invention, there is provided an image reproduction apparatus for reproducing a connected stream which is obtained by connecting plural coded streams that are respectively coded by different codec methods, and the apparatus comprises a single stream buffer in which the inputted connected stream is stored, plural decoders corresponding to various kinds of codec methods, a decoder selection unit for selecting a decoder for decoding each coded stream in the connected stream that is outputted from the stream buffer, from among the plural decoders, according to the codec method of the coded stream, a single frame buffer in which image data obtained by decoding the coded streams are stored, and a display unit for displaying the image data outputted from the frame buffer.

According to the present invention, there is provided reproduction list data which designates plural reproduction portions to be reproduced in plural coded streams so that these portions are continuously reproduced, and the reproduction list data comprises first data indicating the plural reproduction portions in the plural coded streams and indicating the reproduction order of the plural reproduction portions, and second data for determining address positions of the reproduction portions that are determined by the first data, and the first data includes information indicating a connection position of the reproduction portions of different codec methods, or information indicating that the preceding and subsequent reproduction portions to be continuously reproduced have different frame display delay times.

According to the present invention, there is provided reproduction list data which designates plural reproduction portions to be reproduced in plural coded streams so that these portions are continuously reproduced, and the reproduction list data comprises first data indicating the plural reproduction portions in the plural coded streams and indicating the reproduction order of the plural reproduction portions, and second data for determining address positions of the reproduction portions that are determined by the first data, and the second data includes information indicating frame display delay amounts of the respective reproduction portions of different codec methods.

According to the present invention, there is provided an image reproduction method for continuously reproducing plural coded streams of different codec methods, on the basis of playlist information indicating a coded stream to be reproduced or a portion thereof, and the method comprises a position detection step of detecting a position where the codec method changes, and a decoding step of decoding the individual coded streams of different codec methods, and the codec method for decoding the coded stream is changed to a codec method corresponding to a coded stream that is a target of decoding, in the detected codec method changing position, in the decoding step.

According to the present invention, there is provided an image reproduction apparatus for continuously reproducing plural coded streams of different codec methods, on the basis of playlist information indicating a coded stream to be reproduced or a portion thereof, and the apparatus comprises a single stream buffer in which the inputted streams are stored, plural decoders corresponding to various kinds of codec methods, a decoder selection unit for selecting a decoder for decoding the coded stream outputted from the stream buffer, from among the plural decoders, according to the codec method of the coded stream, a single frame buffer in which image data obtained by decoding the coded streams are stored, and a display unit for displaying the image data outputted from the frame buffer.

Effects of the Invention

According to the present invention, an image reproduction method for reproducing a connected stream which is obtained by connecting plural coded streams that are respectively coded by different codec methods includes a step of detecting a connection position of the coded streams in the connected stream, and the individual coded streams are decoded with the codec methods being changed according to the detected connection position of the image coded streams. Therefore, it is possible to carry out seamless reproduction of a connected stream which is obtained by connecting plural coded streams that are respectively coded by different codec methods.

According to the present invention, in the above-described image reproduction method, the connected stream is stored in a stream buffer. Therefore, the buffer capacity of the stream buffer can be effectively utilized.

According to the present invention, in the above-described image reproduction method, decoding of the connected stream is started when the occupied capacity of the stream buffer reaches a predetermined value. Therefore, it is possible to avoid an underflow in the stream buffer.

According to the present invention, in the above-described image reproduction method, decoded data that are obtained by decoding the connected stream are stored in a frame buffer. Therefore, the buffer capacity of the frame buffer can be effectively utilized.

According to the present invention, in the above-described image reproduction method, the decoded data stored in the frame buffer are image displayed in chronological order from one having the oldest display time. Therefore, it is possible to perform accurate image display of the decoded data of the coded stream that is obtained by a predictive coding process using backward reference or the like.

According to the present invention, in the above-described image reproduction method, the decoded data are displayed with a delay equal to or larger than a delay time for a portion of the connected stream, which portion needs the largest delay when it is image displayed, on the basis of the decoding timing of the decoded data. Therefore, even when streams corresponding to plural kinds of codec methods are included in the connected stream, the decoded data can be image displayed without interruption.

According to the present invention, in the above-described image reproduction method, display delay times required when performing image display are determined according to the types of the codec methods corresponding to the respective coded streams included in the connected stream. Therefore, even when streams corresponding to plural kinds of codec methods are included in the connected stream, the decoded data can be image displayed without interruption, while avoiding excessive delay of image display.

According to the present invention, in the above-described image reproduction method, when a coded stream corresponding to an MPEG-4 AVC method is included in the connected stream, the image display is delayed by N frames or more, and when a coded stream corresponding to the MPEG-4 AVC method is not included in the connected stream, the image display is delayed by one frame or more. Therefore, even when a coded stream corresponding to the MPEG-4 AVC is included in the connected stream, the decoded data can be image displayed without interruption.

According to the present invention, in the above-described image reproduction method, the image display is always delayed by N frames or more. Therefore, even when a stream corresponding to the MPEG-4 AVC is included in the connected stream, the decoded data of the connected stream can be image displayed without interruption.

According to the present invention, in the above-described image reproduction method, a display delay time of a preceding stream constituting the connected stream is increased. Therefore, even when the display delay time of the preceding stream is smaller than the display delay time of the subsequent stream, the decoded data of the connected stream can be image displayed without interruption.

According to the present invention, in the above-described image reproduction method, a period for decoding a preceding stream constituting the connected stream and a period for decoding a subsequent stream constituting the connected stream are partially overlapped. Therefore, decoded data which fill a display gap that occurs when the above-mentioned periods are not overlapped are generated, whereby the decoded data of the connected stream can be image displayed without interruption.

According to the present invention, in the above-described image reproduction method, the operation of decoding a portion of a subsequent stream constituting the connected stream is increased in speed relative to the operation of decoding the other portion. Therefore, decoded data which fill a display gap that occurs when speedup is not performed are generated, whereby the decoded data of the connected stream can be image displayed without interruption.

According to the present invention, in the above-described image reproduction method, the operation of decoding a portion of a preceding stream constituting the connected stream is increased in speed relative to the operation of decoding the other portion. Therefore, decoded data which fill a display gap that occurs when speedup is not performed are generated, whereby the decoded data of the connected stream can be image displayed without interruption.

According to the present invention, in the above-described image reproduction method, display of a final display frame in a preceding stream constituting the connected stream is repeated. Therefore, a display gap can be filled by the repeated display, whereby the decoded data of the connected stream can be image displayed without interruption.

According to the present invention, in the above-described image reproduction method, a predetermined frame is displayed between a final display frame in a preceding stream constituting the connected stream and a head display frame in a subsequent stream that follows the preceding stream. Therefore, a display gap can be filled with the predetermined frame, whereby the decoded data of the connected stream can be image displayed without interruption.

According to the present invention, in the above-described image reproduction method, when a period for displaying a frame in a preceding stream and a period of displaying a frame in a subsequent stream are overlapped in the vicinity of a connection point between the preceding stream and the subsequent stream which constitute the connected stream, decoded data of either of the frame in the preceding stream or the frame in the subsequent stream, the display periods of which are overlapped, is discarded. Therefore, the decoded data of the connected stream can be image displayed without interruption, whereby overlapping of images can be avoided.

According to the present invention, in the above-described image reproduction method, when a period for displaying a frame in a preceding stream and a period of displaying a frame in a subsequent stream are overlapped in the vicinity of a connection point between the preceding stream and the subsequent stream which constitute the connected stream, decoding of the subsequent stream is temporarily stopped after the preceding stream is decoded. Therefore, the decoded data of the connected stream can be image displayed without interruption.

According to the present invention, an image reproduction apparatus for reproducing a connected stream which is obtained by connecting plural coded streams that are respectively coded by different codec methods includes a single stream buffer in which the inputted connected stream is stored, and plural decoders corresponding to various kinds of codec methods, and a decoder for decoding each coded stream in the connected stream that is outputted from the stream buffer is selected from among the plural decoders according to the codec method of the coded stream. Therefore, it is possible to perform seamless reproduction of a connected stream which is obtained by connecting plural coded streams that are respectively coded by different codec methods.

According to the present invention, reproduction list data which designates plural reproduction portions to be reproduced in plural coded streams so that these portions are continuously reproduced includes first data indicating the plural reproduction portions in the plural coded streams and indicating the reproduction order of the plural reproduction portions, and second data for determining address positions of the reproduction portions that are determined by the first data, and the first data includes information indicating a connection position of the reproduction portions of different codec methods, or information indicating that the preceding and subsequent reproduction portions to be continuously reproduced have different frame display delay times. Therefore, it is possible to perform seamless reproduction of a connected stream which is obtained by connecting desired portions of plural coded streams that are respectively coded by different codec methods.

According to the present invention, reproduction list data which designates plural reproduction portions to be reproduced in plural coded streams so that these portions are continuously reproduced includes first data indicating the plural reproduction portions in the plural coded streams and indicating the reproduction order of the plural reproduction portions, and second data for determining address positions of the reproduction portions that are determined by the first data, and the second data includes information indicating frame display delay amounts of the respective reproduction portions of different codec methods. Therefore, it is possible to perform seamless reproduction of a connected stream which is obtained by connecting desired portions of plural coded streams that are respectively coded by different codec methods.

According to the present invention, an image reproduction method for continuously reproducing plural coded streams of different codec methods on the basis of playlist information indicating a coded stream to be reproduced or a portion thereof includes a position detection step of detecting a position where the codec method changes, and a decoding step of decoding the respective coded streams of different codec methods, and the codec method for decoding the coded stream is changed to a codec method corresponding to a coded stream that is a target of decoding, at the detected codec method changing position, in the decoding step. Therefore, it is possible to perform seamless reproduction of a connected stream which is obtained by connecting desired portions of plural coded streams that are respectively coded by different codec methods.

According to the present invention, an image reproduction apparatus for continuously reproducing plural coded streams of different codec methods on the basis of playlist information indicating a coded stream to be reproduced or a portion thereof includes a single stream buffer in which the inputted streams are stored, plural decoders corresponding to various kinds of codec methods, a decoder selection unit for selecting a decoder for decoding the coded stream outputted from the stream buffer, from among the plural decoders, according to the codec method of the coded stream, a single frame buffer in which image data obtained by decoding the coded streams are stored, and a display unit for displaying the image data outputted from the frame buffer. Therefore, it is possible to perform seamless reproduction of a connected stream which is obtained by connecting desired portions of plural coded streams that are respectively coded by different codec methods.

BRIEF DESCRIPTION OF THE DRAWINGS

FIG. 5 is a diagram for explaining another example of seamless reproduction by the image reproduction apparatus 100 of the first embodiment (FIG. 5(b)), in contrast with an example of reproduction where display interruption occurs (FIG. 5(a)).

FIG. 9 is a diagram for explaining an example of seamless reproduction in the image reproduction apparatus 100a of the second embodiment (FIG. 9(b)), in contrast with an example of reproduction where display interruption occurs (FIG. 9(a)).

FIG. 14 is a diagram for explaining a display unit in the image reproduction apparatus 100c of the fourth embodiment, wherein

FIG. 17 is a diagram for explaining a display unit in the image reproduction apparatus 100d of the fifth embodiment, wherein

FIG. 18 is a diagram for explaining an example of seamless reproduction by the image reproduction apparatus 100d of the fifth embodiment (FIG. 18(b)), in contrast with an example of reproduction where display interruption occurs (FIG. 18(a)).

FIG. 24 is a diagram for explaining a playlist that is used in the image reproduction apparatus 100f of the seventh embodiment, illustrating a reproduction method using the playlist (FIG. 24(a)), description of the playlist (FIG. 24(b)), and description contents in access information (FIG. 24(c)).

FIG. 25 is a diagram for explaining a format of a playlist corresponding to BD-RE (Rewritable) that is used for the seventh embodiment, illustrating the correspondence between the playlist and a reproduction portion designated by the playlist (FIG. 25(a)), description contents in the playlist (FIG. 25(b)), and description contents in a playitem (FIG. 25(c)).

FIG. 26 is a diagram for explaining a clip shown in FIG. 25, illustrating the correspondence between the playlist and a reproduction portion designated by the playlist (FIG. 26(a)), and description contents of "StreamCodingInfo" corresponding to attribute information in the playlist (FIG. 26(b)).

FIG. 29 is a diagram for explaining a format of a playlist corresponding to BD-RE (Rewritable) that is used in the conventional image reproduction apparatus, illustrating the correspondence between the playlist and a reproduction portion designated by the playlist (FIG. 29(a)), description contents in the playlist (FIG. 29(b)), and description contents in a playitem (FIG. 29(c)).

FIG. 30 is a diagram for explaining a clip shown in FIG. 29, illustrating the correspondence between the playlist and a reproduction portion designated by the playlist (FIG. 30(a)), and description contents of "StreamCodingInfo" corresponding to attribute information in the playlist (FIG. 30(b)).

DESCRIPTION OF REFERENCE NUMERALS

Figure 1:
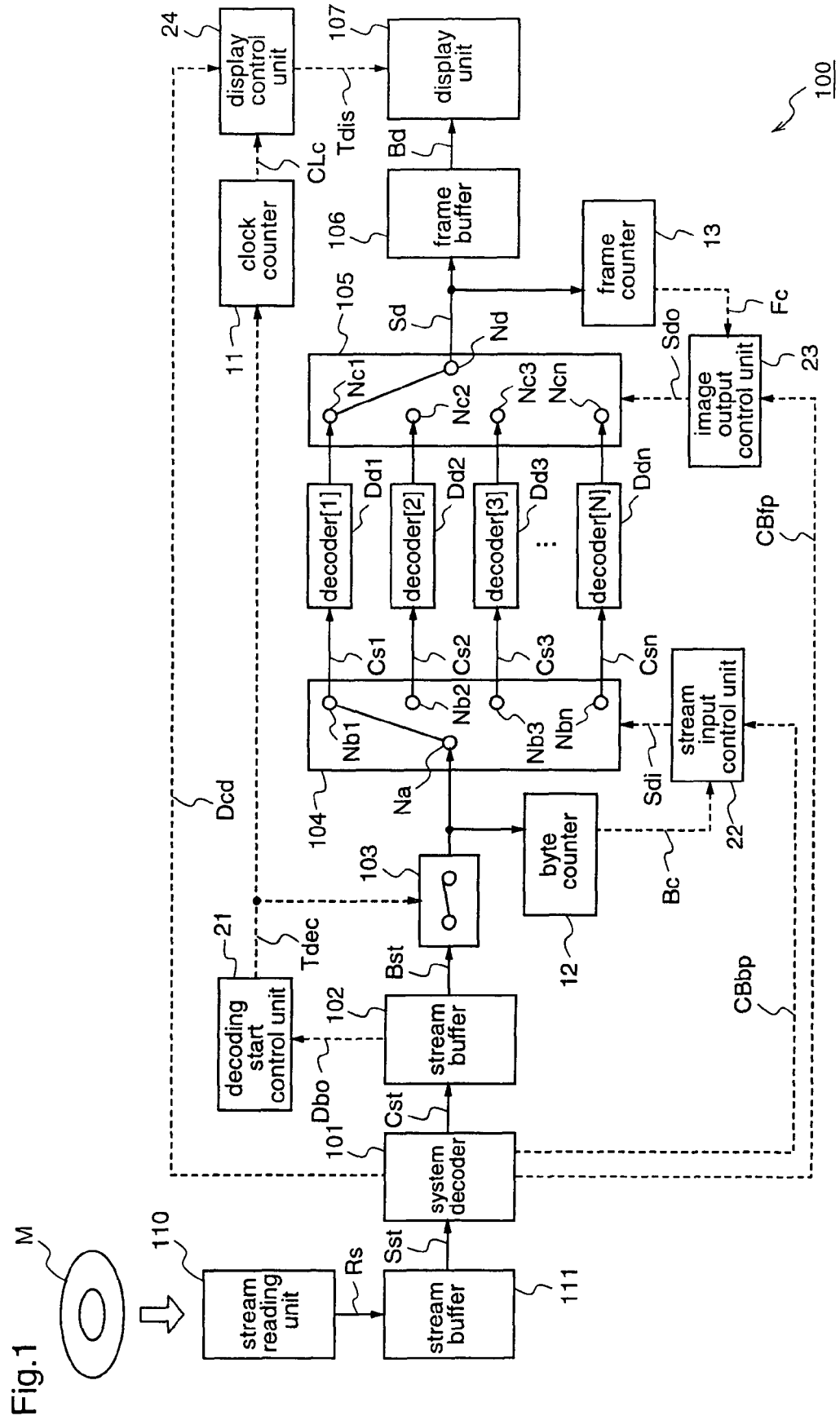
FIG. 1 is a diagram for explaining an image reproduction apparatus 100 according to a first embodiment of the present invention.

11 . . . clock counter
12 . . . byte counter
13 . . . frame counter
21 . . . decoding start control unit
22 . . . stream input control unit
23 . . . image output control unit
24, 24D . . . display control unit
100, 100a~100f . . . image reproduction apparatus
101, 101A~101C, 101D, 101E, 101F . . . system decoder
102, 102A, 102B, 111 . . . stream buffer
103 . . . open/close switch
104 . . . input side switch
105 . . . output side switch
106, 106E . . . frame buffer
107, 107C, 107D . . . display unit
107a . . . open/close switch
107b . . . display
107c . . . selection switch
107d . . . control unit
107e . . . frame buffer
107f . . . database
110, 110A, 110B . . . stream reading unit
120 . . . edition unit
130 . . . user interface
AI . . . access information
AIA . . . information added to access information
a1, a2 . . . node
Bc, CLc, Fc . . . count output
Bd . . . buffer output data
Bst . . . buffer output stream
C1, C2, C3 . . . clip
CBbp . . . codec boundary byte position information
CBfp . . . codec boundary frame position information
Chr . . . reading control signal
Csd . . . system decoder control signal
Cse . . . selection control signal
Cst . . . coded stream
c1 . . . first input node
c2 . . . second input node
c3 . . . output node
Dbo . . . buffer occupied capacity information
Dcd . . . codec information
Dd1, Dd2, Dd3, . . . Ddn, Dd1B, Dd2B, . . . , DdnB . . . decoder
Drd . . . reading information
M . . . recording medium
MPL1, MPL2, MPL3, MPL4 . . . movie playlist
P1, PI1, PI2, PI3, PI4, PI5, PI6, PI7 . . . playitem
PIA . . . information added to playitem
PL . . . playlist
PLA, PLB . . . information added to playlist
Sd . . . decoded data
Sdi . . . input-side switching control signal
Sdo . . . output-side switching control signal
Sst . . . system stream
Tdec . . . decoding start timing information
Tdis . . . display timing information

BEST MODE TO EXECUTE THE INVENTION

Hereinafter, embodiments of the present invention will be described.

Embodiment 1

FIG. 1 is a diagram for explaining an image reproduction apparatus according to a first embodiment of the present invention.

The image reproduction apparatus according to the first embodiment reproduces a connected stream that is obtained by connecting plural coded image streams whose codec methods are different from each other.

The image reproduction apparatus includes a stream reading unit 110 for reading a multimedia bitstream recorded on a recording medium M as a system stream Sst, a stream buffer 111 in which the system stream Sst read from the recording medium M is stored, a system decoder 101 for reading the system stream Sst from the stream buffer 111 and extracting auxiliary information CBbp, CBfp, and Dcd as well as a coded stream Cst which are included in the system stream Sst, and a single stream buffer 102 in which the coded stream Cst outputted from the system decoder 101 is stored. In this first embodiment, VOB streams corresponding to various kinds of codec methods are read as system streams Sst from a recording medium such as an HD, a DVD, or a BD which supports the plural codec methods, and a connected stream that is obtained by connecting plural coded image streams of different codec methods is outputted as a coded stream Cst from the system decoder 101. For example, it is assumed that the connected stream is obtained by connecting a coded image stream corresponding to MPEG-2, and a coded image stream corresponding to MPEG-4 AVC (Advanced Video Coding). However, the codec method is not restricted to the MPEG-2 and the MPEG-4 AVC.

The image reproduction apparatus 100 further includes plural decoders [1]Dd1~[N]Ddn corresponding to the various codec methods, a decoder selection unit for selecting, from the plural decoders, a decoder for decoding a stream Bst outputted from the stream buffer 102 so that the stream of each codec method is decoded by the corresponding decoder, a single frame buffer 106 in which image data Sd that is obtained by decoding with the selected decoder is stored, and a display unit 107 for displaying image data Bd outputted from the frame buffer 106.

It is assumed that the decoder Dd1 corresponds to the MPEG-2 codec method, and the decoder Dd2 corresponds to the MPEG-4 AVC codec method.

Further, the decoder selection unit includes an input-side switch 104 which is provided before the plural decoders Dd1~Ddn, and supplies the stream of each codec method that is read from the stream buffer 102 to any of the plural decoders on the basis of a decoder input switching signal Sdi, and an output-side switch 105 which is provided after the plural decoders Dd1~Ddn, and selects any of the decoder outputs on the basis of a decoder output switching signal Sdo, and supplies it to the frame buffer 106. The input-side switch 104 has one input node Na and plural output nodes Nb1~Nbn, and changes the connection between the input node Na and the plural output nodes Nb1~Nbn according to the input-side switching control signal Sdi. The output-side switch 105 has plural input nodes Nc1~Ncn and one output node Nd, and changes the connection between the plural input nodes Nc1. Ncn and the one output node Nd according to the output-side switching control signal Sdo. Further, the input nodes of the decoders Dd1~Ddn are connected to the output nodes Nb1~Nbn of the input-side switch 104, respectively, and the output nodes of the decoders Dd1~Ddn are connected to the input nodes Nc1~Ncn of the output-side switch 105, respectively.

The image reproduction apparatus 100 further includes a decoding start control unit 21 which outputs information Tdec indicating a decoding start timing on the basis of a buffer occupied capacity Dbo of the stream buffer 102, a switch 103 which is disposed between the stream buffer 102 and the input-side switch 104, and is opened and closed on the basis of the decoding start timing information Tdec, a clock counter 11 which performs a counting operation on the basis of the decoding start timing information Tdec to output a counter output CLc, and a display control unit 24 which outputs information Tdis indicating a display timing to the display unit 107 on the basis of the codec information Dcd supplied from the system decoder 101 and the output CLc from the clock counter 11. The open/close switch 103 is turned on so that decoding of the coded stream is carried out, when the occupied capacity of the stream buffer 102 reaches a predetermined value, e.g., a maximum value. The clock counter 11 resets the counter output CLc when inputting of the stream to the decoder is started. The display control unit 24 determines a display delay for the entirety of the connected stream according to the codec methods of the streams included in the connected stream, and outputs a display timing information Tdis corresponding to the determined display delay.

The image reproduction apparatus 100 further includes a byte counter 12 which counts the number of bytes in the stream that is supplied from the stream buffer 102 to the decoder, on the basis of the buffer output stream Bst from the open/close switch 103, and outputs a count output Bs, and a stream input control unit 22 which outputs an input-side switching control signal Sdi to the input-side switch 104 on the basis of information CBbp indicating a codec boundary byte position, which is outputted from the system decoder 101, and the count output Bc of the byte counter 12.

The image reproduction apparatus 100 further includes a frame counter 13 which counts the number of frames in the decoded data Sd stored in the frame buffer 106, on the basis of the decoded data Sd supplied from the output-side switch 105, and outputs a count output Fc, and an image output control unit 23 which outputs an output-side switching control signal Sdo to the output-side switch 105 on the basis of information CBfp indicating a codec boundary frame position, which is outputted from the system decoder 101, and the count output Fc of the frame counter 13.

Figure 2:
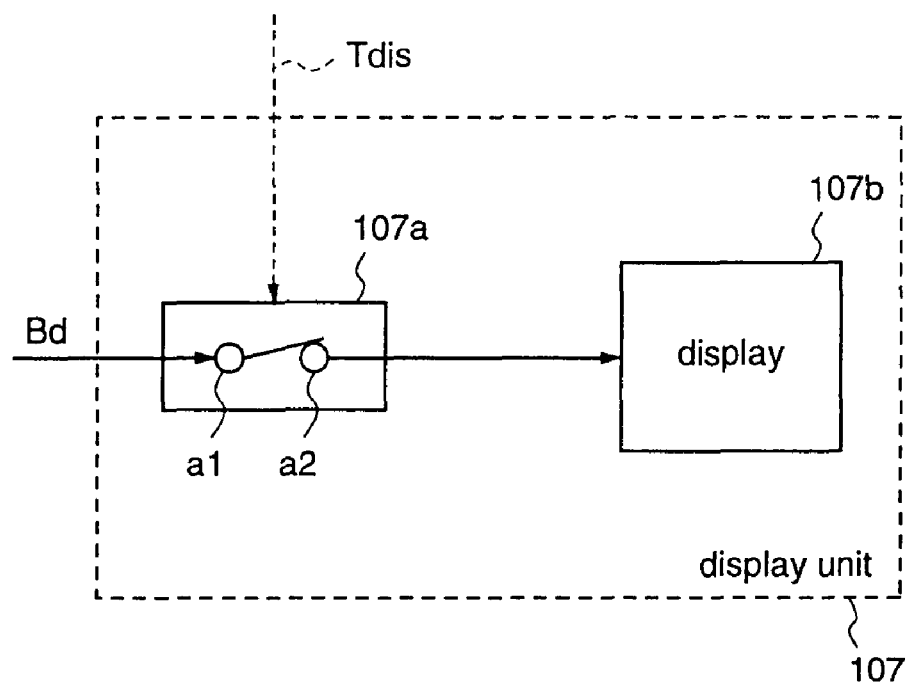
FIG. 2 is a block diagram for explaining a display unit in the image reproduction apparatus 100 according to the first embodiment.

FIG. 2 is a diagram for explaining the display unit 107 of the image reproduction apparatus 100 according to the first embodiment.

The display unit 107 includes an open/close switch 107a which has an input node a1 and an output node a2, and performs switching between a conduction state where the input node a1 and the output node a2 are connected, and a non-conduction state where the input node a1 and the output node a2 are not connected, on the basis of the display timing information Tdis supplied from the display control unit 24, and a display 107b which displays the decoded data that is outputted from the output node a2 of the open/close switch 107a.

Next, the operation will be described.

In the image reproduction apparatus 100, the stream Rs is read by the stream reading unit 110 from the recording medium M such as a HD, a DVD, or a BD that supports plural codecs, and inputted to the stream buffer 111. When the stream storage amount in the stream buffer 111 reaches a predetermined value, the stream Rs stored in the stream buffer 111 is outputted as a system stream Sst in the order of inputting the same to the buffer 111. When the system stream Sst is inputted to the system decoder 101, the system decoder 101 extracts and outputs the auxiliary information such as the codec boundary byte position information CBbp, the codec boundary frame position information CBfp, and the codec information Dcd, as well as the coded stream Cst, which are included in the system stream Sst. At this time, the codec boundary byte position information CBbp is supplied to the stream input control unit 22, the codec boundary frame position information CBfp is supplied to the image output control unit 23, and the codec information Dcd is supplied to the display control unit 24. Further, the coded stream Cst outputted from the system decoder 101 is supplied to the stream buffer 102 and stored.

The coded stream Cst includes a connected stream that is obtained by connecting plural coded image streams of different codec methods. However, in order to simplify the description, it is assumed that the different kinds of codec methods are the MPEG-2 method and the MPEG-AVC method. Accordingly, it is assumed that the coded stream Cst includes two streams of different codec methods, that is, one is coded image data that is obtained by coding image data of one image sequence by the MPEG-2 codec method, while the other is coded image data that is obtained by coding image data of another image sequence by the MPEG-4 AVC codec method.

When the occupied capacity of the stream buffer 102 reaches a predetermined value, e.g., when the stream buffer 102 is full of data, the decoding start control unit 21 outputs the decoding start timing information Tdec to the open/close switch 103 and the clock counter 11, on the basis of the buffer occupied capacity information supplied from the stream buffer 102.

Then, the open/close switch 103 is turned on, and the coded stream Bst that is stored in the stream buffer 102 is read out. At this time, the byte counter 12 counts the number of bytes in the coded stream Bst that is read from the stream buffer 102, and outputs the count output Bs to the stream input control unit 22.

In the stream input control unit 22, a boundary position of the two streams of different codecs is detected on the basis of the count output Bc and the codec boundary byte position information CBbp, and the connection between the one input node Na and the plural output nodes Nb1~Nbn is changed at the timing corresponding to this stream boundary position.

The stream corresponding to each codec method in the connected stream, which is outputted from the input-side switch 104, is decoded by the corresponding decoder. The decoded data obtained by this decoding is outputted to the output-side switch 105. For example, when the stream that is prior to the codec boundary position in the connected stream corresponds to the MPEG-2 codec method while the stream that is subsequent to the codec boundary position in the connected stream corresponds to the MPEG-4 AVC codec method, the input-side switch 104 switches the connection of the input node Na and the output node Nb1 to the connection of the input node Na and the output node Nb2 at the timing corresponding to the codec boundary position. Thereby, decoding of the stream based on the MPEG-4 AVC codec method by the decoder Dd2 is started upon completion of the decoding of the stream based on the MPEG-2 codec method by the decoder Dd1.

Further, the frame counter 13 counts the number of frames in the decoded data Sd that is outputted from the output-side switch 105, and outputs the count output Fc to the image output control unit 23. The image output control unit 23 detects a frame boundary position of the two decoded data of the different codec methods, on the basis of the count output Fc and the codec boundary frame position information CBfp, and changes the connection between the plural input nodes Nc1~Ncn and the one output node Nd at the timing corresponding to the frame boundary position.

For example, when the stream prior to the coded boundary position in the connected stream corresponds to the MPEG-2 codec method while the stream subsequent to the codec boundary position in the connected stream corresponds to the MPEG-4 AVC codec method, the output-side switch 105 switches the connection of the input node Nc1 and the output node Nd to the connection of the input node Nc2 and the output node Nd, at the timing corresponding to the codec boundary frame position. Thereby, in the output-side switch 105, outputting of the decoded data that is obtained by decoding the stream of the MPEG-4 AVC codec method by the decoder Dd2 is started upon completion of outputting of the decoded data that is obtained by decoding the stream of the MPEG-2 codec method by the decoder Dd1 is completed.

Then, the decoded data Sd outputted from the output-side switch 105 is stored in the frame buffer 106. The frame buffer 106 rearranges the decoded data Sd in the display order corresponding to the respective codecs, and outputs the buffer output data Bd to the display unit 107. The display control unit 24 generates information Tdis indicating the display timing on the basis of the count output CLc of the clock counter 11 and the codec information Dcd supplied from the system decoder 101, and the display unit 107 displays the decoded data of the stream corresponding to each codec method, at the display timing corresponding to each codec method, on the basis of the display timing information Tdis.

To be specific, in the display unit 107, the open/close switch 107a is turned on at the timing indicated by the display timing information Tdis, and the data of the frame having the oldest display time, among the data of the undisplayed decoded frames that are stored in the frame buffer 106, is outputted to the display 107. At this time, the display control unit 24 uniformly delays the timings to display the images of the respective frames in the connected stream, with respect to the decoding timings of the streams corresponding to the respective frames, according to the types of the codec methods of the respective streams included in the connected stream. In this first embodiment, however, in order to simplify the description, it is assumed that, when the timing to display the image of each frame is not delayed, i.e., when the display delay is 0 frame, the image display timing of one frame matches the timing to decode the stream of the frame that follows the one frame.

Figure 3A:
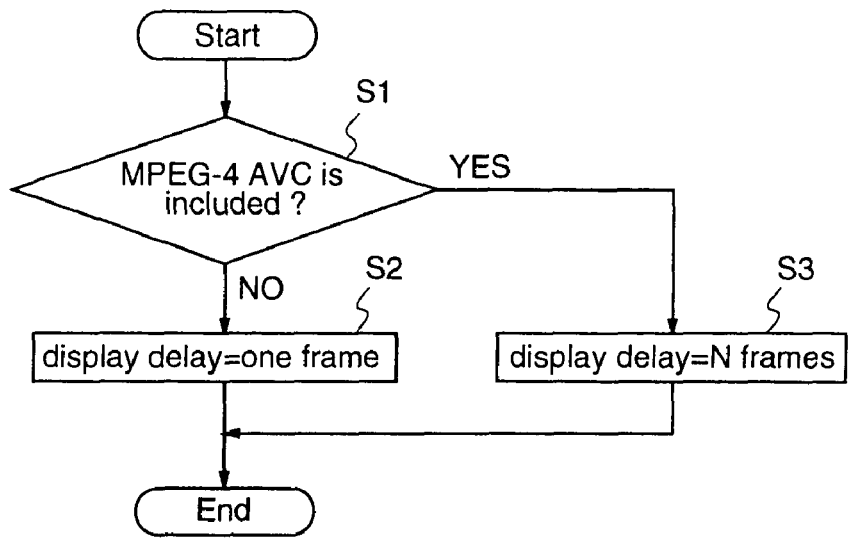
FIG. 3 is a diagram for explaining an example of operation for determining a delay time required when performing image display in the image reproduction apparatus 100 of the first embodiment (FIG. 3(a)), and another example thereof (FIG. 3(b)).

FIG. 3(a) shows an example of a process for determining how many frames should be delayed with respect to the display timings of the respective frames.

The display control unit 24 judges whether the connected stream Cst that is extracted from the system decoder 101 includes a stream corresponding to the MPEG-4 AVC codec method or not, on the basis of the codec information Dcd supplied from the system decoder 101 (step S1). When it is judged that the connected stream Cst does not include the stream corresponding to the MPEG-4 AVC codec method, the display control unit 24 determines the delay time for the display timing of each frame, to a period corresponding to one frame (step S2). On the other hand, when it is judged in step S1 that the connected stream Cst includes the stream corresponding to the MPEG-4 AVC codec method, the display control unit 24 determines the delay time of the display timing of each frame, to a period corresponding to N frames (step S3).

FIG. 4 is a diagram for specifically explaining the delay of the display timing in the case where the coded stream M4 corresponding to the MPEG-4 AVC codec method is connected after the coded stream M2 corresponding to the MPEG-2 codec method. FIG. 4 shows the case where, when N=2, i.e., when reproducing the coded stream of the MPEG-4 AVC codec method, it is necessary to delay the display timing by two frames.

Figure 4A:
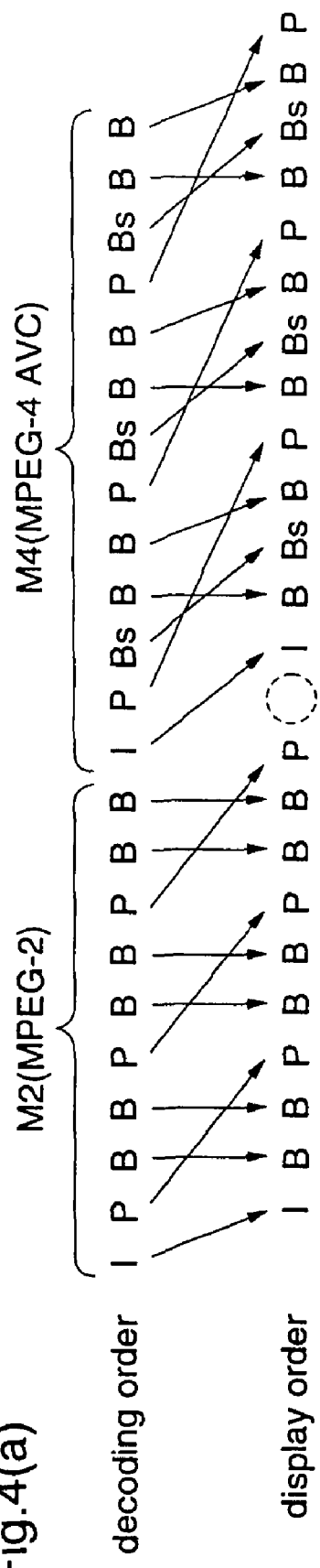
FIG. 4 is a diagram for explaining an example of seamless reproduction by the image reproduction apparatus 100 of the first embodiment (FIG. 4(b)), in contrast with an example of reproduction where display interruption occurs (FIG. 4(a)).
Figure 4B:
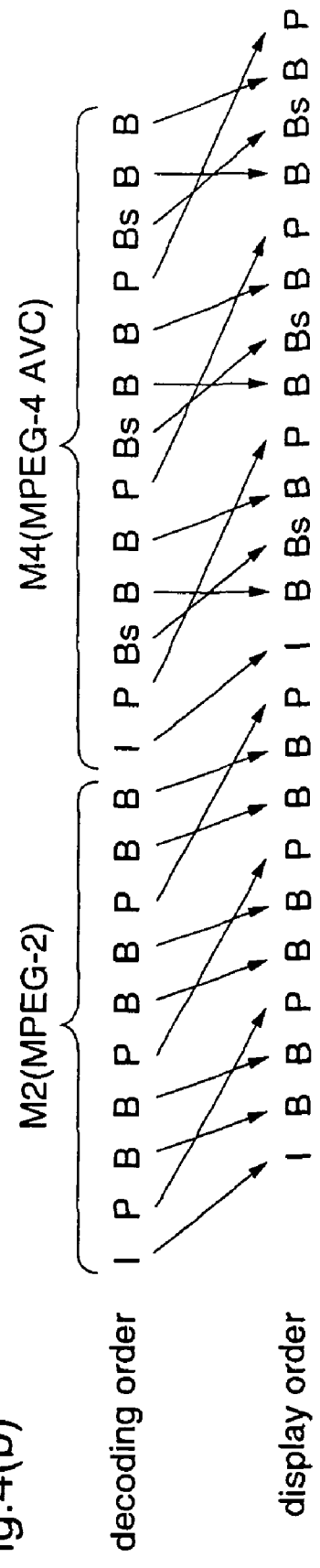

FIG. 4(a) shows the case where the display delay time corresponds to one frame, and FIG. 4(b) shows the case where the display delay time corresponds to N(=2) frames.

For example, the coded stream M2 of the MPEG-2 codec method includes streams corresponding to I frames, P frames, and B frames, and the decoding order of the streams is I,P,B, B,P,B,B,P,B,B, as shown in FIG. 4(a). In this case, since a B frame is subjected to predictive coding with reference to a P frame that is positioned posterior to the B frame in the display order, the stream of the P frame is decoded prior to the stream of the B frame that refers to the P frame, and therefore, the display timing of each frame is delayed by one-frame period.

However, when the stream of the MPEG-4 AVC codec method is connected to the stream of the MPEG-2 codec method, delaying the display timing of each frame by only one-frame period causes interruption of display at the portion where the codec method of the connected stream changes from the MPEG-2 method to the MPEG-4 AVC method, as shown by a dotted circle in FIG. 4(a).

That is, the coded stream M4 corresponding to the MPEG-4 AVC codec method includes the streams corresponding to I frames, P frames, B frames, and Bs (stored B) frames, and the decoding order of the streams is I,P,Bs,B,B, P,Bs,B,B,P,Bs,B,B as shown in FIG. 4(a). A Bs frame is a frame to be referred to when coding another B frame. Therefore, the stream of the Bs frame must be decoded prior to the stream of the B frame that refers to the Ba frame, and thereby the display timing of each frame is delayed by two-frame period. Accordingly, when the decoded data of the stream M4 of the MPEG-4 AVC codec method is displayed with a delay of one-frame period that corresponds to the MPEG-2 codec method, there exists no data to be reproduced at the portion where the codec method changes, and thereby display is interrupted.

So, it is judged whether the stream corresponding to the MPEG-4 AVC codec method is included in the connected stream or not, and when the stream of the MPEG-4 AVC codec method is included, the display delay times of the respective frames are uniformly determined to two-frame periods as shown in FIG. 4(b) when reproducing the connected stream, thereby preventing the display from being interrupted in the portion where the codec method changes.

FIG. 5 is a diagram for specifically explaining the delay of the display timing in the case where a coded stream M4a corresponding to the MPEG-4 AVC codec method is connected after a coded stream M2 corresponding to the MPEG-2 codec method. FIG. 5 shows the case where N=3, i.e., the display timing of the stream corresponding to the MPEG-2 codec method should be delayed by three frames when decoding the coded stream M4a of the MPEG-4 AVC codec method.

FIG. 5(a) shows the case where the display delay time corresponds to one frame, and FIG. 5(b) shows the case where the display delay time corresponds to N(=3) frames.

For example, the coded stream M2 of the MPEG-2 codec method includes streams corresponding to I frames, P frames, and B frames as described above, and the decoding order of the streams is I,P,B,B,P,B,B,P,B,B as shown in FIG. 5(a). In this case, since a B frame is subjected to predictive coding with reference to a P frame that is positioned posterior to the B frame in display order, the stream of the P frame is decoded prior to the stream of the B frame that refers to the P frame, and thereby the display timing of each frame is delayed by one-frame period.

However, when the stream M4a of the MPEG-4 AVC codec method is connected to the stream M2 of the MPEG-2 codec method, delaying the display timing of each frame by only one-frame period causes absence of data to be reproduced at the portion where the codec method of the connected stream changes from the MPEG-2 method to the MPEG-4 AVC method, as shown by a dotted circle in FIG. 5(a), leading to interruption of display by two frames.

That is, the stream M4a of the MPEG-4 AVC codec method includes the streams corresponding to I frames, P frames, B frames, and Bs frames, and the decoding order of the streams is I,P,Bs,Bs,B,B,B,P,Bs,Bs,B,B,B as shown in FIG. 5(a). Here, a Bs frame is a frame to be referred to when coding another B frame. Therefore, the stream of the Bs frame must be decoded prior to the stream of the B frame that refers to the Ba frame, and thereby the display timing of each frame is delayed by three-frame period. Accordingly, when the decoded data of the coded stream M4a of the MPEG-4 AVC codec method is displayed with a delay of one-frame period that corresponds to the MPEG-2 codec method, display is undesirably interrupted for two frames at the portion where the codec method changes.

So, it is judged whether the stream M4a corresponding to the MPEG-4 AVC codec method is included in the connected stream or not, and when the coded stream M4a of the MPEG-4 AVC codec method is included, the display delay time is determined to three-frame period as shown in FIG. 5(b) when reproducing the connected stream, thereby preventing the display from being interrupted at the portion where the codec method changes.

As described above, according to the first embodiment, the image reproduction apparatus 100 for reproducing a connected stream that is obtained by connecting plural streams as coded image data corresponding to two kinds of codec methods includes the stream buffer 102 in which the connected stream Cst is stored, and the plural decoders Dd1~Ddn corresponding to the various codec methods, and a decoder for decoding each coded image stream in the connected stream Bst that is outputted from the stream buffer 102 is selected from among the plural decoders according to the codec method of each coded image stream. Therefore, it is possible to realize seamless reproduction of contents that is obtained by connecting plural streams of different codec methods.

Further, in this first embodiment, since the connected stream Cst is stored in one buffer stream 102, and the respective streams are sequentially read from the stream buffer 102 and decoded. Therefore, the buffer capacity of the stream buffer 102 can be effectively utilized.

Further, in this first embodiment, since the decoding of the stream is started when the occupied capacity of the stream buffer 102 reaches a predetermined value, it is possible to prevent an underflow in the stream buffer 102.

Further, in this first embodiment, since the decoded data obtained by decoding the above-mentioned streams are stored in the single frame buffer 106, the buffer capacity of the frame buffer 106 can be effectively utilized.

Further, in this first embodiment, since the decoded data stored in the frame buffer 106 are successively displayed beginning with one having the oldest display time, it is possible to accurately reproduce the image data that has been subjected to predictive coding using backward reference or the like.

Further, in this first embodiment, since the decoded data are displayed with a delay which is equal to or larger than the delay time of a stream that requires the largest delay among the streams corresponding to the respective codec methods in the connected stream, with respect to the decoding timings of the decoded data. Therefore, even when the streams corresponding to plural kinds of code methods are included in the connected stream, the decoded data can be reproduced without interruption.

Further, in this first embodiment, the delay time for displaying the decoded data is determined according to the type of the codec method of each stream that is included in the connected stream Cst. Therefore, even when plural streams of different codec methods are included in the connected stream, the decoded data can be reproduced without interruption.

Further, in this first embodiment, the delay time required when displaying the coded data is determined to a time required for display of N (N≧2) frames when the stream of the MPEG-4 AVC codec method is included in the connected stream Cst, while the delay time required when displaying the decoded data is determined to a time required for display of at least one frame when the stream of the MPEG-4 AVC codec method is not included in the connected stream Cst. Therefore, even when the stream of the MPEG-4 AVC codec method is included in the connected stream, the decoded data can be reproduced without interruption.

Further, in this first embodiment, since the delay time required when displaying the decoded data is always determined to a time that is required for display of at least N(N=2) frames, even when the stream of the MPEG-4 AVC codec method is included in the connected stream, the decoded data can be reproduced while reliably avoiding interruption of display.

In this first embodiment, the display control unit 24 determines the delay time of the display timing of each frame to either the time corresponding to one frame or the time corresponding to N(N≧2) frames according to whether the connected stream Cst includes the stream of the MPEG-4 AVC codec method or not. However, the process of determining the delay time of the display timing of each frame by the display control unit 24 is not restricted thereto.

Figure 3B:
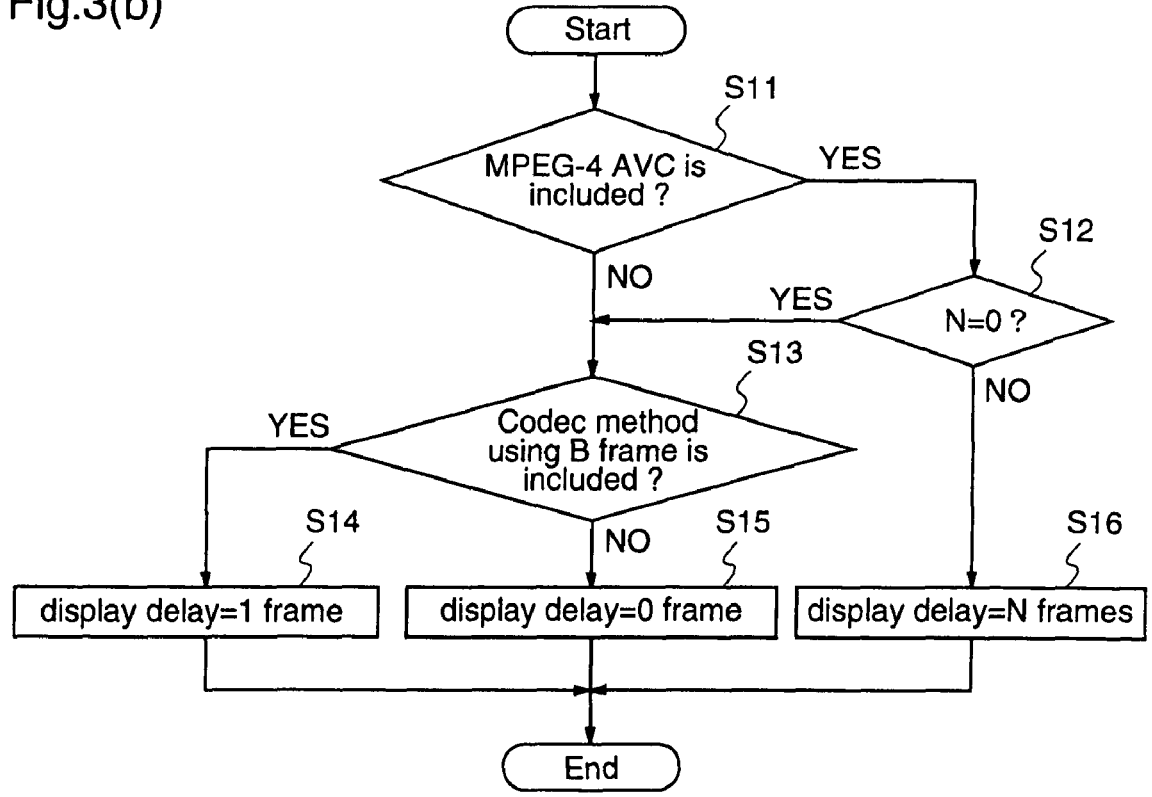

For example, FIG. 3(b) shows another process of determining how many frames the display timing of each frame is to be delayed with the display control unit 24.

In this example, the display control unit 24 judges whether the connected stream Cst extracted from the system decoder 101 includes the stream of the MPEG-4 AVC codec method or not, on the basis of the codec information Dcd from the system decoder 101 (step S11). When the result of judgment is that the connected stream Cst does not include the stream of the MPEG-4 AVC codec method, the display control unit 24 judges whether the connected stream Cst includes a stream of a codec method that uses B frames or not, on the basis of the codec information Dcd (step S13). When it is judged in step S13 that the connected stream Cst includes a stream of the codec method using B frames, the delay time of the display timing of each frame is determined to a time corresponding to one frame (step S14). On the other hand, when it is judged in step S13 that the connected stream Cst does not include a stream of the codec method using B frames, the delay time of the display timing of each frame is determined to a time corresponding to 0 frame, that is, the delay time upon image display is determined to 0 (step S15).

Further, when it is judged in step S11 that the connected stream Cst includes a stream of the MPEG-4 AVC codec method, the display control unit 24 judges whether it is necessary to delay the display timing (N≠0) or not (N=0) when reproducing the stream of the MPEG-4 AVC codec method (step S12). When the result of judgment in step S12 is that N is not 0, the display control unit 24 determines the delay time of the display timing of each frame to a time corresponding to N frames (step S16). When N=0, the display control unit 24 performs the processes in steps S13~S15 to determine the delay time upon image display.

Embodiment 2

Figure 6:
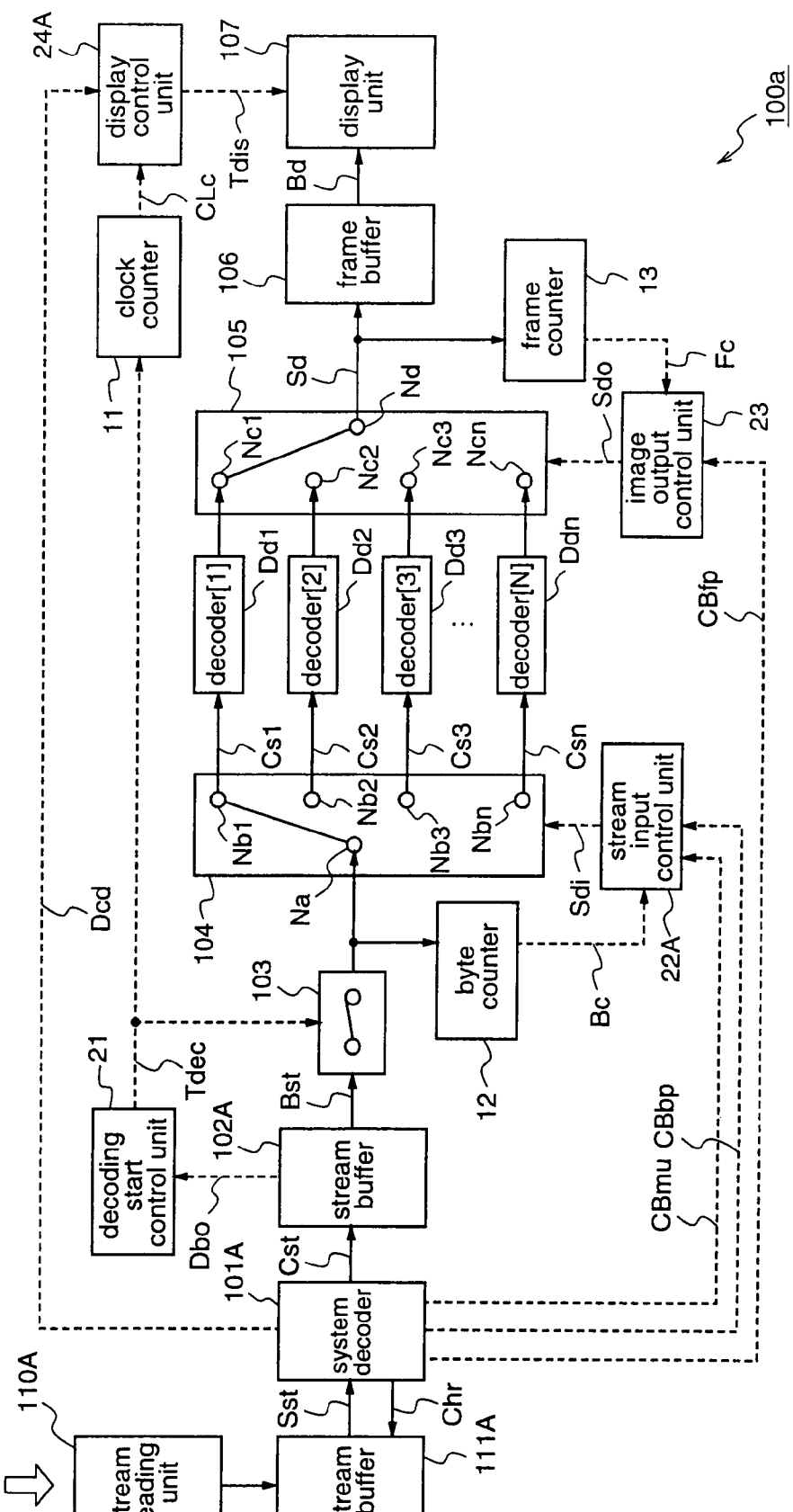
FIG. 6 is a diagram for explaining an image reproduction apparatus 10a according to a second embodiment of the present invention.

FIG. 6 is a diagram for explaining an image reproduction apparatus according to a second embodiment of the present invention.

In the image reproduction apparatus 100a according to the second embodiment, a rear end portion of a preceding stream in a connected stream that is obtained by connecting two streams of different codec methods, and a head portion of a subsequent stream in the connected stream are decoded in parallel with each other, whereby the connected two streams of different codec methods can be reproduced seamlessly without interruption of display.

Although the construction of the image reproduction apparatus 100a according to the second embodiment is fundamentally identical to that of the first embodiment, a stream buffer 111A, a system decoder 101A, a stream buffer 102A, a stream input control unit 22A, and a display control unit 24A according to the second embodiment are different in their operations from those of the first embodiment.

To be specific, the stream buffer 111A disposed before the system decoder 101A has a larger buffer capacity than that of the first embodiment, and it can output stored system streams Sst randomly at high speed according to a control signal Shr supplied from the system decoder 101A. More specifically, several frames before and after the joint portion of the two streams of different codec methods are outputted at high speed on the basis of the control signal Chr from the system decoder 101A.

The control circuit Chr includes information indicating the boundary position of the preceding and subsequent streams of different codec methods, and information indicating how many frames of display gap exists between the final display frame in the preceding stream and the head display frame in the subsequent stream.

The system decoder 101A extracts the auxiliary information CBbp, CBfp, Dcd, and the coded stream Cst from the system stream Sst that is read from the stream buffer 111A, and outputs the control signal Chu to the stream buffer 111A, and multiplexes the rear end portion of the preceding stream which is outputted at high speed and the head portion of the subsequent stream which is outputted at high speed, to output the multiplexed stream to the subsequent stream buffer 102A.

The system decoder 101A is constituted so as to be capable of buffering the subsequent stream during decoding of the preceding stream, and decoding both the preceding stream and the subsequent stream simultaneously. Since, in the system decoder 110A, prereading of the streams stored in the stream buffer 101A is thus required, the capacity of the stream buffer provided before the system decoder 110A is set larger than that of the first embodiment.

In this case, a system decoder for audio streams (not shown) is also provided with a stream buffer for prereading.

Further, the system decoder 101A outputs multiplexing information CBmu indicating how the rear end portion of the preceding stream and the head portion of the subsequent stream are multiplexed, to the stream input control unit 22A.

The stream buffer 102A holds the coded streams Cst outputted from the system decoder 101A, and successively outputs the stored streams. The stream buffer 102A outputs the stored streams at a bit rate that matches the bit rate at which the streams are inputted to the buffer 102A.

The stream input control unit 22A outputs the input side switching control signal Sdi to the input side switch 104, on the basis of the codec boundary byte position information CBbp and the multiplexing information CBmu that are supplied from the system decoder 101A, and the count output Bc supplied from the byte counter 12. The input side switch 104 changes the connection between the input node and the output node on the basis of the input side switching control signal Sdi so that the MPEG2 corresponding portion of the output stream Bst supplied from the stream buffer 102A is inputted to the decoder [1]Dd1 and the MPEG-4 AVC corresponding portion of the output stream Bst is inputted to the decoder [2]Dd2.

Further, while the display control unit 24 of the first embodiment determines the display delay to the entirety of the connected stream according to the codec methods of the streams included in the connected stream, and outputs the display timing information Tdis corresponding to the determined display delay, the display control unit 24A of this second embodiment outputs the display timing information Tdis indicating the display timings according to the streams of the respective codec methods.

Next, the operation will be described.

The operation of the image reproduction apparatus 100a according to the second embodiment is different from the operation of the first embodiment in that the system decoder 101A reads several frames before and after the joint portion of the streams of different codec methods at high speed by random access from the stream buffer 111A that is disposed before the system decoder 101A, and decodes the rear end portion of the preceding stream and the head portion of the subsequent stream in parallel with each other, and therefore, this point will be mainly described hereinafter.

The connected stream obtained by connecting plural streams of different codec methods is read by the stream reading unit 110A, and stored in the stream buffer 111A. When the amount of the stored stream in the stream buffer 111A exceeds a predetermined value, the system decoder 101A reads the connected stream as the system stream Sst from the stream buffer 111A, and extracts the auxiliary information CBbp, CBfp, Dcd, and the coded stream Cst from the system stream Sst. Further, at this time, the system decoder 101A detects the boundary position of the preceding and subsequent streams of different codec methods in the connected stream, and the size of the display gap between the final frame in the preceding stream and the head frame in the subsequent stream, on the basis of the auxiliary information included in the header portion of the system stream, and outputs a control signal Chu including the information indicating the stream boundary portion and the information indicating the size of the display gap, to the stream buffer 111A.

Then, the stream buffer 111A changes the process of outputting the connected stream in the inputting order at normal speed to the process of outputting the connected stream by random access at high speed, at the timing corresponding to the size of the display gap. In this high-speed outputting process, several frames before and after the stream boundary in the connected stream are outputted at high speed from the stream buffer 111A to the system decoder 101A.

When the rear end portion of the preceding stream and the head portion of the subsequent stream which are outputted at high speed from the stream buffer 111A are inputted to the system decoder 101A, the system decoder 101A multiplexes these portions of the streams of different codec methods, which are outputted at high speed, and outputs the multiplexed stream to the stream buffer 102A.

In the stream buffer 102A, the stream Cst outputted from the system decoder 101A is sequentially stored, and when the amount of the stored stream exceeds a predetermined value, the stored stream is outputted in order of inputting at the same rate as the inputting rate. That is, the stream that is inputted to the stream buffer 102A at the normal rate is outputted at the normal rate, while the stream inputted at the high rate is outputted at the high rate.

The stream Bst outputted from the stream buffer 102A is inputted to the decoder of the corresponding codec method through the input side switch 104 that is controlled by the stream input control unit 22A.

On receipt of the inputted stream, each decoder starts decoding of the stream, and outputs the decoded data to the frame buffer 106 every time decoding of the stream corresponding to one frame is completed. The display unit 107 successively displays the decoded data stored in the frame buffer 106, beginning with one having the earliest display time, on the basis of the display timing information Tdis supplied from the display control unit 24a.

Hereinafter, the operation of the image reproduction apparatus according to the second embodiment will be specifically described for the case where the system stream Sst inputted to the system decoder 101A is a connected stream that is obtained by connecting the coded stream M4 corresponding to the MPEG-4 AVC codec method after the coded stream M2 corresponding to the MPEG-2 codec method.

Since the size of the display gap that occurs at the joint portion of the both streams is one-frame period, the system decoder 102A judges that high-speed reading from the previous-stage stream buffer is required at the joint portion of the MPEG-2 coded stream M2 and the MPEG-4 AVC coded stream M4, and the stream buffer 111A reads the final frame portion of the MPEG-2 coded stream M2 and the head frame portion of the MPEG-4 AVC coded stream M4 from the stream buffer 111A at high speed according to the control signal Chr from the system decoder 101A, and multiplexes these portions that are read at high speed, and outputs the multiplexed stream to the stream buffer 102A.

Figure 7:
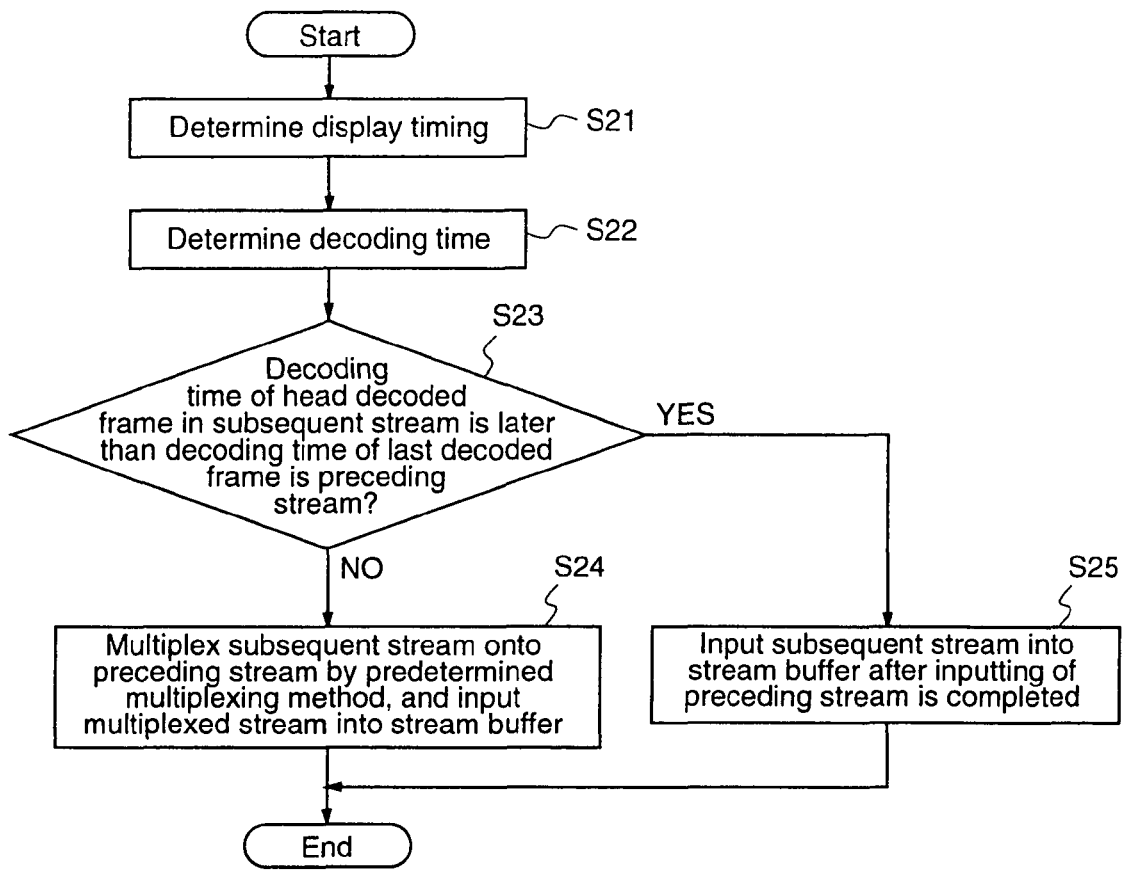
FIG. 7 is a diagram for explaining seamless reproduction by the image reproduction apparatus 100a of the second embodiment.

FIG. 7 is a diagram for explaining the operation of the system decoder 101A in the case where the connected stream that is obtained by connecting streams of different codec methods is inputted to the image reproduction apparatus according to the second embodiment.

Initially, when the header information of the connected stream that is read from the recording medium is inputted to the system decoder 101A, the system decoder 101A detects a display gap at the joint portion of the preceding stream and the subsequent stream on the basis of the auxiliary information as the header information, and determines frame display times of the respective streams so that this display gap is absorbed (step S21).

Next, in the system decoder 101A, a decoding start timing by which decoding completion of each frame is made in time for display of the frame when the frame is decoded at the normal speed is determined as a decoding time of the frame (step S22).

Subsequently, the system decoder 101A judges whether the decoding time of the head decoded frame in the subsequent stream is later than the decoding time of the final coded frame in the preceding stream or not (step S23).

When it is judged that the decoding time of the head decoded frame in the subsequent stream is later than the decoding time of the final decoded frame in the preceding stream, the system decoder 101A sends no control signal Chr to the stream buffer 111A. In this case, reading from the stream buffer 111A is performed at the normal reading speed in the positions before and after the joint portion of the connected streams, and the system decoder 101A performs inputting of the subsequent stream into the stream buffer 102A after inputting of the preceding stream into the stream buffer 102A is completed (step S23).

On the other hand, when it is judged in step S23 that the decoding time of the head decoded frame in the subsequent stream is not later than the decoding time of the final decoded frame of the preceding stream, the system decoder 101A sends the control signal Chr to the stream buffer 111A. In this case, reading from the stream buffer 111A is performed at a speed higher than the normal reading speed in the positions before and after the joint portion of the connected streams, and the system decoder 101A multiplexes the portion of the preceding stream that is read at the high speed and the portion of the subsequent stream that is read at the high speed by a predetermined multiplexing method, and outputs the multiplexed stream to the stream buffer 102A that is disposed in the subsequent stage (step S24).

FIG. 8 is a diagram for explaining the method of multiplexing the preceding stream and the subsequent stream.

Figure 8A:
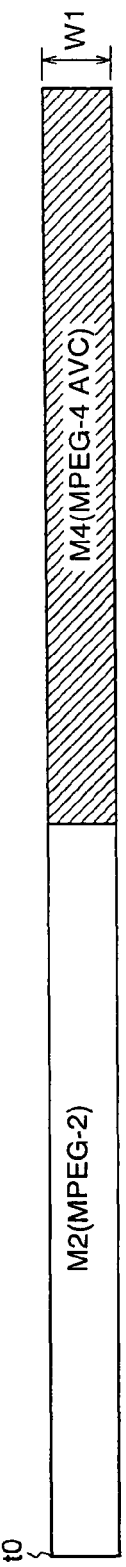
FIG. 8 is a diagram illustrating the case where streams of different codec methods are multiplexed at their connection points in the image reproduction apparatus 100a of the second embodiment (FIG. 8(b)), in contrast with the case where such multiplexing at the connection points of the streams is not performed (FIG. 8(a)).
Figure 8B:
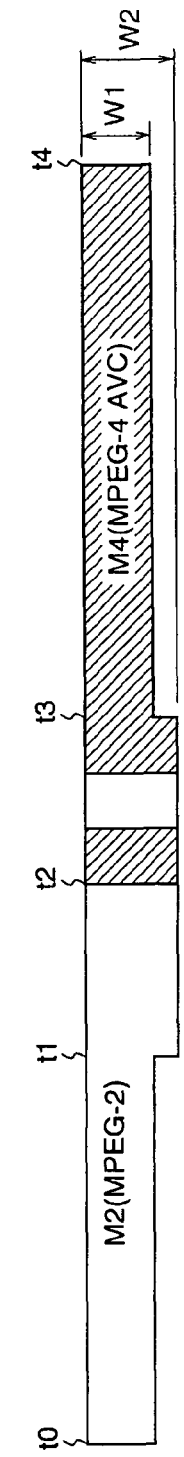

FIG. 8(a) shows the case where reading of the stream is performed at the normal reading speed in the positions before and after the joint portion of the connected streams, and the adjacent portions of the preceding stream and the subsequent stream are inputted to the stream buffer in the order of decoding without being multiplexed. FIG. 8(b) shows the case where reading of the stream is performed at high speed in the positions before and after the joint portion of the connected streams, and the adjacent portions of the preceding stream and the subsequent stream are multiplexed and inputted to the stream buffer 102A.

In order to simplify the description, it is assumed that the bit rate is fixed. Further, in FIG. 8, W1 and W2 denote the stream transfer speeds.

Initially, as illustrated in FIG. 8(b), the stream M4 of the MPEG-4 AVC codec method as the subsequent stream is previously decoded during decoding of the stream M2 of the MPEG-2 codec method. In this case, in order to realize parallel inputting of the data into the decoder, the system decoder 101A performs reading at a speed twice or more as high as that of the stream buffer 111A to increase the data transfer speed, and inputs the data into the stream buffer 102 that is disposed in the subsequent stage of the system decoder.

That is, in the case where the subsequent stream is previously decoded, the transfer speed of the subsequent stream is increased so that the data can be inputted to the decoder in approximately parallel with each other (timing t1). Next, the preceding stream and the subsequent stream are multiplexed so that the first frame in the subsequent stream can be decoded at a predetermined decoding time (timing t2). When inputting of the head frame in the subsequent stream is completed, the stream M4 of the MPEG-4 AVC codec method is inputted to the decoder at the normal speed (timing t3).

Thereafter, the stream M4 of the MPEG-4 AVC codec method is decoded at the normal speed. Since the data input to the decoder is carried out at high speed at the joint portion of the stream M2 of the MPEG-2 codec method and the stream M4 of the MPEG-4 AVC codec method, the data input is completed earlier than that in the case where data input to the decoder is carried out at the fixed rate shown in FIG. 8(b), i.e., the case where multiplexing is not carried out (timing t4).

FIG. 9 is a diagram for specifically explaining how the seamless reproduction is carried out at the joint portion of the preceding stream and the subsequent stream in the case where the coded stream M4 of the MPEG-4 AVC codec method is connected after the coded stream M2 corresponding to the MPEG-2 codec method.

When the coded stream M4 of the MPEG-4 AVC codec method is connected after the coded stream M2 corresponding to the MPEG-2 codec method, if the joint portion of these streams is read at the normal speed, display is undesirably interrupted by only one-frame period at the joint portion of the both streams as shown in FIG. 9(a).

On the other hand, when one frame before the boundary of the two streams and one frame after the boundary are read at the high speed as in this second embodiment, decoding processes for the two frames, i.e., the final display frame in the preceding stream and the head display frame in the subsequent stream, are carried out substantially in parallel with each other, whereby the display gap of one frame at the joint portion of these streams is absorbed.

Thereby, it is possible to prevent the display from being interrupted in the portion where the codec method changes, in the connected stream that is obtained by connecting the MPEG-4 AVC coded stream M4 to the MPEG-2 coded stream M2.

As described above, according to the second embodiment, when the preceding stream is the stream M2 of the MPEG-2 codec method while the subsequent stream is the stream M4 of the MPEG-4 AVC codec method, decoding start of the subsequent stream is put ahead by one frame. Therefore, the stream M4 of the MPEG-4 AVC codec method can be reproduced without interruption when the reproduction of the stream M2 of the MPEG-2 codec method is ended. Further, the delay in the reproduced frames can be brought within one frame through the entirety of the connected stream.

Furthermore, the image reproduction apparatus according to the second embodiment can be implemented if only the reading of the stream M4 of the MPEG-4 AVC codec method can be executed faster, and a decoder of the normal decoding speed can be used.

According to the second embodiment, the image reproduction apparatus 100a is constituted such that the stream buffer disposed before the system decoder has a buffer capacity larger than that of the first embodiment, the subsequent stream can be buffered during decoding of the preceding stream, and the system decoder can decode two streams at approximately the same time. However, the construction of the image reproduction apparatus 100a is not restricted thereto, and the stream reading unit 110A may be capable of performing high-speed reading by random access to the recording medium. In this case, the system decoder 101A and the stream buffer 111A disposed before the system decoder 101A output the stream at a rate corresponding to its input rate. In this case, the stream reading unit reads the rear end portion of the preceding stream and the head portion of the subsequent stream switchingly for each predetermined bytes, whereby the stream reading unit can read these portions while multiplexing them.

Further, in this second embodiment, the system decoder multiplexed the portions before and after the joint portion of the preceding stream and the subsequent stream, and outputs the multiplexed stream to the stream buffer. However, when each of the decoders [1]Dd1~[N]Ddn has a processing ability to decode at least two frames within a display time for one frame, it is not necessary to multiplex the portions before and after the joint portion of the preceding stream and the subsequent stream.

That is, when the system stream is obtained by connecting the stream M4 corresponding to the MPEG-4 AVC after the stream M2 corresponding to the MPEG-2, the system stream is read from the frame buffer 111A at a reading speed twice or more as high as the normal speed in the positions before and after the joint portion of these streams, whereby the total time from when the decoder [1]Dd1 starts to decode the final frame in the preceding stream to when the decoder [2]Dd2 ends to decode the head frame in the subsequent stream is brought within one frame display period. Therefore, it is not necessary to perform decoding of the final frame in the preceding stream by the decoder [1]Dd1 and decoding of the head frame in the subsequent stream by the decoder [2]Dd2 in parallel with each other, and accordingly, it is not necessary to multiplex the final frame in the preceding stream and the head frame in the subsequent stream.

Embodiment 3

Figure 10:
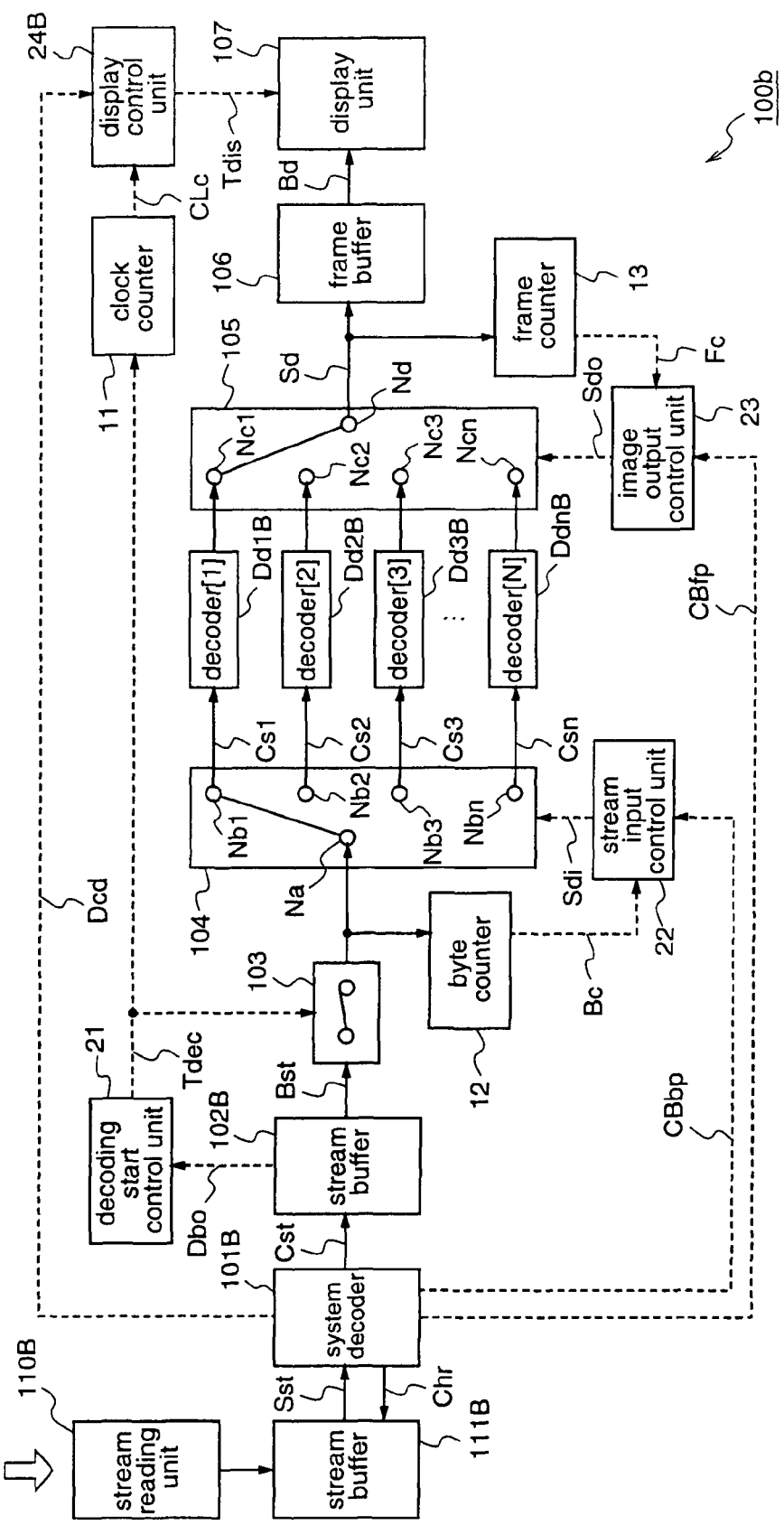
FIG. 10 is a diagram for explaining an image reproduction apparatus 100b according to a third embodiment of the present invention.

FIG. 10 is a diagram for explaining an image reproduction apparatus according to a third embodiment of the present invention.

The image reproduction apparatus 100b according to the third embodiment decodes, at high speed, a head portion of a subsequent stream of connected two stream based on different codec methods, thereby reproducing the connected two streams of different codec methods seamlessly without interruption of display.

Although the construction of the image reproduction apparatus 100b according to the third embodiment is fundamentally identical to that of the image reproduction apparatus 100 according to the first embodiment, the constructions of a stream reading unit 110B, a stream buffer 111B, a system decoder 101B, a stream buffer 102B, and decoders Dd1B~DdnB are different from those of the first embodiment.

That is, the stream buffer 111B disposed in front of the system decoder 101B has a buffer capacity larger than that of the first embodiment, and it can output stored system streams Sst at high speed according to a control signal Shr from the system decoder 101A. More specifically, the stream buffer 111B outputs, at high speed, the head portion of the subsequent stream of the connected two streams based on different codec methods, according to the high speed reading control signal Chr supplied from the system decoder 101B.

The high speed reading control circuit Chr includes information indicating the boundary position of the preceding and subsequent streams of different codec methods, and information indicating that how many frames of display gap exist between the final frame in the preceding stream and the head frame in the subsequent stream.

The system decoder 101B extracts the auxiliary information CBbp, CBfp, Dcd, and the coded stream Cst from the system stream Sst that is read from the stream buffer 111B, outputs the high speed reading control signal Chu to the stream buffer 111B, and performs high-speed operation according to the input rate of the stream from the stream buffer 111B. That is, the system decoder 101B outputs the portion that is read at high speed in the head portion of the subsequent stream to the stream buffer 102B at high speed.

The stream buffer 102B disposed after the system decoder 101B holds the coded stream Cst outputted from the system decoder 101B, and sequentially outputs the stored stream. Further, the stream buffer 102B is able to output the stream at a speed according to the input rate of the stream outputted from the system decoder 101B, and it outputs, at high speed, the head portion of the subsequent stream which is read at high speed.

Each of the decoders Dd1B~DdnB operates at high speed according to the input rate of the stream, and decodes, at high speed, the head portion of the subsequent stream, which is read at high speed.

While the display control unit 24 of the first embodiment determines a display delay for the entirety of the connected stream according to the codec methods of the streams included in the connected stream, and outputs display timing information Tdis corresponding to the determined display delay, the display control unit 24B of this third embodiment outputs display timing information Tdis indicating the display timing according to the stream of each codec method.

As described above, in this third embodiment, the system decoder 101B, the stream buffer 102B, and the decoders Dd1B~DdnB are operated at high speed according to the data input rate, and the throughputs of the stream buffer and the decoders are varied according to the input rate of the stream.

Next, the operation will be described.

Since the image reproduction apparatus 100b of the third embodiment is identical to that of the first embodiment except the operation of reading the head portion of the subsequent stream in the connected two streams of different codec methods at high speed, and decoding the same at high speed, the operation that is different from the first embodiment will be mainly described hereinafter.

The connected stream that is obtained by connecting streams of different codec methods is read by the stream reading unit 110B, and stored in the stream buffer 111B. When the amount of stored stream in the stream buffer 111B exceeds a predetermined value, the system decoder 101B reads the connected stream as the system stream Sst from the stream buffer 111B, and extracts the auxiliary information CBbp, CBfp, Dcd, and the coded stream Cst from the system stream Sst. Further, at this time, the system decoder 101B detects the boundary position of the preceding and subsequent streams of different codec methods in the connected stream, and the size of the display gap between the final frame in the preceding stream and the head frame in the subsequent stream, on the basis of the auxiliary information included in the header of the system stream, and outputs a high speed reading control signal Chu including the information indicating the stream boundary portion and the information indicating the size of the display gap, to the stream buffer 111B.

Then, the stream buffer 111B changes the rate for outputting the connected stream from the normal rate to the high-speed rate at the timing corresponding to the size of the display gap. In this high-speed reading process, the head portion of the subsequent stream in the connected stream is read at high speed to the system decoder 101B.

When the head portion of the subsequent stream which is read at high speed from the stream buffer 111B is inputted to the system decoder 101B, the system decoder 101B outputs the head portion of the subsequent stream at a rate according to the input rate to the stream buffer 102B.

In the stream buffer 102B, the stream Cst outputted from the system decoder 101B is sequentially stored, and when the amount of the stored stream exceeds a predetermined value, the stored stream is outputted in the order of inputting at a rate corresponding to the input rate. That is, the stream that is inputted to the stream buffer 102B at the normal rate is outputted at the normal rate, and the stream inputted at the high-speed input rate is outputted at the high speed rate.

The stream Bst outputted from the stream buffer 102B is inputted to any of the decoders Dd1B~DdnB of the corresponding codec method through the input side switch 104.

When the stream is inputted, each of the decoders Dd1B~DdnB decodes the inputted stream at a speed according to the input rate, and outputs the decoded data to the frame buffer 106. Then, the display unit 107 displays the decoded data stored in the frame buffer 106 beginning with one having the earliest display time, on the basis of the display timing information Tdis supplied from the display control unit 24B.

Hereinafter, the operation of the image reproduction apparatus according to the third embodiment will be specifically described for the case where the system stream Sst inputted to the system decoder 101B is a connected stream that is obtained by connecting the coded stream M4 corresponding to the MPEG-4 AVC codec method after the coded stream M2 corresponding to the MPEG-2 codec method.

In this case, since the size of the display gap that occurs at the joint portion of the both streams is one-frame period, the system decoder 101B judges that it is necessary to perform high speed reading at the joint portion between the MPEG-2 coded stream M2 and the MPEG-4 AVC coded stream M4.

Figure 11:
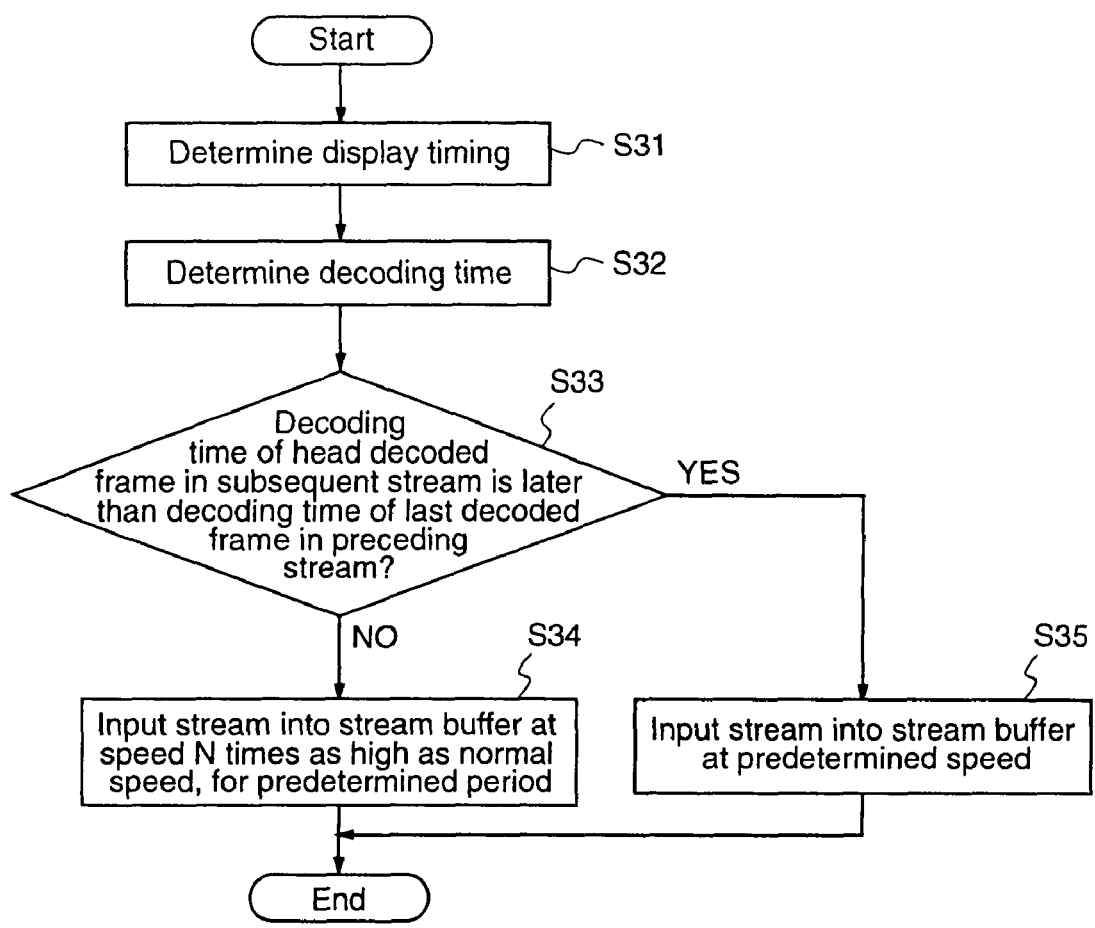
FIG. 11 is a diagram for explaining seamless reproduction by the image reproduction apparatus 100b of the third embodiment.

FIG. 11 is a diagram for explaining the operation of the system decoder 101B in the case where a connected stream that is obtained by connecting plural streams of different codec methods is inputted to the image reproduction apparatus of the third embodiment.

Initially, when the header information of the connected stream that is read from the recording medium is inputted to the system decoder 101B, the system decoder 101B detects the display gap at the joint portion between the preceding stream and the subsequent stream, and determines the display timings of the frames of the respective streams so that the display gap is absorbed (step S31).

Next, in the system decoder 101B, a decoding start timing by which decoding completion of each frame is made in time for display of the frame when decoding the frame at the normal speed is determined as the decoding time of the frame (step S32).

Subsequently, the system decoder 101B judges whether the decoding time of the head decoded frame in the subsequent stream in the connected stream is later than the decoding time of the final decoded frame in the preceding stream in the connected stream or not (step S33).

When it is judged that the decoding time of the head decoded frame in the subsequent stream is later than the decoding time of the final decoded frame in the preceding stream, the system decoder 101B sends no high-speed reading control signal Chr to the stream buffer 111B. In this case, the head portion of the subsequent stream is outputted at the normal rate from the stream buffer 111B, and the system decoder 101B performs inputting of the connected stream to the stream buffer 102B at the normal rate (step S35).

On the other hand, when it is judged in step S33 that the decoding time of the front decoded frame in the subsequent stream is not later than the decoding time of the final decoded frame in the preceding stream, the system decoder 111B sends the high-speed reading control signal Chr to the stream reading unit 110b. In this case, outputting of the head portion (predetermined period) in the subsequent frame is carried out at a rate higher than (N times) the normal rate, and the system decoder 101B inputs the head portion of the subsequent stream at the high-speed rate to the stream buffer 102B (step S34).

Figure 12A:
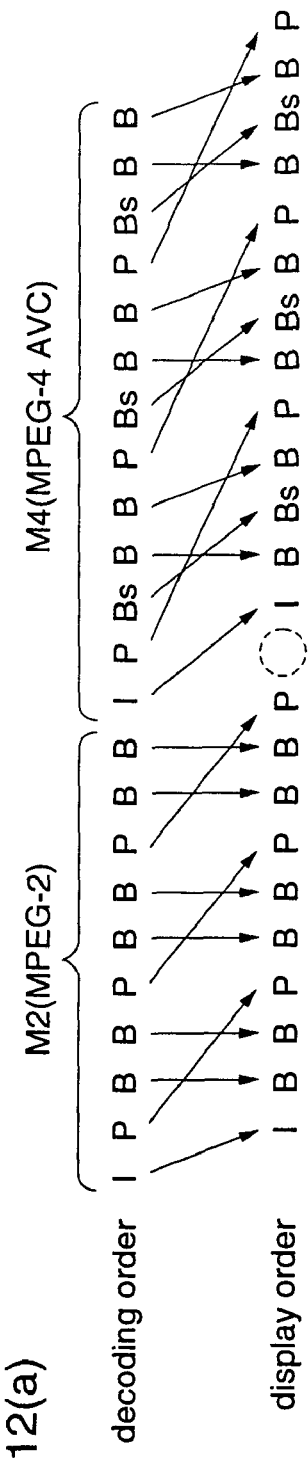
FIG. 12 is a diagram for explaining an example of seamless reproduction by the image reproduction apparatus 100b of the third embodiment (FIG. 12(b)), and another example thereof (FIG. 12(c)), in contrast with an example of reproduction where display interruption occurs (FIG. 12(a)).
Figure 12B:
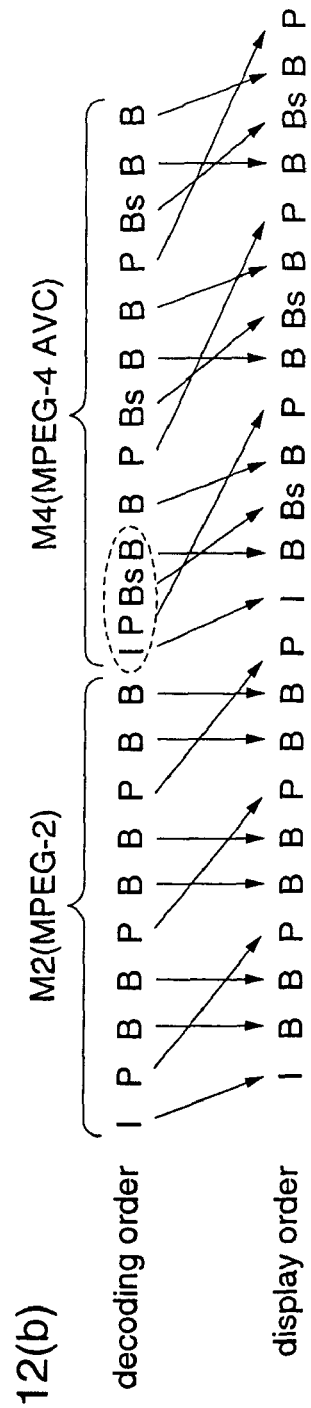

FIGS. 12(a) and 12(b) are diagrams for explaining how seamless reproduction is carried out at the joint portion of the preceding stream and the subsequent stream by high-speed decoding of the head portion of the subsequent stream, when the stream M4 corresponding to the MPEG-4 AVC is connected after the stream M2 corresponding to the MPEG-2.

FIG. 12(a) shows the display timings of the respective frames in the case where reading of the stream from the stream buffer is carried out at the normal reading speed in the positions before and after the joint portion of the MPEG-2 coded stream M2 and the MPEG-4 AVC coded stream M4. In FIG. 12(a), the coded stream M2 corresponding to the MPEG-2 codec method is displayed such that each frame is delayed by one frame, while the coded stream M4 corresponding to the MPEG-4 AVC codec method is displayed such that each frame is delayed by two frames.

In this case, when the decoded data of the stream M4 of the MPEG-4 AVC codec method is displayed with a delay of one-frame period that corresponds to the MPEG-2 codec method, data to be reproduced does not exist in the portion where the codec method changes, leading to interruption of display.

On the other hand, according to the third embodiment, as shown in FIG. 12(b), when reproducing the connected stream, a portion of the stream corresponding to the MPEG-4 AVC, which portion corresponds to the first I, P, Bs, and B frames that are enclosed in a dotted ellipse, is read at high speed such as double speed to perform high-speed decoding, whereby the display is prevented from being interrupted at the portion where the codec method changes.

As described above, according to the third embodiment, the head portion of the subsequent stream in the connected stream that is obtained by connecting two streams of different codec methods is read at high speed and decoded at high speed. Therefore, even when the display delay in the subsequent stream is larger than the display delay in the preceding stream, the connected stream can be reproduced without interrupting the display at the boundary of the preceding and subsequent streams of different codec methods. Further, throughout the entirety of the connected stream, the display delay of the reproduced frame can be brought within the display delay of the preceding stream.

Figure 12C:
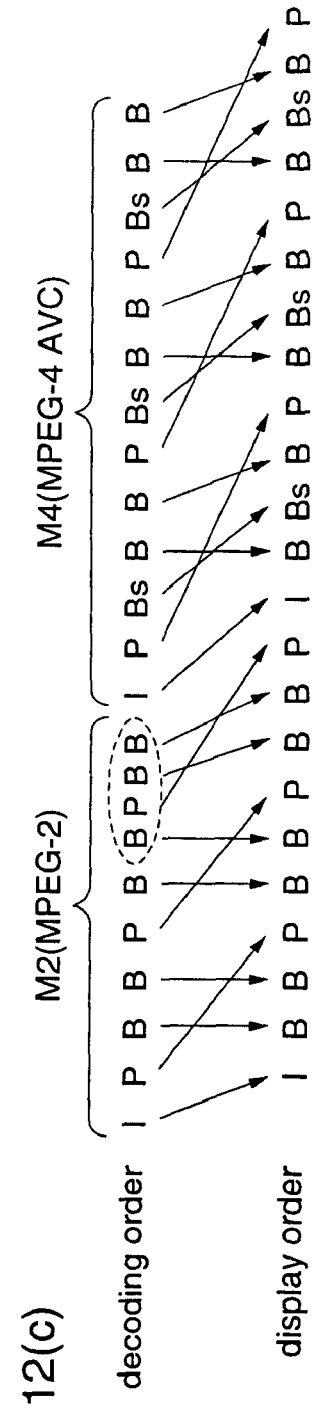

In this third embodiment, as shown in FIG. 12(b), the image reproduction apparatus reads the portion of the stream corresponding to the MPEG-4 AVC as the subsequent stream, which portion corresponds to the first I, P, Bs, B frames enclosed in the dotted ellipse, at high speed such as double speed when reproducing the connected stream, and performs high-speed decoding, thereby preventing the display from being interrupted in the portion where the codec method changes in the connected stream. However, as shown in FIG. 12(c), the image reproduction apparatus may read a portion of the MPEG-2 coded stream as the preceding stream, which portion corresponds to the last B, P, B, B frames enclosed in a dotted ellipse, at high speed such as double speed, when reproducing the connected stream, to perform high-speed decoding, thereby preventing the display from being interrupted at the position where the codec method changes in the connected stream.

Further, the image reproduction apparatus according to the third embodiment may read the streams at high speed in the positions before and after the joint portion of the two streams of different codec methods to decode the streams in parallel with each other.

In this case, the decoder corresponding to the codec method of the preceding stream and the decoder corresponding to the codec method of the subsequent stream may be operated at high speed.

To be specific, when reproducing the connected stream, the first two frames (I,P) in the MPEG-4 AVC stream and the last two frames (B,B) in the MPEG-2 stream are respectively read at high speed such as double speed to perform high-speed decoding.

The image reproduction apparatus that can seamlessly reproduce the preceding and subsequent streams of different codec methods, which is described in this third embodiment, can be realized if only the reading and decoding of one of the preceding and subsequent streams of different codec methods can be carried out at high speed.

Further, in the image reproduction apparatus 100b according to the third embodiment, the stream buffer disposed before the system decoder has a relatively large buffer capacity to enable outputting of the stream at high-speed rate. However, the image reproduction apparatus 100b is not restricted thereto, and the stream reading unit 110 may be constituted so that it can perform high-speed reading from the recording medium. In this case, the system decoder and the stream buffers disposed before and after the system decoder output the stream at the rates corresponding to the input rates, respectively.

Embodiment 4

Figure 13:
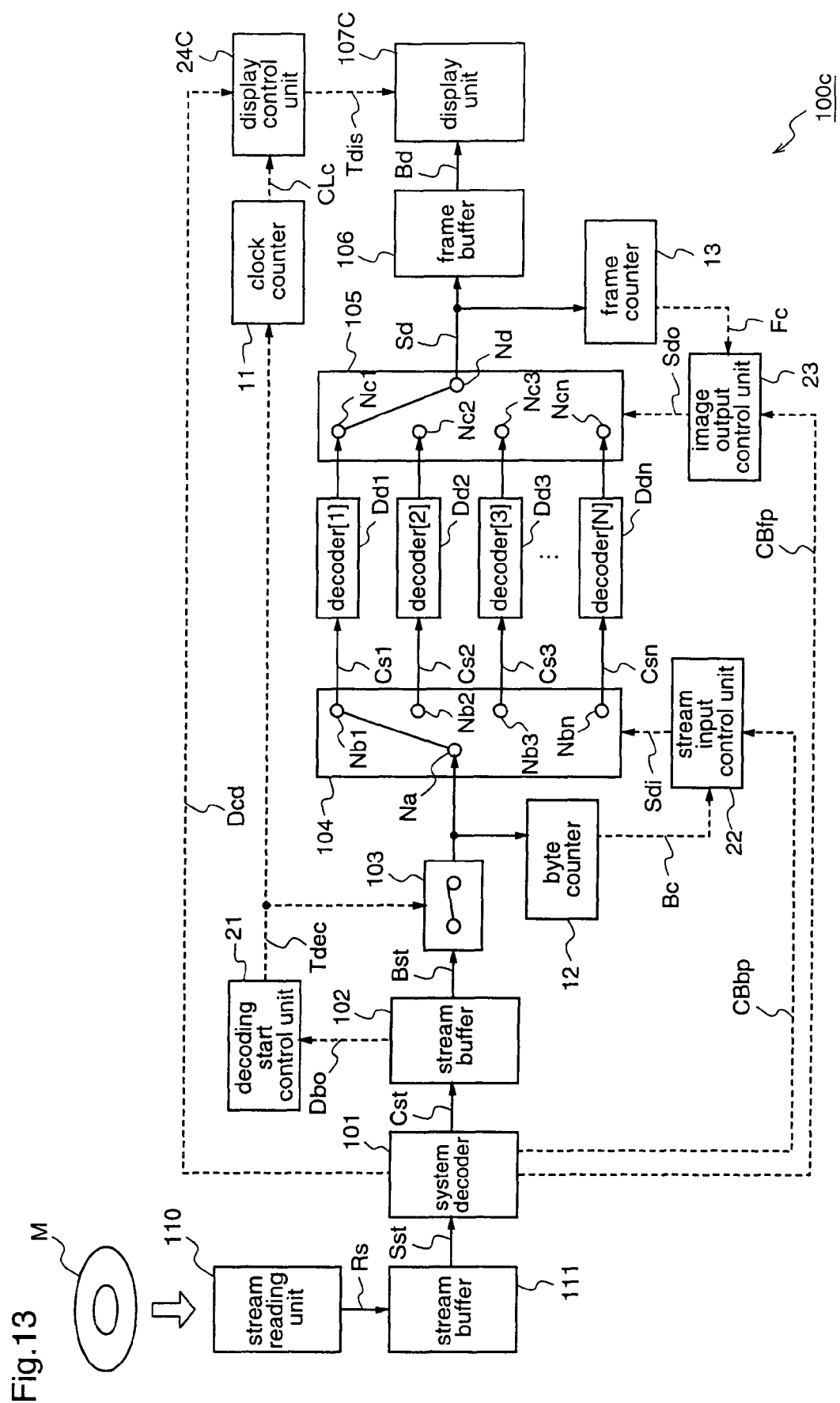
FIG. 13 is a diagram for explaining an image reproduction apparatus 100c according to a fourth embodiment of the present invention.

FIG. 13 is a diagram for explaining an image reproduction apparatus according to a fourth embodiment of the present invention.

In the image reproduction apparatus 100c according to the fourth embodiment, at the joint portion of connected two streams of different codec methods, display of a final display frame in a preceding stream is repeated to reproduce the two streams of different codec methods without interruption of display.

To be specific, although the image reproduction apparatus 100c according to the fourth embodiment is fundamentally identical in construction to the image reproduction apparatus 100 according to the first embodiment, the constructions of a display unit 107C and a display control unit 24C are different from those of the first embodiment.

That is, while the display control unit 24 of the first embodiment determines a display delay for the entirety of the connected stream according to the codec methods of the streams included in the connected stream, and outputs display timing information Tdis corresponding to the determined display delay, the display control unit 24C of this fourth embodiment outputs display timing information Tdis indicating the display timing according to the codec method of the stream to be reproduced, like the display control unit 24A of the second embodiment.

The display unit 107C repeats display of the final display frame in the preceding stream at the joint portion of the two streams of different codec methods so as to perform seamless reproduction, and hereinafter, the display unit 107C will be described in detail.

Figure 14A:
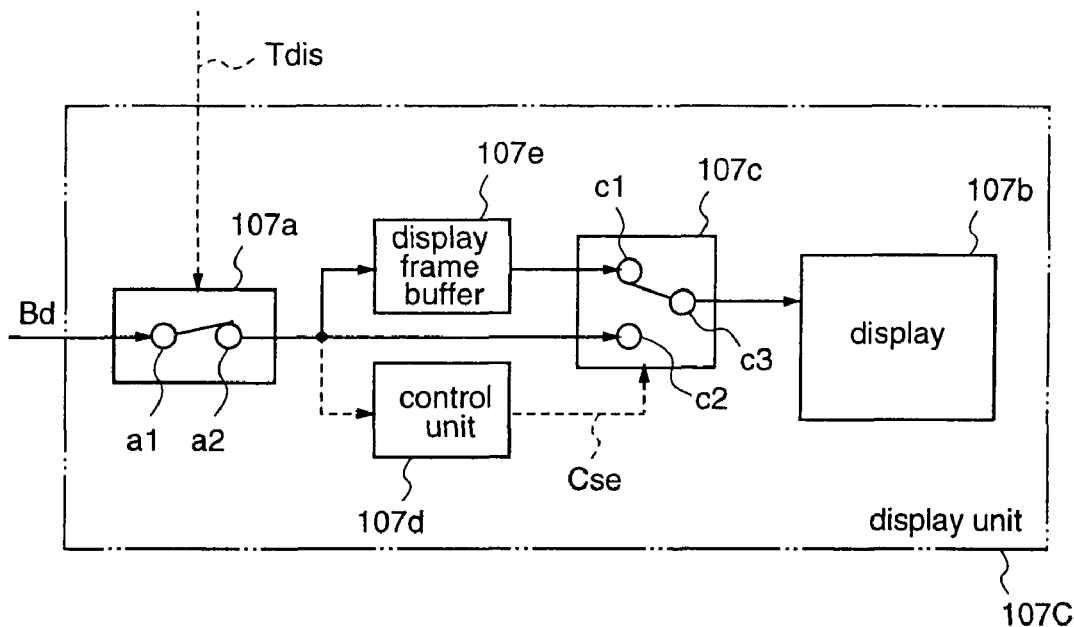
FIG. 14(a) shows the construction thereof.
Figure 14B:
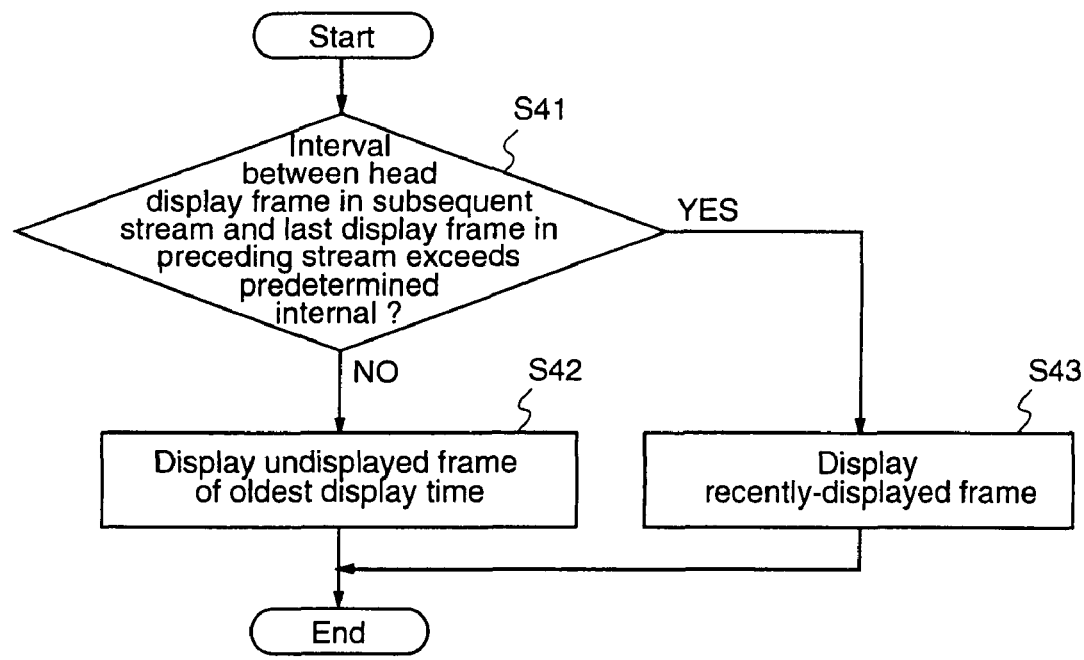
FIG. 14(b) shows the operation thereof.

FIG. 14 is a diagram for explaining the display unit 107C in the image reproduction apparatus 100c according to the fourth embodiment, wherein FIG. 14(a) shows the block structure, and FIG. 14(b) shows the operation flow.

The display unit 107C includes an open/close switch 107a which has an input node a1 and an output node a2, and performs switching between the conduction state where the input node a1 and the output node a2 are connected, and the non-conduction state where the input node a1 and the output node a2 are not connected, on the basis of display timing information Tdis from the display control unit 24C, and a selection switch 107c which has first and second input nodes c1 and c2 and an output node c3, and performs switching between the state where the first input node c1 and the output node c3 are connected, and the state where the second input node c2 and the output node c3 are connected, on the basis of a selection control signal Cse. The output node a2 of the open/close switch 107a is connected to the one input node c2 of the selection switch 107c.

Further, the display unit 107C includes a display frame buffer 107e that is connected between the output node a2 of the open/close switch 107a and the first input node c1 of the selection switch 107c, a control unit 107d that judges whether the interval at which decoded data of each frame is outputted from the open/close switch 107a is larger than a predetermined interval or not, on the basis of the output of the switch 107a, and outputs the selection control signal Cse to the selection switch 107c according to the result of judgment, and a display 107b that displays the decoded data outputted from the output node c3 of the selection switch 107c.

Next, the operation will be described.

Since only the operation of displaying the decoded data in this fourth embodiment is different from that of the first embodiment, the operation of the display unit 107C will be mainly described hereinafter.

In the image reproduction apparatus 100c of the fourth embodiment, reading and decoding of the connected stream outputted from the recording medium M are carried out in like manner as described for the first embodiment, and the decoded data of the respective frames are successively stored in the frame buffer 106.

In this fourth embodiment, every time the open/close switch 107a of the display unit 107C is turned on according to the display timing information Tdis from the display control unit 24, the decoded data of the undisplayed frames in the frame buffer 106 are sequentially inputted to the display unit 107C beginning with one having the oldest display time. Usually, the selection switch 107c is in the state where the second input node c2 and the output node c3 are connected, and thereby the decoded data of the undisplayed frames that are inputted to the display unit 107C are sequentially displayed by the display 107b.

The display timing information Tdis shows the display timing according to the codec method of the decoded data. When a joint portion of streams of different codec methods is reproduced, the time interval for inputting the decoded data into the display unit 107C from the preceding frame buffer 106 changes in the positions before and after the joint portion.

The control unit 107d detects this change of the time interval at which the decoded data are inputted, and outputs a selection control signal Cse for controlling the selection switch 107c to the selection switch 107c. Then, in the selection switch 107c, the state where the second input node c2 and the output node c3 are connected is changed to the state where the first input node c1 and the output node c3 are connected, whereby the decoded data stored in the display frame buffer 107e are outputted to the display 107b and displayed.

FIG. 14(b) is a flowchart for explaining the operation of the control unit 107d.

The control unit 107d judges whether the display interval between the head display frame in the subsequent stream and the final display frame in the preceding stream exceeds a predetermined interval or not (step S41). When the control unit 107d judges that the frame display interval exceeds the predetermined interval, it controls the selection switch 107c so that the first input node c1 is connected to the output node c3 (step S43). Thereby, in the display 107b, the lately displayed frame is again displayed.

On the other hand, when the control unit 107d judges that the frame display interval does not exceed the predetermined interval, it controls the selection switch 107c so that the second input node c2 is connected to the output node c3 (step S42). Thereby, in the display 107b, the undisplayed frame of the oldest display time is displayed at the timing indicated by the display timing information Tdis.

FIG. 15 is a diagram for explaining the case where, when the stream M4 corresponding to the MPEG-4 AVC is connected after the stream M2 corresponding to the MPEG-2, display of the final display frame in the preceding stream is repeated to perform seamless playback at the joint portion of these streams.

Figure 15A:
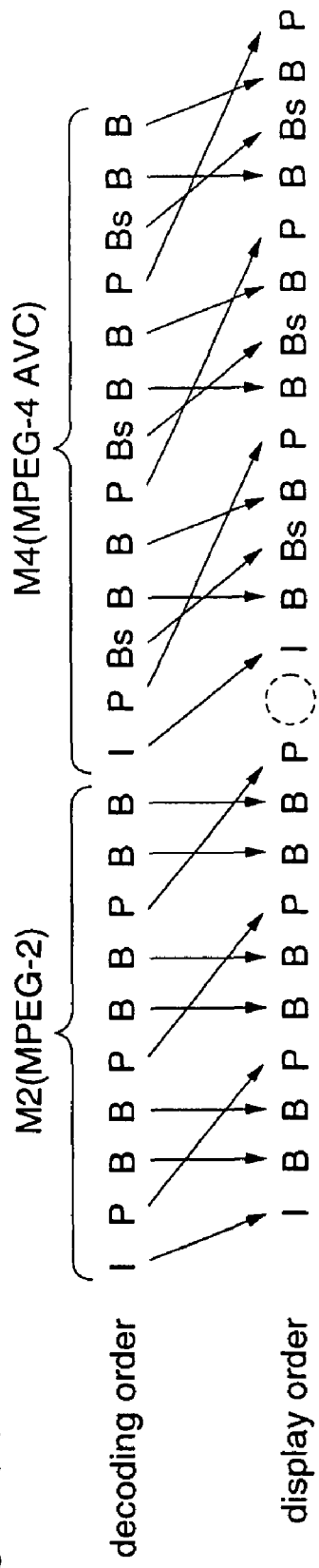
FIG. 15 is a diagram for explaining an example of seamless reproduction by the image reproduction apparatus 100c of the fourth embodiment (FIG. 15(b)), in contrast with an example of reproduction where display interruption occurs (FIG. 15(a)).

FIG. 15(a) shows the case where a display gap occurs at the joint portion between the stream M2 corresponding to the MPEG-2 and the stream M4 corresponding to the MPEG-4 AVC.

In FIG. 15(a), in the MPEG-2 coded stream M2 is displayed such that each frame is delayed by one frame, and the MPEG-4 AVC coded stream M4 is displayed such that each frame is delayed by two frames.

Therefore, when the decoded data of the MPEG-4 AVC coded stream M4 is displayed with a delay of one-frame period that corresponds to the MPEG-2 codec method, data to be reproduced at a portion where the codec method changes does not exist in the frame buffer 106 that is disposed before the display unit, leading to interruption of display.

Figure 15B:
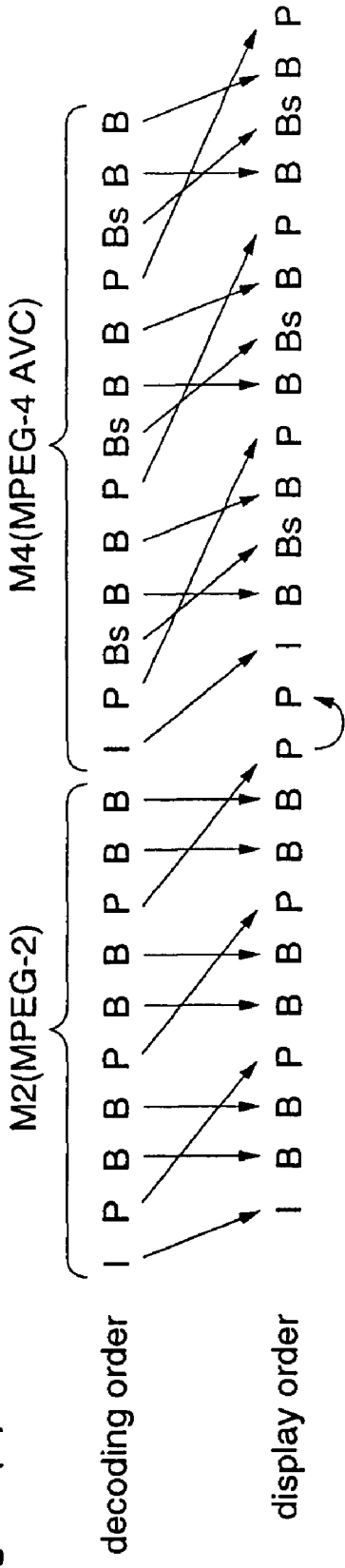

On the other hand, in this fourth embodiment, since display of the P picture that is the final display frame in the MPEG-4 AVC coded stream is repeated as shown in FIG. 15(b), it is possible to prevent the display from being interrupted at the portion in the connected stream where the codec method changes.

As described above, according to the fourth embodiment, the final display frame in the preceding stream in the connected stream that is obtained by connecting streams of different codec methods is repeatedly displayed until decoding of the head display frame in the subsequent stream that follows the preceding stream is completed. Therefore, even when the display delay in the subsequent stream is larger than the display delay in the preceding stream, the connected stream can be reproduced without interruption of display at the boundary between the preceding stream and the subsequent stream of different codec methods.

Further, in this fourth embodiment, since seamless display at the joint portion of the two coded streams of different codec methods is realized by controlling the display unit, there causes no increase in the hardware other than the display unit in the conventional image reproduction apparatus.

Embodiment 5

Figure 16:
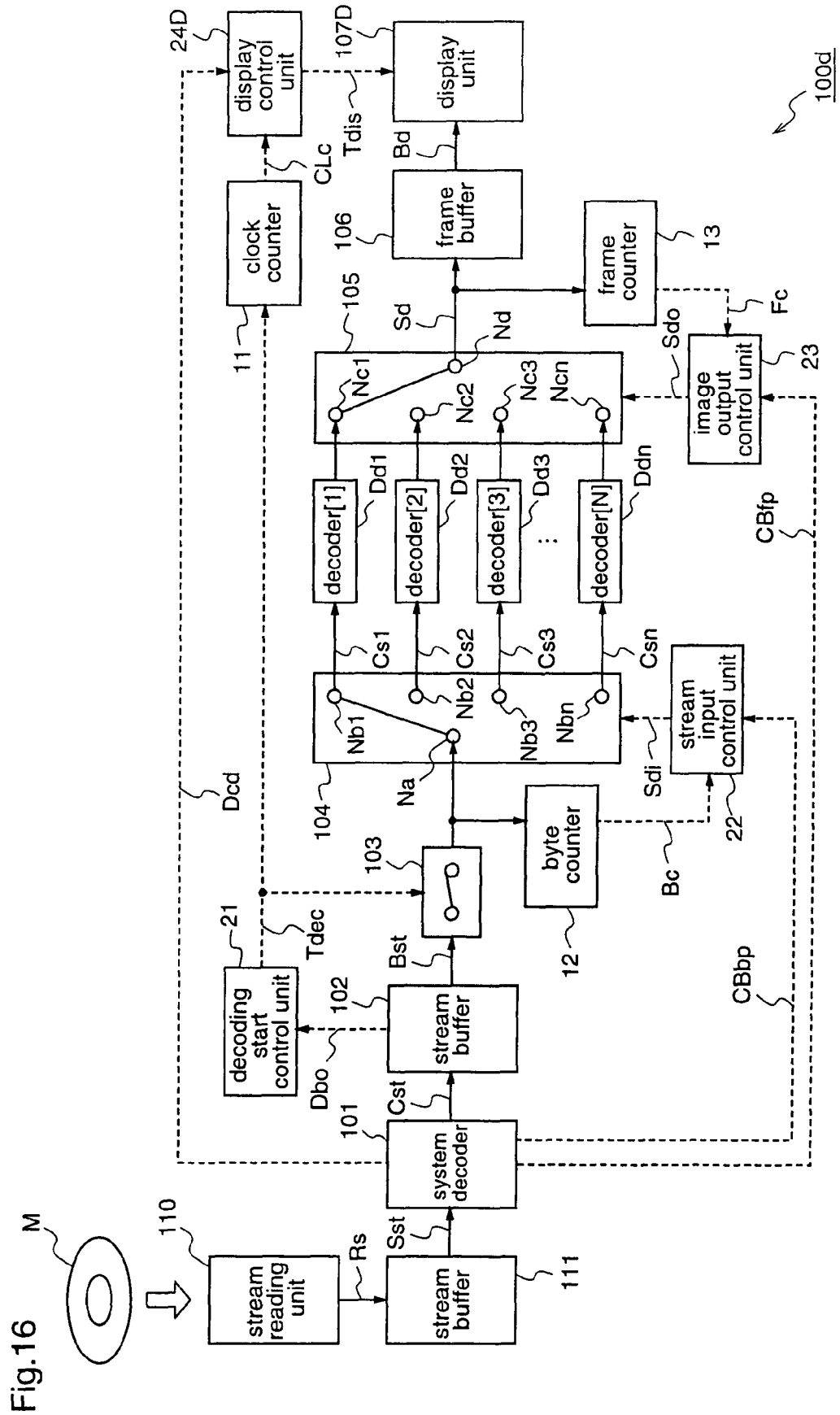
FIG. 16 is a diagram for explaining an image reproduction apparatus 100d according to a fifth embodiment of the present invention.

FIG. 16 is a diagram for explaining an image reproduction apparatus according to a fifth embodiment of the present invention.

The image reproduction apparatus 100d according to the fifth embodiment inserts, at a joint portion of connected two streams of different codec methods, a predetermined frame between a final display frame in a preceding stream and a head display frame in a subsequent stream, and displays these frames, whereby the two streams of difference codec methods can be reproduced without interruption of display.

To be specific, although the image reproduction apparatus 100d is fundamentally identical in construction to the image reproduction apparatus 100 according to the first embodiment, the constructions of a display unit 107D and a display control unit 24D are different from those of the first embodiment.

That is, while the display control unit 24 of the first embodiment determines a display delay for the entirety of the connected stream according to the codec methods of the streams included in the connected stream, and outputs display timing information Tdis corresponding to the determined display delay, the display control unit 24D of this fifth embodiment outputs display timing information Tdis indicating the display timing according to the codec method of the stream to be reproduced, like the display control unit 24A of the second embodiment.

The display unit 107D inserts a predetermined frame between the final display frame in the preceding stream and the head display frame in the subsequent stream and displays these frames so that seamless reproduction is carried out at the joint portion of the two streams of different codec methods. Hereinafter, the display unit 107D will be described in detail.

Figure 17A:
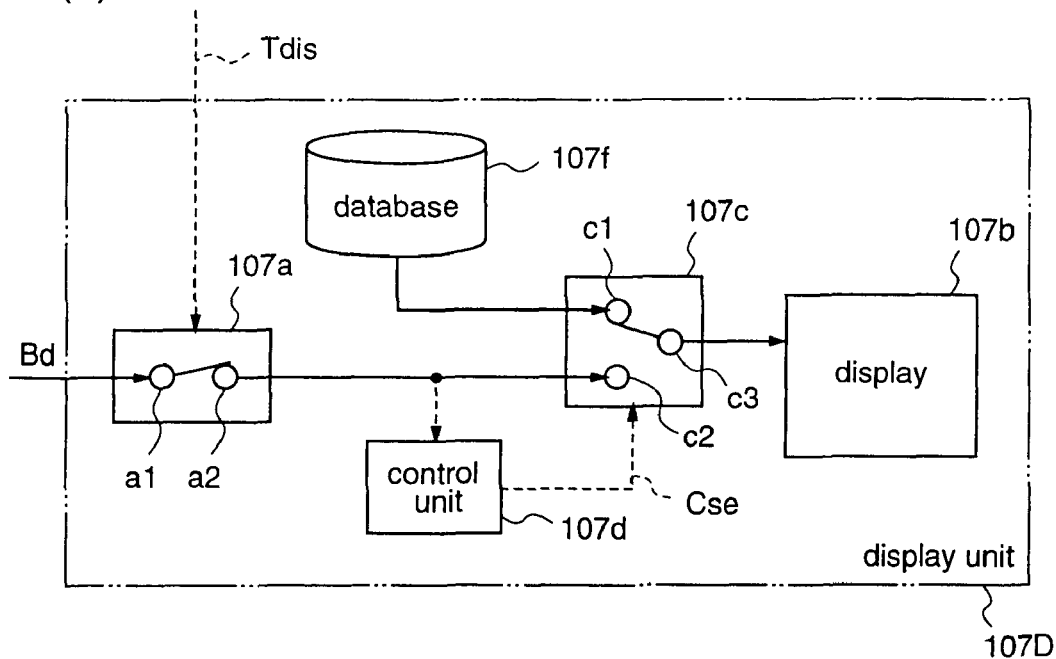
FIG. 17(a) shows the construction thereof.
Figure 17B:
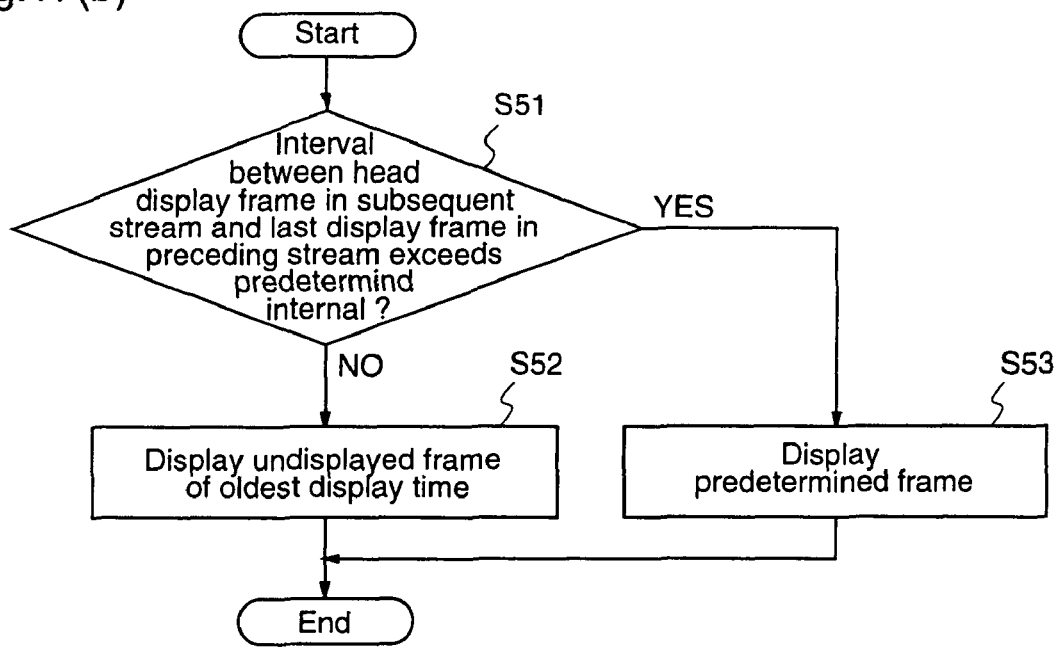
FIG. 17(b) shows the operation thereof.

FIG. 17 is a diagram for explaining the display unit 107D in the image reproduction apparatus 100d according to the fifth embodiment. FIG. 17(a) shows the block construction of the display unit, and FIG. 17(b) shows the operation flow of the display unit.

The display unit 107D is provided with a database 107f in which image data of predetermined frames are stored, instead of the display buffer 107e in the display unit 107C of the fourth embodiment, and other constituents of the display unit 107D are identical to those of the display unit 107C of the fourth embodiment.

Next, the operation will be described.

Since, in this fifth embodiment, only the operation of displaying the decoded data is different from that of the first embodiment, the operation of the display unit 107D will be mainly described hereinafter.

In the image reproduction apparatus 100d of the fifth embodiment, reading and decoding of the connected stream from the storage medium M are carried out in the same manner as described for the first embodiment, and the decoded data of the respective frames are sequentially stored in the frame buffer 106.

In this fifth embodiment, every time the open/close switch 107a of the display unit 107D is turned on with the display timing information Tdis from the display control unit 24D, the decoded data of the undisplayed frames in the frame buffer 106 are successively inputted to the display unit 107 in chronological order. Usually, the selection switch 107D is in the state where the second input node c2 and the output node c3 are connected, and therefore, the decoded data of the undisplayed frames which are inputted to the display unit 107D are sequentially displayed on the display 107b.

The display timing information Tdis shows the display timing corresponding to the codec method of the decoded data to be displayed. When reproducing the joint portion of the streams of different codec methods, the time interval for inputting the decoded data to the display unit 107D from the preceding frame buffer 106 changes in positions before and after the joint portion.

The control unit 107d detects this change in the time interval for inputting the decoded data, and outputs a selection control signal Cse for controlling this change to the selection switch. Then, in the selection switch 107c, the state where the second input node c2 and the output node c3 are connected is changed to the state where the first input node c1 and the output node c3 are connected, whereby image data of a predetermined frame stored in the database 107f is outputted to the display 107b, and displayed.

FIG. 17(b) is a flowchart for explaining the operation of the control unit 107d in the display unit 107D.

The control unit 107d judges whether the display interval between the head display frame in the subsequent stream and the final display frame Ln the preceding stream exceeds a predetermined interval or not (step S51). When the control unit 107d judges that the frame display interval exceeds the predetermined interval, it controls the selection switch 107c so that the first input node c1 is connected to the output node c3 (step S53). Thereby, in the display 107b, a predetermined frame stored in the database 107f is displayed.

On the other hand, when the control unit 107d judges that the frame display interval does not exceed the predetermined interval, it controls the selection switch 107c so that the second input node c2 is connected to the output node c3 (step S52). Thereby, in the display 107b, the undisplayed frame of the oldest display time is displayed at the timing indicated by the display timing information Tdis.

FIG. 18 is a diagram for explaining the case where, when the stream M4 corresponding to the MPEG-4 AVC is connected after the stream M2 corresponding to the MPEG-2, a predetermined frame is inserted between the final display frame in the preceding stream and the head display frame in the subsequent stream to display these frames, whereby the two streams of different codec methods are continuously reproduced without interruption of display.

FIG. 18(a) shows the case where a display gap occurs at the joint portion between the MPEG-2 coded stream M2 and the MPEG-4 AVC coded stream M4. In FIG. 18(a), the MPEG-2 coded stream M2 is displayed such that each frame is delayed by one frame while the MPEG-4 AVC coded stream M4 is displayed such that each frame is delayed by two frames.

Therefore, when the decoded data of the MPEG-4 AVC coded stream M4 is displayed with a delay of one-frame period that corresponds to the MPEG-2 codec method, data to be reproduced in the portion where the codec method changes does not exist in the frame buffer 106 disposed before the display unit, leading to interruption of display.

On the other hand, in this fifth embodiment, as shown in FIG. 18(b), a predetermined frame is inserted between the final display frame in the preceding stream and the head display frame in the subsequent stream, and these frames are displayed, whereby the two streams of different codec methods can be reproduced without interruption of display.

For example, when reproducing the connected stream, a predetermined frame, e.g., a black frame, may be displayed before displaying the head display I frame in the MPEG-4 coded stream after the final display P frame in the MPEG-2 coded stream is displayed, whereby it is possible to prevent the display from being interrupted in the portion where the codec method changes.

The reason why a black frame is adopted as a frame to be inserted is because change on the screen is hardly visible. Of course, a frame of another color such as dark gray or so-called blue screen may be adopted. Further, a frame of a predetermined picture or a previous frame may be adopted.

As described above, according to the fifth embodiment, a predetermined frame is inserted between the final display frame in the preceding stream and the head display frame in the subsequent stream in the connected stream that is obtained by connecting the streams of different codec methods, and these frames are displayed. Therefore, even when the display delay in the subsequent stream is larger than the display delay in the preceding stream, the connected stream can be reproduced without interruption of display at the boundary between the preceding and subsequent streams of different codec methods.

Further, according to the above-described respective embodiments, in the connected stream that is obtained by connecting plural streams of different codec methods, the final display frame in the preceding stream is a P frame, and a difference between the frame display delay corresponding to the codec method of the preceding stream and the frame display delay corresponding to the codec method of the subsequent stream becomes a display gap at the joint portion of the preceding stream and the subsequent stream. However, in the connected stream, the final display frame in the preceding stream may be a frame other than the I frame or P frame, depending on range specification during edition by the user.

FIG. 19 shows the case where the preceding stream and the subsequent stream constituting the connected stream are the MPEG-2 coded stream M2 and the MPEG-4 AVC coded stream M4, respectively, and the final display frame in the preceding stream becomes a B frame due to edition by the user.

Figure 19A:
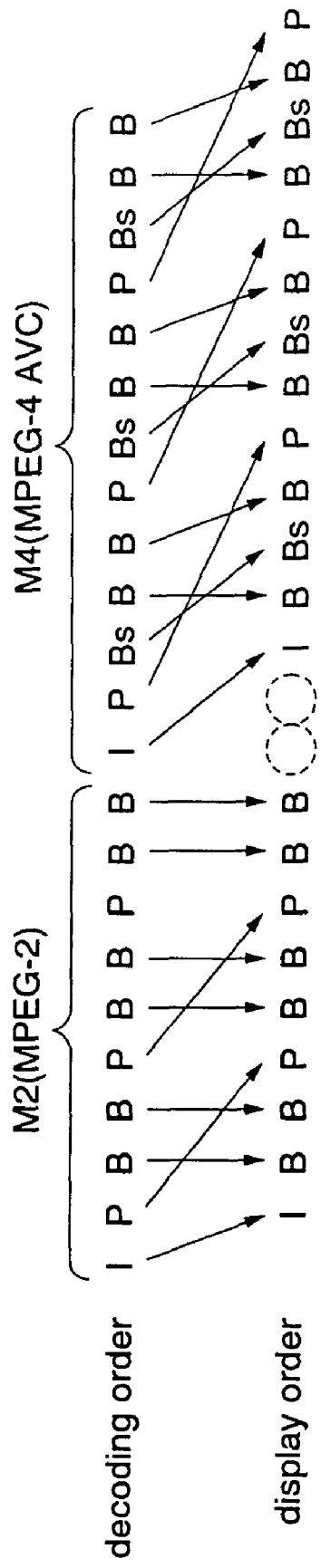
FIG. 19 is a diagram for explaining that, even when a final display frame in an MPEG-2 coded preceding stream in a connected stream that is inputted to the image reproduction apparatus 100d of the fifth embodiment becomes a B frame by user edition (FIG. 19(a)), seamless reproduction is possible in this fifth embodiment (FIG. 19(b)).

When the final display frame in the preceding stream corresponding to the MPEG-2 is a B frame, the display gap at the joint portion of the connected streams corresponds to two frames as shown in FIG. 19(a), and it is longer than one frame that is the display gap at the joint portion in the case where the final display frame in the preceding stream corresponding to the MPEG-2 is a P frame.

Figure 19B:
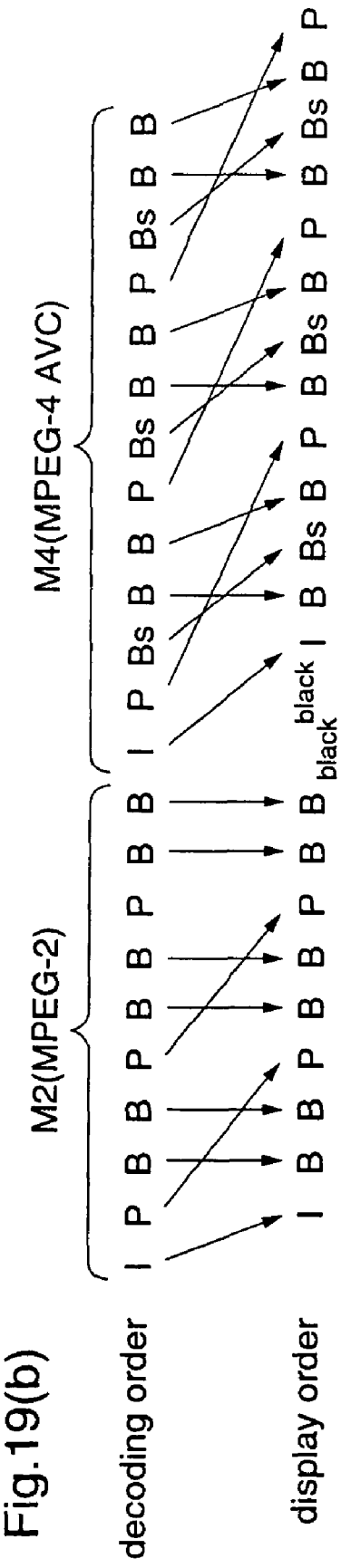

In the image reproduction apparatus 100d of this fifth embodiment, the control unit 107d in the display unit 107D judges whether the display interval between the head display frame in the subsequent stream and the final display frame in the preceding stream exceeds a predetermined interval or not. When the control unit 107d determines that the frame display interval exceeds the predetermined interval, the control unit 107d controls the selection switch 107c so that the frame of black image stored in the database 107f is displayed until the head display frame in the subsequent stream is displayed after the final display frame in the preceding stream is displayed, as shown in FIG. 19(b). Therefore, even when the connected stream shown in FIG. 19(a) is inputted, the preceding and subsequent streams of different codec methods can be reproduced without interrupting the display at the boundary of the streams.

Further, FIG. 20 shows the case where the preceding stream and the subsequent stream constituting the connected stream are the MPEG-4 AVC coded stream M4 and the MPEG-2 coded stream M2, respectively, and the final display frame in the preceding stream becomes a B frame due to edition by the user.

Figure 20A:
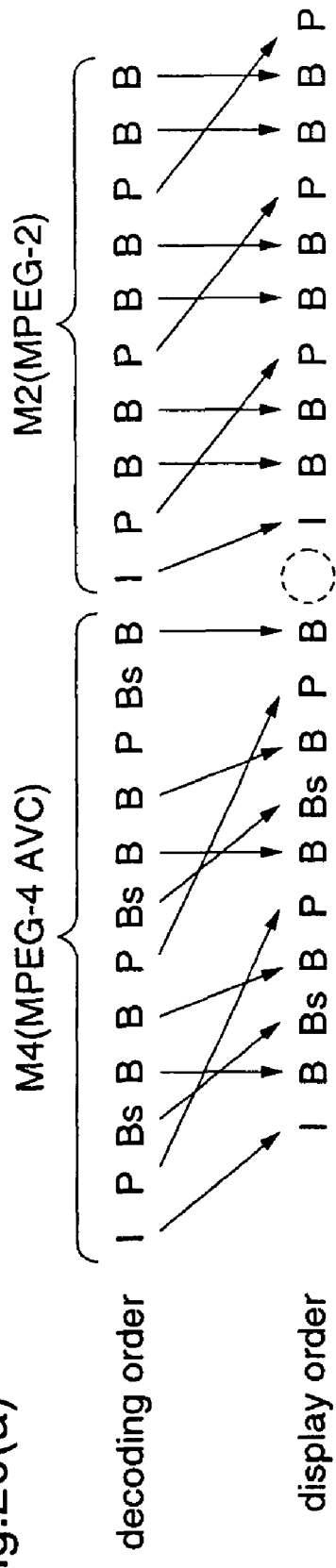
FIG. 20 is a diagram for explaining that, even when a final display frame in an MPEG-4 AVC coded preceding stream in a connected stream that is inputted to the image reproduction apparatus 100d of the fifth embodiment becomes a B frame by user edition (FIG. 20(a)), seamless reproduction is possible in this fifth embodiment (FIG. 20(b)).

When the final display frame in the preceding stream corresponding to the MPEG-4 AVC is a B frame, a display gap corresponding to one frame occurs at the joint portion of the preceding and subsequent streams as shown in FIG. 20(a), in contrast with that overlapping of the display frames occurs at the joint portion when the final display frame in the preceding stream is a P frame.

Figure 20B:
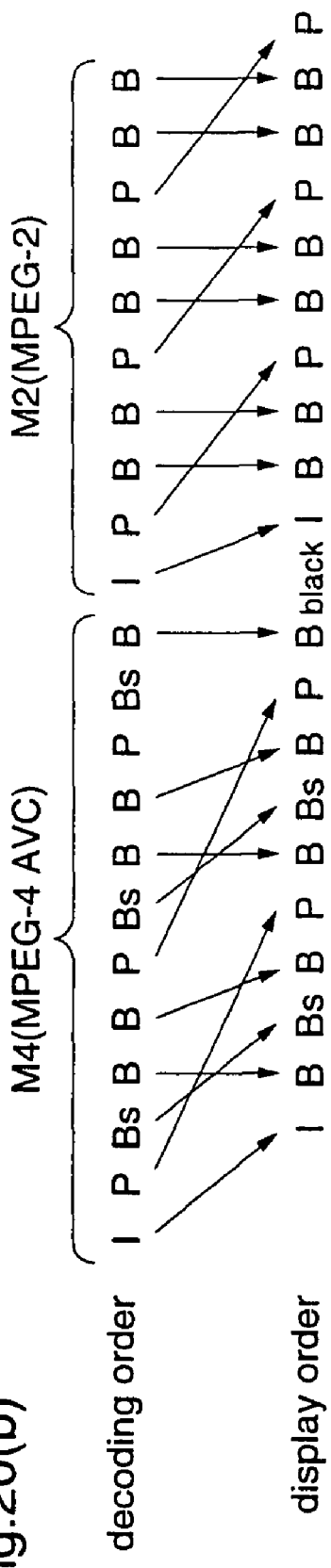

In the image reproduction apparatus 100d of this fifth embodiment, the control unit 107d judges whether the display interval between the head display frame in the subsequent stream and the final display frame in the preceding stream exceeds a predetermined interval or not. When the control unit 107d determines that the frame display interval exceeds the predetermined interval, the control unit 107d controls the selection switch 107c so that the frame of black image stored in the database 107f is displayed until the head display frame in the subsequent stream is displayed after the final display frame in the preceding stream is displayed, as shown in FIG. 20(b). Therefore, even when the connected stream shown in FIG. 20(a) is inputted, the preceding and subsequent streams of different codec methods can be reproduced without interrupting the display at the boundary of the streams.

Further, in the descriptions for FIGS. 19 and 20, even when the final display frame in the preceding stream in the connected stream is neither an I frame nor a P frame, seamless reproduction of the connected stream can be carried out in the image reproduction apparatus according to the fifth embodiment. However, such seamless reproduction of the connected stream can be also realized in any of the image reproduction apparatuses according to the first to fourth embodiments.

To be specific, in the image reproduction apparatus 100 of the first embodiment, the system decoder 101 detects the codec method of the preceding stream, the codec method of the subsequent stream, and the coding type of the final display frame in the preceding stream, and outputs them to the display control unit 24, and then the display control unit 24 outputs the display timing information Tdis to the display unit 107 on the basis of these codec method data so that no display gap occurs at the joint portion of the connected streams, whereby the connected stream including the edited preceding stream can be seamlessly reproduced.

Further, in the image reproduction apparatus 100a of the second embodiment, the system decoder 101A randomly and speedily reads the portions before and after the joint portion of the connected stream at a timing that causes no display gap at the joint portion of the connected stream, from the stream buffer 111A disposed before the system decoder 101A, whereby the connected stream including the edited preceding stream can be seamlessly reproduced.

Further, in the image reproduction apparatus 100b of the third embodiment, the system decoder 101B reads the head portion of the subsequent stream in the connected stream or the rear portion of the preceding stream at high speed from the stream buffer 111B disposed before the system decoder 101B, at a timing that causes no display gap at the joint portion of the connected stream, whereby the connected stream including the edited preceding stream can be seamlessly reproduced.

Further, in the image reproduction apparatus 100c of the fourth embodiment, the control unit 107d in the display unit 107C judges whether the display interval between the head display frame in the subsequent stream and the final display frame in the preceding stream exceeds a predetermined interval or not, and when the control unit 107d determines that the frame display interval exceeds the predetermined interval, it controls the selection switch 107c so that the image data stored in the frame buffer 107e is outputted to the display 107d until the display timing information corresponding to the next frame to the final display frame is inputted, whereby the connected stream including the edited preceding stream can be seamlessly reproduced.

Embodiment 6

Figure 21:
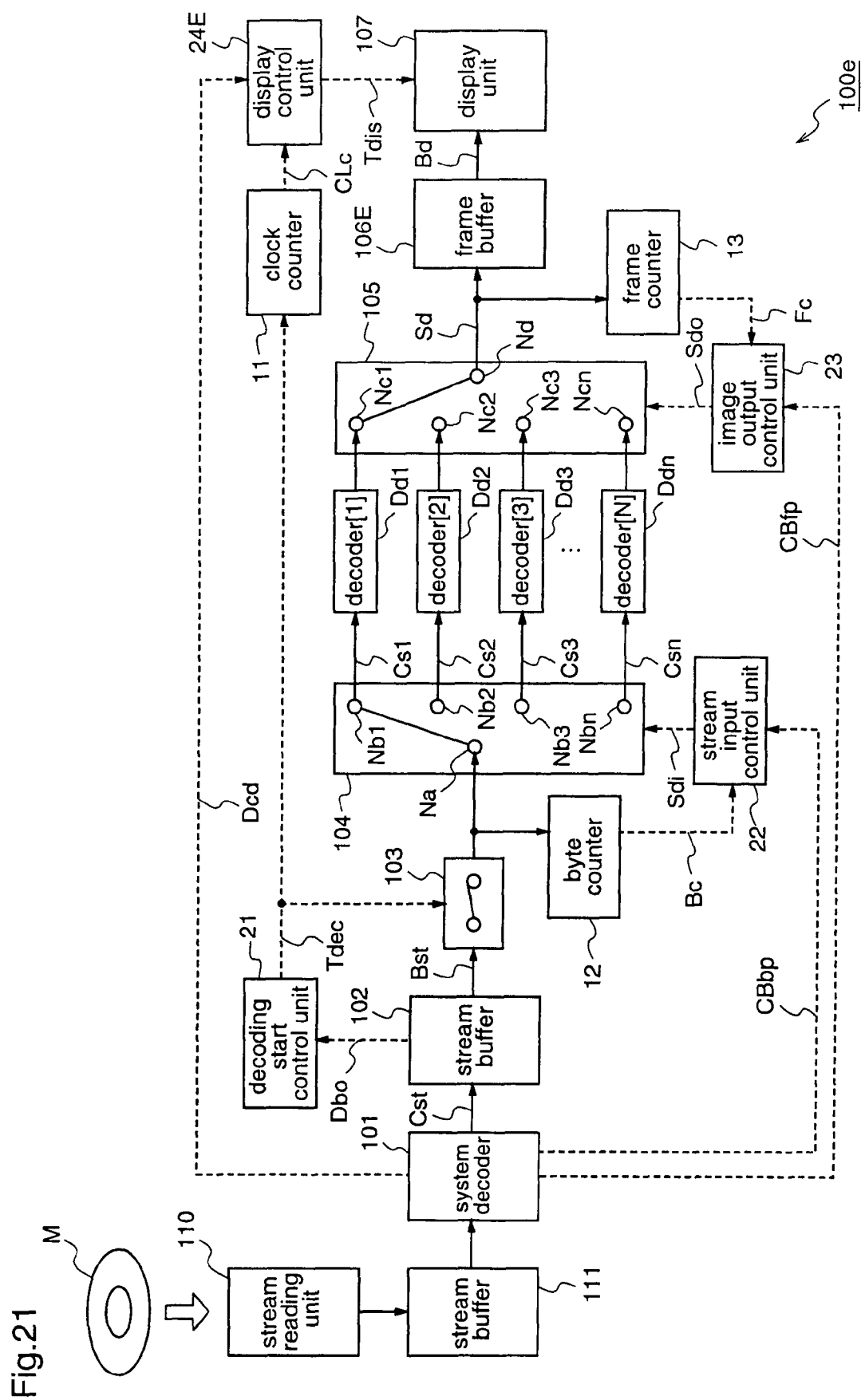
FIG. 21 is a diagram for explaining an image reproduction apparatus 100e according to a sixth embodiment of the present invention.

FIG. 21 is a diagram for explaining an image reproduction apparatus according to a sixth embodiment of the present invention.

The image reproduction apparatus 100e according to the sixth embodiment solves the problem that, when reproducing a connected stream that is obtained by connecting plural streams of different codec methods, if the display delay in the preceding stream is larger than the display delay in the subsequent stream, the frame display timings are undesirably overlapped in the vicinity of the boundary between the preceding stream and the subsequent stream.

The image reproduction apparatus 100e of the sixth embodiment is fundamentally identical in construction to the image reproduction apparatus 100 of the first embodiment, but the constructions of a display control unit 24E and a frame buffer 106E are different from those of the first embodiment.

That is, while the display control unit 24 of the first embodiment determines a display delay for the entirety of the connected stream according to the codec methods of the streams included in the connected stream, and outputs display timing information Tdis corresponding to the determined display delay, the display control unit 24E of this sixth embodiment outputs display timing information Tdis indicating the display timing according to the stream of each codec method.

Further, when the decoded data from each decoder is inputted to the frame buffer 106E of the sixth embodiment, the frame buffer 106E writes the decoded data in a buffer area for each frame, and manages the display time of the inputted decoded data in association with the address of the buffer area in which the inputted decoded data is written. When the display time of the decoded data that is inputted later overlaps the display time of the decoded data that is inputted earlier, the decoded data that is inputted later is overwritten in the buffer area wherein the decoded data that is inputted earlier and has the same display time as the later-inputted data is written.

Next, the operation will be described.

In the image reproduction apparatus 100e according to the sixth embodiment, reading and decoding of the connected stream from the storage medium M are carried out in like manner as described for the first embodiment, and the decoded data of the respective frames are sequentially stored in the frame buffer 106E.

When the decoded data from the decoders are inputted to the frame buffer 106E, the decoded data are written in the buffer area (not shown) frame by frame. Further, the frame buffer 106E manages the display times of the inputted decoded data in association with the addresses of the buffer areas in which the inputted decoded data are written. When the display time of the decoded data that is inputted later overlaps the display time of the decoded data that is inputted earlier, the later-inputted decoded data is overwritten in the buffer area where the earlier-inputted decoded data of the same display time is written.

In this sixth embodiment, every time the open/close switch 107a of the display unit 107 is turned on, the decoded data of the undisplayed frames stored in the frame buffer 106E are inputted to the display unit 107 in chronological order, and the decoded data of the undisplayed frames that are inputted to the display unit 107 are sequentially displayed on the display 107b, on the basis of the display timing information Tdis supplied from the display control unit 24E.

Figure 22A:
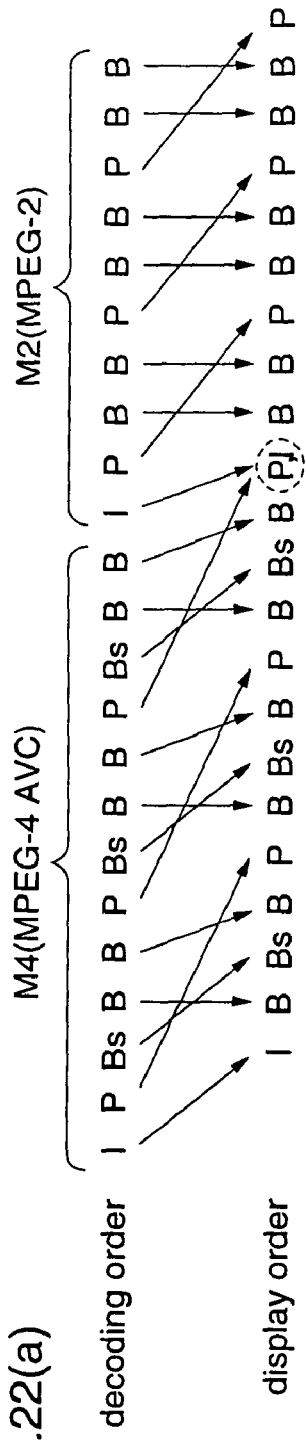
FIG. 22 is a diagram for explaining an example of seamless reproduction by the image reproduction apparatus 100e of the sixth embodiment (FIG. 22(b)), and another example thereof (FIG. 22(c)), in contrast with an example of reproduction where display interruption occurs (FIG. 22(a)).
Figure 22B:
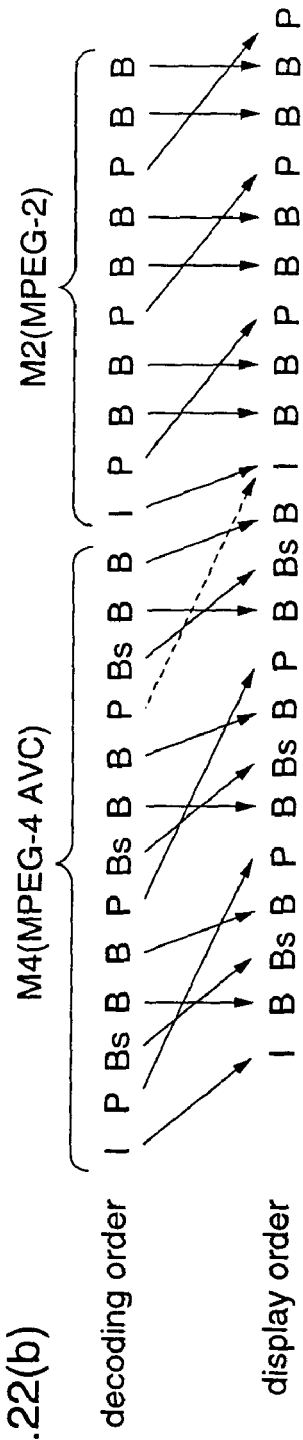

FIGS. 22(a) and 22(b) are diagrams illustrating the state where the MPEG-2 coded stream M2 is connected after the MPEG-4 AVC coded stream M4, and seamless reproduction is carried out at the joint portion of these streams by performing writing control in the frame buffer 106E.

FIG. 22(a) shows the case where the display timing of the final display frame in the preceding stream overlaps the display timing of the head display frame in the subsequent stream at the joint portion of the MPEG-4 AVC coded stream M4 and the MPEG-2 coded stream M2. In FIG. 22(a), the MPEG-2 coded stream M2 is displayed such that each frame is delayed by one frame, and the MPEG-4 AVC coded stream M4 is displayed such that each frame is delayed by two frames.

Therefore, when the amount of frame display delay changes from two frames corresponding to the MPEG-4 AVC to one frame corresponding to the MPEG-2 at the boundary of these streams, the display timings of the frames before and after the portion where the codec method changes are overlapped.

On the other hand, in the frame buffer 106E according to the sixth embodiment, the decoded data of the head display frame in the subsequent stream is overwritten in the buffer area where the decoded data of the final display frame in the preceding stream is written, whereby the head display frame in the subsequent stream is displayed at the display timing of the final display frame in the preceding stream.

As described above, according to the sixth embodiment, when the display time of the decoded data in the subsequent stream overlaps the display time of the decoded data in the preceding stream at the boundary of these streams in the connected stream, the decoded data that is inputted later is overwritten in the buffer area wherein the decoded data that is inputted earlier and has the same display time as the later-inputted data is written. Therefore, for example, when the preceding stream in the connected stream is the MPEG-4 AVC coded stream while the subsequent stream is the MPEG-2 coded stream and the display timing of the final display frame in the preceding stream overlaps the display timing of the head display frame in the subsequent stream, the display of the final display frame in the preceding stream is skipped, and thereby the head display frame in the subsequent stream can be displayed. Accordingly, even when the display delay of the preceding stream is larger than the display delay of the subsequent stream, seamless reproduction can be carried out at the joint portion of these streams.

In the image reproduction apparatus according to the sixth embodiment, when the display timing of the final display frame in the preceding stream overlaps the display timing of the head display frame in the subsequent stream, display of the final display frame in the preceding stream is skipped to display the head display frame in the subsequent stream. However, when the display timing of the final display frame in the preceding stream overlaps the display timing of the head display frame in the subsequent stream, the image reproduction apparatus may display the final display frame in the preceding stream and discard the decoded data of the head display frame in the subsequent stream.

That is, the final display frame P in the MPEG-4 coded stream M4 as the preceding stream is displayed, and the head display frame I in the MPEG-2 coded stream M2 as the subsequent stream is discarded.

Figure 22C:
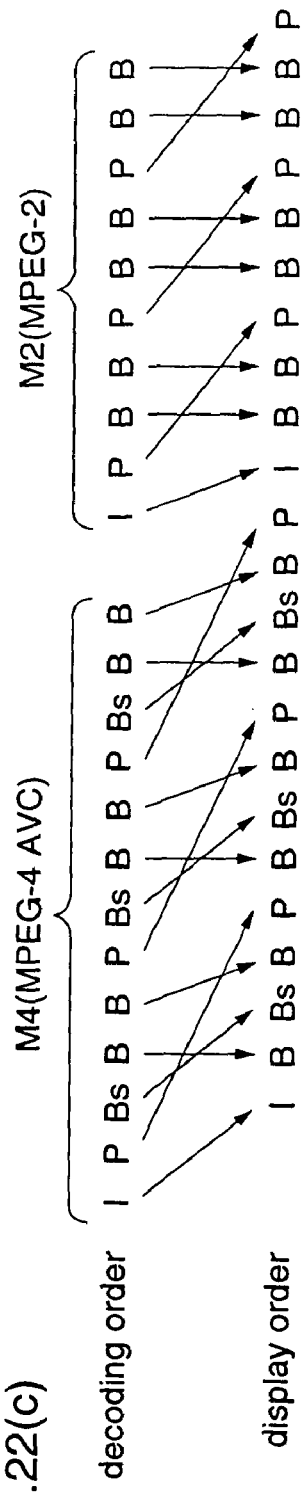

Further, the countermeasure against the case where the display timing of the final display frame in the preceding stream overlaps the display timing of the head display frame in the subsequent stream is not restricted to discarding the data of one of the frames whose display timings overlap. For example, as shown in FIG. 22(c), after decoding of the preceding stream M4 is completed, decoding of the subsequent stream M2 may be temporarily stopped for the frames whose display times overlap between the preceding and subsequent streams.

In this case, control for stopping the operation of decoding the stream between the preceding stream and the subsequent stream is carried out by the system decoder. That is, since the codec methods of the preceding stream and the subsequent stream in the connected stream are indicated immediately after decoding of the connected stream is started in the system decoder, decoding of the subsequent frame can be temporarily stopped for the frames whose display times overlap between the preceding and subsequent frames, in the portion where the codec method changes in the connected stream.

Embodiment 7

Figure 23:
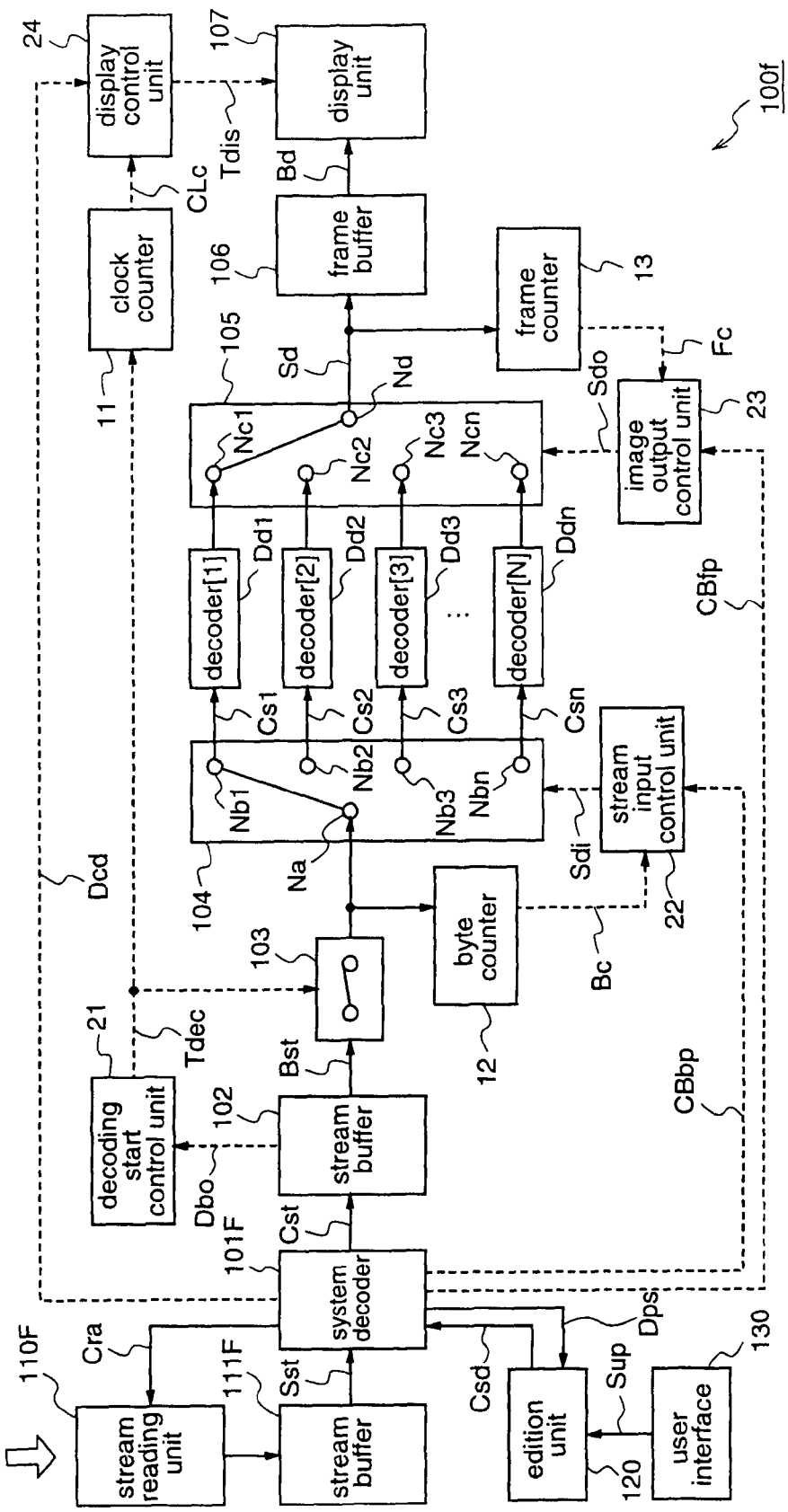
FIG. 23 is a diagram for explaining an image reproduction apparatus 100f according to a seventh embodiment of the present invention.
Figure 27:
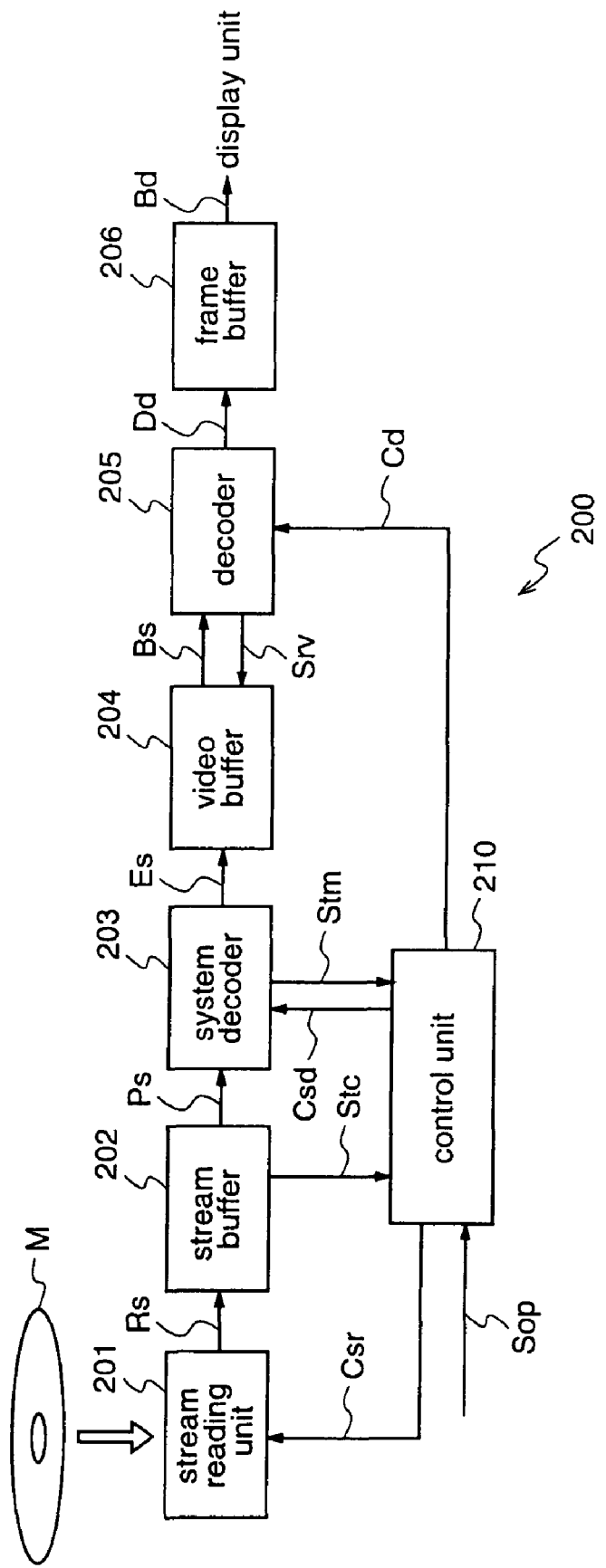
FIG. 27 is a diagram for explaining a conventional image reproduction apparatus 200.

FIG. 23 is a diagram for explaining an image reproduction apparatus according to a seventh embodiment of the present invention.

The image reproduction apparatus 100f of this seventh embodiment creates a playlist for reproducing a single image sequence recorded on a recording medium or connected streams corresponding to parts of the image sequence, according to user operation, and reproduces different streams continuously according to the created playlist.

The image reproduction apparatus 100f according to the seventh embodiment is fundamentally identical to that of the first embodiment in the construction for reading a multimedia stream from the recording medium M and reproducing the same. However, the image reproduction apparatus 100f includes, in addition to the constituents of the first embodiment, a user interface 130, and an edition unit 120 for creating a playlist on the basis of user operation, and holding the created playlist. The playlist that is created by the edition unit 120 may be written in the recording medium M, instead of being held by the edition unit 120.

The stream reading unit 110F is able to perform data reading from the recording medium by random access on the basis of a control signal Cra supplied from the system decoder 101F. Further, the system decoder 101F controls the stream reading unit 110F so as to perform the reading by random access on the basis of an instruction signal Csd supplied from the edition unit 120, and obtains information required for playlist formation from the recording medium M, and outputs this information as playlist formation information Dhd to the edition unit 120. Further, the streams Rs read by the stream reading unit 110F are sequentially stored in the stream buffer 111F disposed before the system decoder 101F, and the streams stored in the stream buffer 111F are read by the system decoder 101F.

Further, the user interface 130 generates various kinds of operation signals according to user operation, and for example, it outputs a playlist edition instruction signal Sup that instructs edition of a playlist to the edition unit 120. Although this user interface 130 is not illustrated to simplify the description in the above-mentioned first to sixth embodiments, all of the image reproduction apparatuses as the embodiments of the present invention include user operation units for outputting operation signals to desired parts of the image reproduction apparatuses by user operation, which correspond to the user interface 130.

The edition unit 120 outputs the instruction signal Csd to the system decoder 101F on the basis of the playlist edition instruction signal Sup supplied from the user interface 130, and forms a playlist specified by the user on the basis of the playlist formation information Dhd supplied from the system decoder 101F. The information of the playlist formed by the edition unit 120 may be stored in the edition unit 120 as described above, or it may be written in the recording medium M on which coded streams are recorded.

FIGS. 24 to 26 are diagrams for explaining the playlist (reproduction control data) that is crated by the edition unit 120 of this seventh embodiment.

Figures 28A, 28B, 28C:
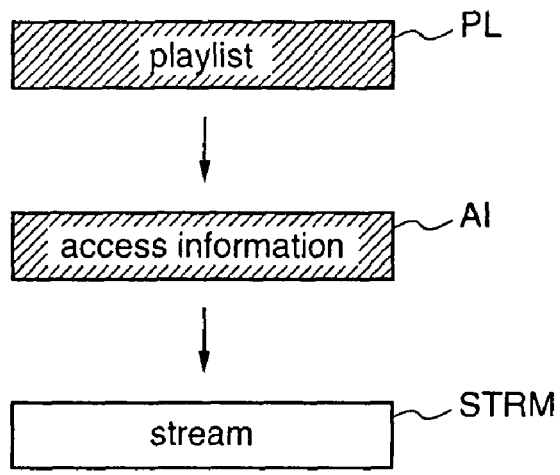
FIG. 28 is a diagram for explaining a playlist that is used in the conventional image reproduction apparatus, illustrating a reproduction method using the playlist (FIG. 28(a)), description contents in the playlist (FIG. 28(b)), and an example of description of access information (FIG. 28(c)).

The playlist used in the image reproduction apparatus 100f of this seventh embodiment is obtained by extending the description of the playlist that is used in the conventional image reproduction apparatus described with reference to FIGS. 28 to 30, and hereinafter, the description portion of the playlist that is extended to manage the plural streams of different codec methods will be described.

FIG. 24(a) shows a reproduction method using the playlist, FIG. 24(b) shows an example of description of the playlist, and FIG. 24(c) shows an example of description of access information.

In the reproduction method using the playlist, as shown in FIG. 24(a), initially, portions of streams to be reproduced and the reproduction order are determined on the basis of the playlist PL, and next, the address positions of the determined reproduction portions are determined on the basis of the access information that is referred from the playlist PL, and further, the reproduction portions of the streams are obtained successively from the determined address positions, and then decoded and reproduced.

The playlist PL specifies which portions of which streams STRM are to be reproduced in what order, and it refers to the access information AI, that is, the information AI that specifies the on-disk address positions which correspond to the reproduction portions designated by the playlist PL.

For example, in the description of the playlist shown in FIG. 24(b), the playlist indicates that three streams given as item 1 to item 3 are reproduced continuously.

The item 1 indicates that a range from 0 sec to 60 sec of stream1.ts should be reproduced.

The item 2 indicates that a range from 30 sec to 60 sec of stream2.ts should be reproduced, and further, it indicates that the item 1 and the item 2 are seamlessly connectable.

The item 3 indicates that a range from 60 sec to 90 sec of stream2.ts should be reproduced, and further, it indicates that the item 2 and the item 3 cannot be seamlessly connected.

The playlist PL used in this seventh embodiment includes extended portions PLA, PLB, and PLC. That is, the extended portion PLA describes "the maximum delay in the items in the playlist: three frames", which means that the delay time of the item having the maximum display delay among the plural items shown in the playlist PL corresponds to three frames. The extended portion PLB relates to the item 2, and it describes "having different codecs, and different frame delays", which means that the codec changes and the frame display delay also changes at the boundary of the stream indicated by the item 1 and the stream indicated by the item 2. The extended portion PLB relates to the item 3, and describes "having different image sizes, and the same frame delay", which means that the image size changes and the frame display delay also changes at the boundary of the stream indicated by the item 2 and the stream indicated by the item 3. As for the information of the extended portion, the case where the items have different codecs, and the same frame delay may be described.

The access information AI exists for each stream. For example, the access information AI for the item 1 includes attribute information and an access table.

For example, the access information for stream1.ts includes, as the attribute information, information indicating that the coding method is the MPEG-4 AVC, information indicating that the frame rate is 24 Hz, and information indicating that the frame delay is two frames as shown in FIG. 24(c), and the information indicating that the frame delay is two frames is an extended portion AIA that is added to the playlist used in this seventh embodiment.

Further, the access information for stream1.ts includes a table on which the relationships between PTSs (Presentation Time Stamps) of head pictures in random access units (decoding order) and the address information are recorded.

As described above, the playlist PL used in this seventh embodiment indicates a connection point of streams based on different codecs, and a connection point of streams having different frame delays, as information of connection points of the respective sections to be continuously reproduced. However, in some cases, the playlist PL may include information of a reproduction method such as fade-in or fade-out that is recommended at the connection point.

However, the playlist PL used in this seventh embodiment is not restricted to that mentioned above, and any playlist may be used so long as it includes at least one of information indicating a connection point of streams based on different codecs and information indicating a connection point of streams having different frame delays.

Further, while the access information that is referred from the playlist PL used in this seventh embodiment includes the information indicating the frame delay as the attribute information of the stream, this attribute information may be recorded as a data unit identical to the access table, or it may be recorded as different data units such as divided files.

Next, a description will be given of an example of a format of the playlist in the recording medium.

FIG. 25 is a diagram for explaining a format of playlists corresponding to BD-RE (Rewritable) which is used in this seventh embodiment, and more particularly, FIG. 25(a) shows the correspondences between the playlists and reproduction portions designated by the playlists, FIG. 25(b) shows the contents of description in a playlist, and FIG. 25(c) shows the contents of description in a play item.

Each of playlists MPL1~MPL4 comprises one or more items, like the conventional playlist shown in FIG. 29.

In the playitem of the playlist used in this seventh embodiment, IN_time indicating the reproduction start PTS of the current PlayItem, and field (connection condition) PIA indicating the connection condition in OUT_time that indicates reproduction end PTS of the immediately previous PlayItem are extended, and in this field, information such as switching of codec or switching of frame delay can be also shown.

FIG. 26 is a diagram for explaining clips shown in figure 25, and more particularly, FIG. 26(a) shows the correspondences between the playlists and reproduction portions in the clips designated by the playlists, and FIG. 26(b) shows the description contents of stream attribute information (StreamCodingInfo) in the access information. The file in which the access information is stored is designated by a file name (Clip_Information_file_name) in the playitem (PlayItem).

Each of the playlists MPL11 to MPL13 comprises one or more items, like the conventional playlist shown in FIG. 30.

In the playlist used in this seventh embodiment, information indicating frame delay can be described in, for example, reserved field "reserved" SCA in the attribute information (StreamCodingInfo) included in the access information.

The system decoder 101$f$ refers to the newly added information in the playlist, whereby the system decoder 101$f$ can reproduce desired ranges in the clips even when plural streams encoded by different codec methods are mixed in the same recording medium.

While in this seventh embodiment the playlist corresponding to a BD is described as the playlist to be used for seamless reproduction of plural streams corresponding to different codec methods, the playlist to be used for seamless reproduction can be obtained by extending the playlist corresponding to a HDDVD or a DVD of a similar format so that it can realize seamless reproduction of streams of different codec methods according to the present invention.

That is, the method of reproducing the streams of different codec methods using the playlist according to the seventh embodiment can be similarly applied to a format that designates a jumping position to a stream not by a PTS but directly by an address, such as a cell in a program chain of a DVD.

In this case, since the cell has a role of a playitem in the BD, a connection condition such that reproduction sections designated by the cell have different frame delays may be described in the cell.

Next, the operation will be described.

In the image reproduction apparatus 100$f$ according to the seventh embodiment, when the user performs an operation of forming a playlist with the user interface 130, the user interface 130 outputs an instruction signal Sup that instructs playlist formation to the edition unit 120. Then, the edition unit 120 forms a playlist according to the user operation, and holds the formed playlist.

At this time, the system decoder 110F outputs a random access control signal Cra to the stream reading unit 110F on the basis of the control signal Csd supplied from the edition unit 120, and controls the stream reading unit 110F so that the designated streams are read from the recording medium M by random access. At this time, the user operates the user interface while observing the image display on the display unit 107, whereby an operation signal Sup corresponding to this operation is outputted to the edition unit 120, and the edition unit 120 determines reproduction portions of the streams on the basis of the control signal Sup, and the decode position information Dps supplied from the system decoder.

Then, the edition unit 120 forms a playlist on the basis of the reproduction portions of the streams that are determined by the user, and holds the playlist.

Thereafter, when an instruction to perform reproduction according to the formed playlist is supplied from the user interface 130 by user operation, the edition unit 120 outputs a control signal Csd that instructs the system decoder 101F to perform reproduction according to the playlist, on the basis of the operation signal Sup supplied from the user interface 130. Then, the stream reading unit 110F reads the reproduction portions of the streams that are indicated by the playlist, by random access, and outputs them to the stream buffer 111F, on the basis of the control signal Cra supplied from the system decoder 101F. The streams stored in the stream buffer 111F are successively outputted to the system decoder 101F, whereby the streams of different codec methods are successively reproduced, as in the first embodiment.

Thereby, in the image reproduction apparatus 100f according to the seventh embodiment, the designated reproduction portions of the streams of different codec methods are successively displayed according to the playlist.

At this time, in the system decoder 101F, the codec information is outputted to the display control unit 24 on the basis of the information PLA relating to the display delay in the playlist, and the display control unit 24 controls the display unit 107 so that display of the designated reproduction portions are carried out with a display delay amount that corresponds to the maximum frame delay in the items in the playlist.

As described above, according to the seventh embodiment, the format of the playlist is extended so that management information for the case where plural streams encoded by different codecs are mixed can be described in the playlist. Therefore, even when plural streams encoded by different codecs are mixed in the same medium, desired portions of the streams of different codec methods can be continuously reproduced.

The information indicating the connection condition for the streams of different codec methods, such as "connection condition", that is newly added to the description of the play-item included in the playlist, may be embedded in the same hierarchical as that of the play list, or it may be embedded in another hierarchical different from that of the playlist. Alternatively, another means may be used so long as it describes similar function.

While in the respective embodiments described above a stream obtained by connecting an MPEG-2 coded stream and an MPEG-4 AVC coded stream is described as a connected stream, streams included in the connected stream may be those of other codec methods. Especially, in a stream coded by VC-1 (Video Codec 1), a delay of maximum one frame occurs when it is decoded, like the MPEG-2 coded stream, and therefore, a VC-1 coded stream may be used instead of the MPEG-2 coded stream with the same effects as mentioned above.

Further, while in the respective embodiments described above a stream obtained by connecting an MPEG-2 coded stream and an MPEG-4 AVC coded stream is described as a connected stream, since the delay time of the display frame is unfixed in the MPEG-4 AVC coded stream, the connected stream may be obtained by connecting portions of different delay times of display frames in the MPEG-4 AVC coded stream.

That is, the delay time of the display frame in the MPEG-4 AVC coded stream is not restricted to two frames or more ($N \geq 2$), and it becomes 0 or 1 ($N=0$ or 1) in some cases. Therefore, in the connected stream that is obtained by connecting portions of different delay times of display frames in the MPEG-4 AVC coded stream, display might be interrupted in the portion where the stream changes, but this display interruption can be solved by the method identical to any of the methods of the respective embodiments mentioned above.

Furthermore, while in the above-described embodiments the recording medium is an optical disc, the present invention can be applied to various kinds of magnet disks such as a magnet-optical disk and a hard disk, or various kinds of semiconductor memory devices such as a SD memory card so long as the disk or the device has the same recording format as that of the present invention.

APPLICABILITY IN INDUSTRY

An image reproduction method according to the present invention can decode a connected stream that is obtained by connecting plural streams of different codec methods, by changing the decoding process to those for the codec methods corresponding to the respective streams, and therefore, it is useful in performing reproduction of streams recorded on a recording medium such as a HDDVD or a BD that supports plural codecs.

The invention claimed is:

1. An image reproduction method for reproducing a connected stream which is obtained by connecting plural coded streams that are respectively coded by different codec methods, said method comprising:
   detecting a connection position of the coded streams in the connected stream;
   decoding the individual coded streams of different codec methods in the connected stream
   wherein, in said decoding, the codec method is changed to a codec method corresponding to a coded stream that is a target of decoding, at the detected connection position of the coded streams, and the decoded data obtained by decoding the connected stream is stored in a frame buffer; and
   displaying the decoded data stored in the frame buffer, in chronological order from one having the oldest display time;
   wherein, in displaying the decoded data, said data is displayed with a delay equal to or larger than a delay time for a portion of the connected stream, wherein the portion needs the largest delay when it is image displayed, on the basis of the decoding timing of the decoded data, and display delay times required when performing image display are determined according to the types of codec methods corresponding to the respective coded streams in the connected stream.

2. An image reproduction method as defined in claim 1 wherein, in said decoding, the connected stream is stored in a stream buffer, and the connected stream read from the stream buffer is decoded.

3. An image reproduction method as defined in claim 1 wherein, in said decoding, decoding of the connected stream starts when the occupied capacity of the stream buffer reaches a predetermined value.

4. An image reproduction method as defined in claim 1 wherein, in said displaying, when a coded stream corresponding to an MPEG-4 AVC method is included in the connected stream, the image display is delayed by N frames or more, and when a coded stream corresponding to the MPEG-4 AVC method is not included in the connected stream, the image display is delayed by one frame or more.

5. An image reproduction method as defined in claim 1 wherein, in said displaying, the image display is always delayed by N frames or more.

6. An image reproduction method as defined in claim 1 wherein a display delay time of a preceding stream constituting the connected stream is increased.

7. An image reproduction method as defined in claim 1 wherein a period for decoding a preceding stream constituting the connected stream and a period for decoding a subsequent stream constituting the connected stream are partially overlapped.

8. An image reproduction method as defined in claim 1 wherein the operation of decoding a portion of a subsequent stream constituting the connected stream is increased in speed relative to the operation of decoding the other portion.

9. An image reproduction method as defined in claim 1 wherein the operation of decoding a portion of a preceding stream constituting the connected stream is increased in speed relative to the operation of decoding the other portion.

10. An image reproduction method as defined in claim 1 wherein display of a final display frame in a preceding stream constituting the connected stream is repeated.

11. An image reproduction method as defined in claim 1 wherein a predetermined frame is displayed between a final display frame in a preceding stream constituting the connected stream and a head display frame in a subsequent stream that follows the preceding stream.

12. An image reproduction method as defined in claim 1 wherein
when a period for displaying a frame in a preceding stream and a period of displaying a frame in a subsequent stream are overlapped in the vicinity of a connection point between the preceding stream and the subsequent stream which constitute the connected stream,
decoded data of either of the frame in the preceding stream or the frame in the subsequent stream, the display periods of which are overlapped, is discarded.

13. An image reproduction method as defined in claim 1 wherein
when a period for displaying a frame in a preceding stream and a period of displaying a frame in a subsequent stream overlaps in the vicinity of a connection point between the preceding stream and the subsequent stream which constitute the connected stream,
decoding of the subsequent stream is temporarily stopped after the preceding stream is decoded.

14. An image reproduction method for continuously reproducing plural coded streams of different codec methods, on the basis of playlist information indicating a coded stream to be reproduced or a portion thereof, said method comprising:
detecting a position where the codec method changes;
decoding the individual coded streams of different codec methods;
wherein, in said decoding, the codec method for decoding the coded stream is changed to a codec method corresponding to a coded stream that is a target of decoding, in the detected codec method changing position, and the decoded data obtained by decoding the connected stream is stored in a frame buffer; and
displaying the decoded data stored in the frame buffer, in chronological order from one having the oldest display time;
wherein, in said displaying, the decoded data are displayed with a delay equal to or larger than a delay time for a portion of the connected stream, wherein the portion needs the largest delay when it is image displayed, on the basis of the decoding timing of the decoded data, and display delay times required when performing image display are determined according to the types of codec methods corresponding to the respective coded streams in the connected stream.

* * * * *